(12) United States Patent
Muramatsu et al.

(10) Patent No.: US 9,783,423 B2
(45) Date of Patent: Oct. 10, 2017

(54) CARBON MATERIAL AND METHOD FOR PRODUCING SAME

(71) Applicant: INCUBATION ALLIANCE, INC., Kobe-shi, Hyogo (JP)

(72) Inventors: Kazuo Muramatsu, Kobe (JP); Masahiro Toyoda, Oita (JP)

(73) Assignee: INCUBATION ALLIANCE, INC., Kobe-shi (JP)

( * ) Notice: Subject to any disclaimer, the term of this patent is extended or adjusted under 35 U.S.C. 154(b) by 329 days.

(21) Appl. No.: 14/537,159

(22) Filed: Nov. 10, 2014

(65) Prior Publication Data

US 2015/0061199 A1    Mar. 5, 2015

Related U.S. Application Data

(62) Division of application No. 13/321,944, filed as application No. PCT/JP2010/058834 on May 25, 2010, now Pat. No. 8,951,451.

(30) Foreign Application Priority Data

May 26, 2009  (JP) ................................. 2009-126492
Mar. 31, 2010 (JP) ................................. 2010-084371

(51) Int. Cl.
 *B29B 13/02*  (2006.01)
 *C01B 31/04* (2006.01)
 (Continued)

(52) U.S. Cl.
 CPC ............ *C01B 31/04* (2013.01); *B29B 13/021* (2013.01); *B82Y 30/00* (2013.01); *B82Y 40/00* (2013.01);
 (Continued)

(58) Field of Classification Search
 CPC . C01B 31/04; C01B 31/0213; C01B 31/0226; C01B 31/022; H01G 11/36; H01M 4/587; B29B 13/02
 See application file for complete search history.

(56) References Cited

U.S. PATENT DOCUMENTS

| 5,045,298 A | 9/1991 | Muramatsu et al. |
| 6,787,235 B2 | 9/2004 | Nesbitt et al. |

(Continued)

FOREIGN PATENT DOCUMENTS

| CN | 1314825 A | 9/2001 |
| CN | 101183033 A | 5/2008 |

(Continued)

OTHER PUBLICATIONS

International Search Report for International Application PCT/JP2010/058834 dated Aug. 17, 2010.

(Continued)

*Primary Examiner* — Mathieu Vargot
(74) *Attorney, Agent, or Firm* — Kratz, Quintos & Hanson, LLP

(57) ABSTRACT

(Problem)
In conventional method for producing artificial graphite, in order to obtain a product having excellent crystallinity, it was necessary to mold a filler and a binder and then repeat impregnation, carbonization and graphitization, and since carbonization and graphitization proceeded by a solid phase reaction, a period of time of as long as 2 to 3 months was required for the production and cost was high and further, a large size structure in the shape of column and cylinder could not be produced. In addition, nanocarbon materials such as carbon nanotube, carbon nanofiber and carbon nanohorn could not be produced.
(Means to solve)
A properly pre-baked filler is sealed in a graphite vessel and is subsequently subjected to hot isostatic pressing (HIP) treatment, thereby allowing gases such as hydrocarbon and hydrogen to be generated from the filler and precipitating vapor-phase-grown graphite around and inside the filler using the generated gases as a source material, and thereby, an integrated structure of carbide of the filler and the vapor-phase-grown graphite is produced. In addition, nanocarbon materials are produced selectively and efficiently by adding a catalyst or adjusting the HIP treating temperature.

10 Claims, 46 Drawing Sheets

Figure 1:
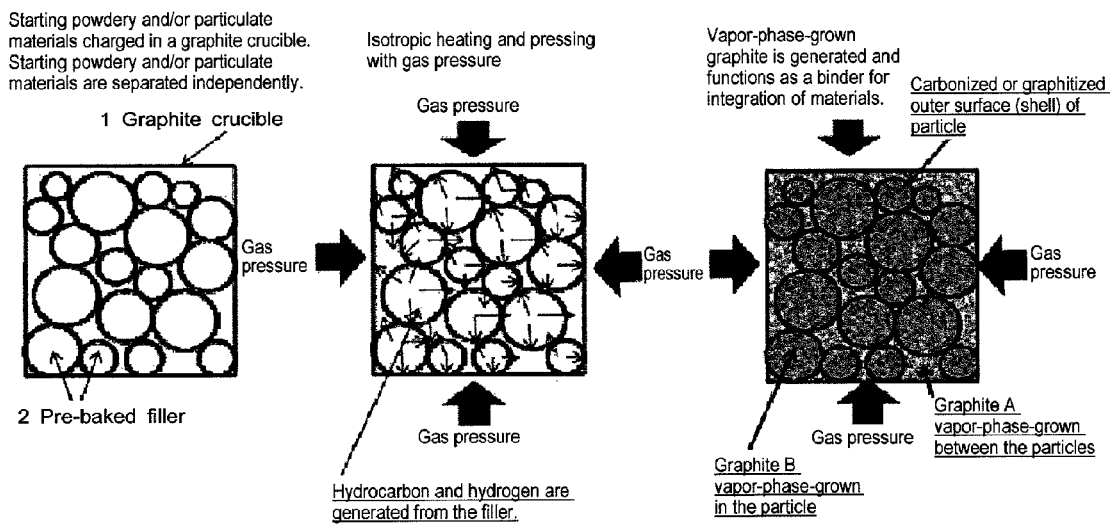

(51) Int. Cl.
| | |
|---|---|
| B82Y 30/00 | (2011.01) |
| B82Y 40/00 | (2011.01) |
| C01B 31/02 | (2006.01) |
| H01G 11/32 | (2013.01) |
| H01G 11/34 | (2013.01) |
| H01G 11/36 | (2013.01) |
| H01G 11/84 | (2013.01) |
| H01M 4/587 | (2010.01) |
| H01M 4/62 | (2006.01) |
| H01M 4/86 | (2006.01) |
| C04B 35/52 | (2006.01) |
| C04B 35/532 | (2006.01) |
| C04B 35/632 | (2006.01) |
| C04B 35/645 | (2006.01) |
| F16L 59/02 | (2006.01) |
| H01B 1/04 | (2006.01) |
| H01M 4/583 | (2010.01) |
| H01M 4/36 | (2006.01) |
| H01M 10/0525 | (2010.01) |
| B29K 105/00 | (2006.01) |

(52) U.S. Cl.
CPC ........ *C01B 31/022* (2013.01); *C01B 31/0213* (2013.01); *C01B 31/0226* (2013.01); *C01B 31/0293* (2013.01); *C01B 31/0446* (2013.01); *C04B 35/52* (2013.01); *C04B 35/522* (2013.01); *C04B 35/532* (2013.01); *C04B 35/6325* (2013.01); *C04B 35/6455* (2013.01); *F16L 59/028* (2013.01); *H01B 1/04* (2013.01); *H01G 11/32* (2013.01); *H01G 11/34* (2013.01); *H01G 11/36* (2013.01); *H01G 11/84* (2013.01); *H01M 4/366* (2013.01); *H01M 4/583* (2013.01); *H01M 4/587* (2013.01); *H01M 4/62* (2013.01); *H01M 4/625* (2013.01); *H01M 4/8673* (2013.01); *B29K 2105/251* (2013.01); *C01B 2202/36* (2013.01); *C04B 2235/3208* (2013.01); *C04B 2235/3215* (2013.01); *C04B 2235/40* (2013.01); *C04B 2235/405* (2013.01); *C04B 2235/422* (2013.01); *C04B 2235/425* (2013.01); *C04B 2235/428* (2013.01); *C04B 2235/48* (2013.01); *C04B 2235/526* (2013.01); *C04B 2235/528* (2013.01); *C04B 2235/5248* (2013.01); *C04B 2235/5436* (2013.01); *C04B 2235/72* (2013.01); *C04B 2235/725* (2013.01); *C04B 2235/728* (2013.01); *C04B 2235/77* (2013.01); *H01M 10/0525* (2013.01); *Y02E 60/13* (2013.01); *Y10T 83/0591* (2015.04); *Y10T 428/24999* (2015.04); *Y10T 428/298* (2015.01); *Y10T 428/2918* (2015.01); *Y10T 428/2982* (2015.01)

(56) References Cited

U.S. PATENT DOCUMENTS

| | | |
|---|---|---|
| 2002/0168526 A1 | 11/2002 | Mercuri et al. |
| 2007/0201185 A1 | 8/2007 | Yoshio et al. |

FOREIGN PATENT DOCUMENTS

| | | |
|---|---|---|
| EP | 0757374 A1 | 2/1997 |
| EP | 1961700 A1 | 8/2008 |
| JP | 62-49363 B | 10/1987 |
| JP | 2-51412 A | 2/1990 |
| JP | 2526408 B2 | 8/1996 |
| JP | 2541434 B2 | 10/1996 |
| JP | 2633638 B2 | 7/1997 |
| JP | 2664819 B2 | 10/1997 |
| JP | 3065896 B2 | 7/2000 |
| JP | 2002-173308 A1 | 6/2002 |
| JP | 2005-324995 A1 | 11/2005 |
| JP | 2006-176373 A | 7/2006 |
| JP | 2008-536954 A1 | 9/2008 |
| WO | 00/12207 A1 | 3/2000 |
| WO | 2006/107231 A1 | 10/2006 |

OTHER PUBLICATIONS

Sumio Iijima: "Helical microtubules of graphitic carbon", Letters to Nature, vol. 354, Nov. 7, 1991, pp. 56-58.
Chinese Office action dated May 29, 2013, in the corresponding Chinese patent application No. 201080022903.X.
The Second Office Action issued Jan. 28, 2014 by the State Intellectual Property Office of People's Republic of China in counterpart application No. 201080022903.X.
Jun-Song Zhang et al: "Preparation and Electrocatalytic Activity of Pt Catalysts Supported on Nanotubes with Thick and Thin Walls for Methanol Oxidation", Chinese Journal of Applied Chemistry, vol. 25, No. 3, Mar. 2008.
Partial Supplementary European Search Report dated Jan. 5, 2015. EP Application No. 10780547.5.
U.S. Appl. No. 14/534,129: Office Action dated Jun. 12, 2017.

Conventional process for producing artificial graphite

Production process of the present invention

○ Conventional production process of vapor-phase-grown carbon materials and shapes of the materials ○ Production process of vapor-phase-grown carbon materials of the present invention and shapes of the materials Body A
Body B
Body C (shell)

Enlarged view of 1

Enlarged view of 2

Enlarged view of 4

Enlarged view of 4-1

CARBON MATERIAL AND METHOD FOR PRODUCING SAME

CROSS-REFERENCE TO RELATED APPLICATIONS

This application is a Divisional Application of prior application Ser. No. 13/321,944 filed on Nov. 22, 2011, now U.S. Pat. No. 8,951,451, which is a 371 National stage application of PCT/JP2010/058834, filed on May 25, 2010, which is based upon and claims the benefit of priority of the prior Japanese Patent Application No. 2009-126492 filed on May 26, 2009, and the prior Japanese Patent Application No. 2010-084371 filed on Mar. 31, 2010, the entire contents of each of the above being incorporated herein by this reference.

TECHNICAL FIELD

The present invention relates to a novel structure and production method of an artificial graphite material which is used on electrode materials and diffusion layer for lithium ion battery, lithium ion capacitor, fuel cell, primary battery, second battery, steel making, refining and electrolysis, crucible for crystal growth of crystalline silicon and silicon carbide, insulating material and reactor for nuclear electric power generation.

The present invention relates to a method for producing nanocarbon materials such as a carbon nanotube, carbon nanohorn, graphene and fullerene which are practically used for hydrogen storing material for fuel cell-powered vehicle, catalyst-carrying substrate, electrodes for field emission display (FED) assuring low power consumption, high luminance and low dependency on view angle and having self-luminescence in the fields of information home appliances, probe of tunneling microscope, an additive used for a conductive sheet and high thermal conductivity sheet as a measure for dust-proofing in semi-conductor manufacturing process by making use of high thermal conductivity and high electric conductivity thereof, a light-weight high strength composite material for robot, and pharmaceutical medicals.

BACKGROUND ART

Graphite materials are chemically stable and are excellent in electric and thermal conductivity and mechanical strength at high temperature, and therefore, are widely used for electrodes for steel making, electrodes for arc melting and reducing of high purity silica and electrodes for aluminum refining. Graphite has a crystal structure formed by stacking of carbon hexagonal planes generated by growth of carbon hexagonal rings by sp2 hybridized orbital of carbon atoms, and is classified into a hexagonal system and rhombohederal system depending on the form of lamination. The both systems show good electric and thermal conductivity since a carrier concentration and carrier mobility of free electron and holes in the carbon hexagonal planes are high.

On the other hand, since the carbon hexagonal planes are weakly bonded to each other by so-called Van der Waals force, slip occurs relatively easily between the planes, and as a result, graphite has lower strength and hardness as compared with those of metallic materials and has self-lubricating property.

Since natural graphite produced naturally is a polycrystalline material, breakdown occurs at an interface of crystal grains and natural graphite is produced in a flaky form, not in a massive form having sufficient hardness and strength. Therefore, generally natural graphite is classified by its particle size and is used as an aggregate (a filler).

On the other hand, in order to use graphite in various applications mentioned above by making use of excellent characteristics thereof, it is necessary to produce a graphite structure having practicable strength and hardness. Since it is difficult to obtain such a structure from natural graphite alone, various so-called artificial graphite materials have been developed and put into practical use.

(General Method for Producing Artificial Graphite Materials)

Artificial graphite materials are produced by mixing a filler as an aggregate and a binder and subjecting the mixture to molding, baking for carbonization and graphitization treatment. It is essential that both of the filler and the binder remain as carbon after the baking for carbonization so as to give high carbonization yield, and a suitable filler and binder are selected depending on applications.

A pre-baked petroleum coke, a pre-baked pitch coke, a natural graphite, a pre-baked anthracite, a carbon black and the like are used as a filler. These fillers are kneaded with coal tar pitch, coal tar, a polymer resin material, or the like and molded into a desired form by extruding, casting, pressing or the like method.

A molded material is baked for carbonization at a temperature of 1000° C. or more in an inert atmosphere and then baked at a high temperature of 2500° C. or more for developing a graphite crystal structure and graphitizing. During the baking for carbonization, the starting material are subject to decomposition, and moisture, carbon dioxide, hydrogen, and hydrocarbon gases are generated from component elements other than carbon such as hydrogen and nitrogen, and therefore, the baking is controlled to be a low temperature elevating rate, and generally a very long period of time of 10 to 20 days for heating up and 5 to 10 days for cooling, totally 15 to 30 days is necessary for production.

Graphitization process is carried out by electric heating with a large-sized oven such as an Acheson electrical resistance oven. Also in the graphitization process, a period of time of 2 to 7 days for electric heating and 14 days for cooling, totally 16 to 21 days is necessary. Totally about two months is required for production including preparation of a staring material, molding, baking for carbonization and graphitization. (Non-patent Document 1)

In general artificial graphite, a filler added in a molding step is easily formed evenly in a certain direction and crystallinity is enhanced as carbonization and graphitization proceed. Therefore, anisotropy tends to be increased and as a result, a bulk density and a mechanical strength tend to be decreased.

Both of the filler and binder to be used are hydrocarbon substances to be carbonized after heat treatment and are roughly classified into easily graphitizable materials to be easily graphitized due to a chemical structure thereof and hardly graphitizable materials hardly graphitized due to crosslinking of a benzene ring in a structure thereof.

(Method for Producing High Density Isotropic Graphite Material)

Examples of means for achieving high density are to use a filler capable of being easily graphitized such as mesocarbon microbeads comprising extracted matter of mesophase, gilsonite coke or carbon beads, and then to adjust particle size distribution thereof, to enhance compatibility thereof with a binder pitch, or to repeat impregnation treatment thereof. Also, in order to impart isotropic property, application of isotropic pressure with cold isostatic pressing equipment at the molding stage is effective and is a general method. In order to further increase a density, a process for impregnating the material with a binder pitch again after the graphitization and repeating the graphitization treatment has been carried out, but in this process, a total period of time required for production is as extremely long as 2 to 3 months.

In the case of use for electrode materials and nuclear power application, purity of a graphite material is critical, and it is necessary to carry out a treatment for securing high purity with halogen gas such as chlorine gas at a temperature of as high as around 2000° C. By the treatment for securing high purity, a concentration of impurities is decreased from about several hundreds ppm to about several ppm.

A starting material to be used for producing general artificial graphite and high density isotropic graphite is in a liquid or solid form. In molding, carbonizing and graphitizing processes, a liquid phase-solid phase reaction or a solid phase reaction proceeds predominantly. These hydrocarbon based materials expand its benzene ring network due to dissipation of elements such as hydrogen, oxygen and nitrogen therefrom, and approximates a graphite crystal structure by growth and stacking of carbon hexagonal planes. Particularly in the graphitization process, which is a solid phase reaction, an extremely long reaction time at a temperature of as high as 2500° C. or more is required.

In the case of artificial graphite and high density isotropic graphite, the graphitization proceeds in a liquid phase or a solid phase, and therefore even if heat treatment is carried out for a long period of time at a temperature of as high as 3000° C. or more, complete crystallization (graphitization) is difficult, a density of the graphite does not reach a theoretical density of 2.54 $g/cm^3$, and there is a limit in a crystal size thereof.

(Heat Treatment of Polymer Resin Material)

In the case of a carbon fiber produced using a resin such as polyacrylonitrile (PAN), coal or petroleum pitch as a starting material, such starting material of a polymer material are draw into a fiber and then carbonized and graphitized in the following heat treatment. In addition, a highly oriented graphite film having high crystallinity can be produced by depositing or applying boron, rare earth element or a compound thereof to a polyimide film or a carbonized polyimide film, laminating a plurality of films and then carrying out baking while applying pressure to the film surface in the vertical direction thereof at a temperature of 2000° C. or more in an inert atmosphere. However, an upper limit of the film thickness is several millimeters. (Patent Document 3)

(Method for Precipitating Highly Oriented Graphite in Glassy Carbon)

In JP 2633638 B (Patent Document 6), it is disclosed that a graphite in the form of like bean jam of Monaka of a Japanese-style confection is precipitated in a glassy carbon by means of molding a thermosetting resin into a thick plate by hot press or the like, forming the resin into a glassy carbon by carbonization treatment and subsequently subjecting the glassy carbon to hot iso static pressing treatment. In this method, it is necessary to control thickness of the glassy carbon to about 6 mm in order to enable baking and also necessary to break a shell of the glassy carbon after generation of graphite in order to take out a graphite precipitate.

(Method for Producing Graphite Material by Vapor Phase Growth)

There is a method for producing carbon and a graphite material through vapor phase growth by using hydrocarbon and hydrogen gas as starting materials and a reactor such as CVD (Chemical Vapor Deposition) equipment and bringing the starting materials into contact with a metal catalyst at high temperature. Examples of carbon materials to be produced by vapor phase growth are a vapor-phase-grown carbon fiber, a carbon nanotube, a carbon nanohorn, fullerene and the like.

In the case of a vapor-phase-grown carbon fiber, by suspending an oxide of transition metal having a size of several hundreds angstrom in a solvent such as an alcohol and spraying the solvent onto a substrate and drying it, the substrate carrying a catalyst is produced. This substrate is put in a reactor and a hydrocarbon gas is flowed thereinto at a temperature of 1000° C., thus growing a carbon fiber from the surface of the transition metal on the substrate by vapor phase reaction. Alternatively there is a case of letting a mixture of a gas of organic transition metal compound and a hydrocarbon gas flow into a reactor of about 1000° C. (Patent Document 1)

A graphitized fiber is obtained by subsequently heat-treating the carbon fiber obtained by vapor phase growth at high temperature of 2000° C. or more in an oven for graphitization treatment. (Patent Document 2) In order to produce a graphitized fiber directly by vapor phase growth, a reaction temperature of around 2000° C. is required. However, in such a temperature range, a transition metal as a catalyst is liquefied and vaporized, and a function of the catalyst is not exhibited. Therefore, generally graphitization is carried out separately after carbonization at low temperature.

(Carbon Nanotube)

A carbon nanotube is a very minute substance having an outer diameter of the order of nanometer and comprising cylindrical shape carbon hexagonal plane having a thickness of several atomic layers, which was found in 1991. (Non-patent Document 1) It is known that this carbon nanotube exists in a deposit generated on a negative electrode due to arc discharge of a carbon material such as a graphite, and this carbon nanotube is produced by using a carbon material such as a graphite as a positive electrode and a heat resistant conductive material as a negative electrode and carrying out arc discharge while adjusting a gap between the positive electrode and the negative electrode in response to growth of a deposit on a negative electrode. (Patent Document 4)

A carbon nanotube is generated by arc discharge. However, a large-sized reactor is required and yield obtained is extremely low, and therefore, a mass production method has been studied. Generally in arc discharge of carbon to be used for production of a nanotube, plasma in a state where carbon molecular species such as C, C2 and C3 being contained is generated in a reactor fully filled with an inert gas, and, in the next stage, these carbon molecular species are solidified into soot, fullerene, a nanotube or a high density solid. Therefore, yield of nanotube is increased by optimizing a partial pressure of gases in a chamber and a plasma temperature. (Patent Document 5)

A tube composed of carbon hexagonal planes (graphene sheet) is CNT, and a carbon nanotube comprising a single layer graphene sheet is called a mono-layer CNT or SWCNT (Single-walled Carbon Nanotube) having an outer diameter of about 0.5 nm to about 10 nm, and a carbon nanotube comprising multi-layer graphene sheets is called a multi-layer CNT or MWCNT (Multi-walled Carbon Nanotube) having an outer diameter of 10 nm to 100 nm. Thus carbon nanotubes are classified in such a manner. Currently most of commercially available carbon nanotubes are multi-layer CNT, which are a mixture with carbon fibers and graphite fibers that do not form a tube.

Methods for producing a carbon nanotube are explained systematically as follows.

1) Arc Discharging Method

High voltage is applied between carbon electrodes in vacuo or under reduced pressure to cause arc discharging and deposit carbon vaporized at locally super high temperature (4050° C.) on the negative electrode.

2) Laser Vaporization Method

Laser is emitted to a mixture of carbon and a catalyst in vacuo or under reduced pressure to vaporize carbon at a locally super high temperature (4050° C.), and grow the vaporized carbon into CNT on the catalyst.

3) Chemical Vapor Phase Growth Method

CNT is precipitated on a catalyst by passing a carbon-containing gas (hydrocarbon) and a metal catalyst through a reaction tube heated to 1000-2000° C.

4) Other Methods Such as SiC Surface Decomposition Method and Polymer Blend Spinning Method Fullerene is a spherical molecule comprising 60 carbon atoms, and one having a structure similar to a soccer ball is called C60, one having more than 60 carbon atoms in a cage is called a high-order fullerene, and one containing metal in a cage is called a metal-incorporated fullerene. Fullerene is extracted from a vaporized carbon obtained by applying a high voltage between carbon electrodes in vacuo or under reduced pressure to cause arc discharging and vaporizing at locally super high temperature (4050° C.) by the arc discharging method in the same manner as in CNT. In addition, at an initial stage of the arc discharging, fullerene is generated by combusting a gas mixture of a carbon-containing gas (hydrocarbon), oxygen and argon under reduced pressure by a combustion method.

Also, nanocarbon materials such as graphene composed of one carbon hexagonal plane and a carbon nanohorn obtained by forming graphene into a tube of a circular cone shape are reported. However, any of them are produced by the same method as in fullerene, and in many cases, carbon materials other than CNT are produced secondarily and a selective production method has not been established.

PRIOR ART DOCUMENTS

Patent Documents

Patent Document 1: JP 62-49363 B
Patent Document 2: JP 2664819 B
Patent Document 3: JP 3065896 B
Patent Document 4: JP 2526408 B
Patent Document 5: JP 2541434 B
Patent Document 6: JP 2633638 B Non-Patent Document Non-Patent Document 1: Nature 354, 56-58, 1991

DISCLOSURE OF INVENTION

Problem to be Solved by the Invention

In the case of producing a graphite material having good crystallinity (degree of graphitization) and being in the form of mass, block, cylinder, polygonal rod or sheet, a material once carbonized need to be graphitized at high temperature of about 3000° C. for a long period of time in a solid phase reaction. Therefore, productivity is remarkably low and cost is high. In order to allow the graphitization to proceed in a solid phase, it has been difficult to obtain complete crystallinity of graphite in an industrially applicable processing time for graphitization. In addition, in order to obtain a high density graphite material, it is necessary to control an orientation of carbon hexagonal planes at the carbonization stage so that the graphitization should proceed even in a solid phase reaction. Further there is a problem that steps for preparing a starting material, molding and carbonizing are complicated and troublesome, productivity is very low and metal impurities remain in the graphite material.

Also, in electrodes of secondary batteries such as lithium ion batteries and hybrid capacitors and electrodes and diffuser panels of fuel cells, a porous graphite panel or sheet having a high open pore ratio is required. However, when a porous article is made of an artificial graphite material, strength of the material cannot be maintained, and therefore, it is necessary to pulverize the material into a powdery and/or particulate form, to form it into slurry and then to coat the slurry on a metal plate or the like.

In the method for producing vapor-phase-grown carbon fibers using hydrocarbon gas as a starting material, the fibers can be produced by a relatively easy process. However, it is necessary to provide a vapor phase reaction chamber (reactor) and graphitizing treatment is required separately, and therefore, there is a problem that equipment cost increases greatly in a mass production. In addition, an obtained material is in the form of fiber having a diameter of 1 mm or less, and therefore, in order to obtain a graphite material with a desired shape having a sufficient strength, it is necessary to combine with a binder by impregnation or to mold together with a resin or to conduct carbonization and graphitization again. Further, since a metal catalyst is an essential material for generation of fibers, it is necessary to remove the added catalytic metal in order to achieve a highly purity.

Also, in the case of nanocarbon materials such as a carbon nanotube, fullerene and carbon nanohorn, yield is extremely low, and in order to use them as a structural component, it is necessary to combine with a polymer material as an additive and then conduct carbonization and graphitization again or coating of slurry and drying.

In the method for producing a highly oriented graphite by treating a polyimide resin at high pressure (application of direct pressure on a material in a vertical direction thereto) at high temperature, there are problems that there is a limit in a thickness of a producible product, anisotropy is large and strength is very low.

In the method for precipitating highly oriented graphite inside a thick glassy carbon material by hot isostatic pressing treatment, it is difficult to bake a dense glassy carbon into a thickness of 10 mm or more, and further, since it is necessary to take out precipitated graphite by breaking a shell of a glassy carbon, there is a problem that a large in size or porous graphite cannot be obtained.

As mentioned above, in the methods for carbonization and graphitization in a solid phase using a liquid or solid starting material in the conventional methods for producing graphite materials, there is a problem that (1) in order to develop carbon hexagonal planes (graphite crystal structure), a very long period of time of about two months is required at a maximum ultimate temperature of about 3000° C., (2) a complete graphite crystal structure cannot be obtained, (3) even if a complete graphite crystal structure is obtained, anisotropy is high and strength is low (being strong in a plane direction but low in a thickness direction), (4) it is difficult to produce a porous article having a large open pore ratio, (5) in order to obtain a high strength, it is necessary to enhance both of isotropy and density and carry out repeated adjustment of a composition and structure of a filler and a binder, impregnation, molding, carbonization and graphitization, and (6) purity enhancing treatment is separately required for removing impurities.

In the method for allowing carbonization and graphitization to proceed in a gaseous phase (including radical in plasma) by using a gaseous or solid starting material or for producing a material mainly comprising a graphite crystal structure such as a carbon nanotube, graphene, fullerene, a carbon nanofiber and a carbon nanohorn, there is a problem that (1) quite a large-scaled reactor is required compared to an amount of obtained material, and therefore, production efficiency is very low and a mass production is difficult, (2) there is a limit in size to nano scale to at most millimeter scale, and it is difficult to directly produce a material of a large size in a form such as a mass, block, cylinder, polygonal rod or plate, and (3) in many cases, a metal catalyst is required, and in order to increase purity, such metal need to be removed.

In an arc discharge method and a laser vaporization method, super high temperature up to a sublimation point (4050° C.) at which carbon is vaporized is necessary and an extremely large energy is required. In addition, in an arc discharge method and a laser vaporization method, CNT, fullerene, carbon nanohorn and graphene and the like which are generated unintentionally are screened, and therefore, although SWCNT is relatively easily generated, yield and productivity are still very low, i.e., production efficiency of several grams per day.

In a CVD method for CNT for enhancing productivity, a substrate for carrying a catalyst is necessary and a generation reaction occurs on a two-dimensional substrate plane. Therefore, in order to enhance productivity, a large area is required, and a generation rate is 0.2 to 0.3 g/hr·cm$^2$ and productivity is still low. A fluid bed method as a method for reacting CNT on a three-dimensional space has been developed by National Institute of Advanced Industrial Science and Technology and Nikkiso Co., Ltd. However, hydrocarbon gas (liquid) as a starting material and a catalyst come into contact with each other fluidly and nonuniformly, and therefore, carbide can be obtained but a probability of generation of SWCNT and MWCNT is low and especially yield of SWCNT is low.

Currently, productivity of a multilayer CNT is 1 kg to 10 kg/day and a price thereof is 30,000 to 100,000 yen/kg, productivity of a single layer CNT is 10 to 100 g/day and a price thereof is 300,000 to 1,000,000 yen/kg, and a price of fullerene is 500,000 yen/kg. Thus, prices are very high. Mass production method has not been established with respect to graphene and carbon nanohorn. Such being the case, there is a problem that irrespective of excellent characteristics, application development thereof has not proceeded.

Means to Solve the Problem

As mentioned above, with respect to carbon and graphite materials, there are many problems to be solved and in many cases, production cannot be carried out in an industrial scale while such materials of various structures can be produced and they have excellent characteristics. As a result of intensive study made with respect to development of efficient method for producing carbon and graphite materials, however, an epoch-making material and production method thereof were found out.

Namely, the first aspect of the present invention relates to direct generation of vapor-phase-grown carbon and vapor-phase-grown graphite having developed carbon hexagonal planes by means of a vapor phase reaction using, as a source material, gases such as hydrogen and hydrocarbon generated from a pre-baked filler without using a binder, wherein a hydrocarbon-based starting material in the form of powder, particle, fiber or mesophase sphere which has been used as a filler so far is pre-baked, properly charged in a graphite crucible or the like and heat-treated at about 2000° C. under isotropic gas pressure. FIG. 1 is a diagrammatic view of the present invention.

The second aspect of the present invention relates to:

[1] a method for producing a vapor-phase-grown nanocarbon material, which comprises preparing a filler pre-baked to an extent of containing remaining hydrogen and then allowed to carry a catalyst thereon, charging the filler in a closed vessel made of a heat resistant material, and subjecting the filler together with the vessel to hot isostatic pressing treatment using a compressed gas atmosphere.

[2] the production method of the above [1], wherein the filler is a powdery and/or particulate material,

[3] the production method of the above [1] or [2], wherein the nanocarbon material is a carbon nanotube, or a graphene-laminated carbon nanofiber, a cup-stacked type carbon nanofiber, a screw type carbon nanofiber or a carbon nanohorn-stacked carbon nanofiber,

[4] the production method of any of the above [1] to [3], wherein the catalyst is one or two or more selected from the group consisting of (1) tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, zinc, lead, cadmium, thallium, bismuth, polonium, tin, lithium, indium, sodium, potassium, rubidium, gallium, cesium, silicon and tellurium, (2) sulfide, boride, oxide, chloride, hydroxide, nitride and organometallic compound of any one of the above (1), and (3) a mixture of any of the above (1) and (2) and sulfur and/or sulfide (including an organosulfur compound) and a mixture of any of the above (1) and (2) and boron and/or boride (including an organoboron compound),

[5] the production method of any of the above [1] to [4], wherein the filler is one or two or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea resin, melamine resin, benzoguanamine resin, epoxy resin, diallyl phthalate resin, unsaturated polyester resin, a bisphenol A type epoxy resin, Novolac type epoxy resin, polyfunctional epoxy rein, alicyclic epoxy resin, alkyd resin, urethane resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene, anthracene, petroleum pitch, coal pitch, petroleum coke, coal coke, carbon black, activated carbon, waste plastic, waste wood, waste plants and garbage,

[6] the production method of any of the above [1] to [5], wherein the filler pre-baked to an extent of containing remaining hydrogen is poured into an ionic solution or a complex solution of transition metal to allow the filler to carry transition metal on the surface thereof,

[7] the production method of the above [6], wherein the ionic solution of transition metal is one prepared by dissolving a transition metal chloride and/or an transition metal alkoxide in water, an alcohol or a mixture of water and alcohol,

[8] the production method of the above [6], wherein the complex solution of transition metal is one prepared by dissolving a transition metal acetylacetonate in water, an alcohol or a mixture of water and alcohol,

[9] the production method of any of the above [1] to [8], wherein the filler pre-baked to an extent of containing remaining hydrogen is one or two or more selected from the group consisting of petroleum coke, coal coke and carbon black having hydrogen corresponding to the remaining hydrogen beforehand.

[10] the production method of any of the above [1] to [9], wherein the closed vessel made of a heat resistant material is a screw-capped graphite crucible,

[11] a carbon nanotube having an outer diameter of 1 nm to 500 nm and a ratio of a tube thickness to the outer diameter of less than 20%,

[12] a carbon nanotube having laminated carbon hexagonal planes around the tube so as to provide a polygonal cross-section in which the tube is a center.

Effect of the Invention

In the first aspect of the present invention, as mentioned above, the method for producing an artificial graphite material by a simple process as compared with conventional method was invented. By this method, a period of time for production which has been two to three months can be shortened to about one week, productivity is greatly enhanced to enable decrease in cost. In applications to fuel cells and capacitors, in which cost of carbon materials is high, it is expected diffusion is promoted due to decrease in cost.

In the first aspect of the present invention, in order to produce graphite by vapor phase growth, it is possible to design and produce porous and high density graphite materials having ideal crystal structure and crystal size. In addition, it is possible to provide electrode materials having an ideal structure for batteries such as lithium ion batteries and hybrid capacitors utilizing a reaction for generating a graphite intercalation compound because a thin material, in which edge portions of carbon hexagonal planes face toward a plane direction of the material (conventionally in the case of a thin material, carbon hexagonal planes gather on the surface of the material), can be produced. Further, it is possible to produce and provide an ideal material for applications to a diffuser panel for fuel cell where graphite materials having good gas permeability because of proper open pores, high electric conductivity due to high graphite crystallinity, high purity and high strength are required.

Figure 4:
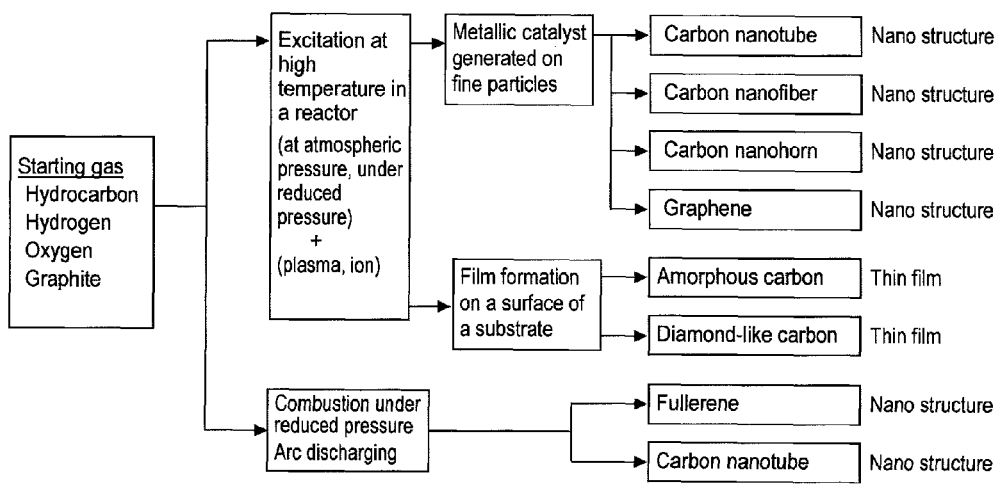
Figure 4:
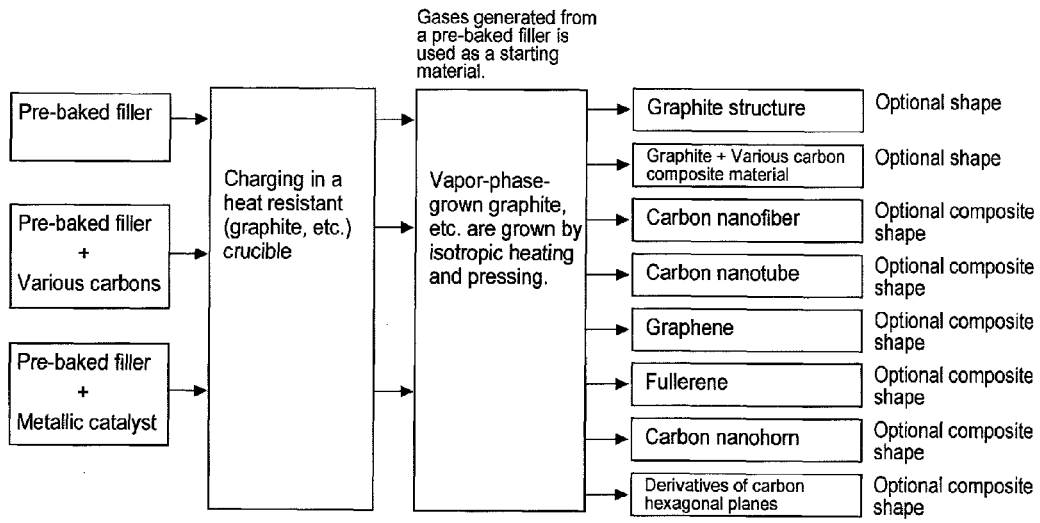

Also, since it is possible to make on a massive scale at a low price a carbon fiber-reinforced carbon material, a carbon fiber-reinforced graphite material, a graphite sheet, a carbon nanotube, a carbon nanofiber, fullerene, a carbon nanohorn, and a composite material thereof, application of these materials is expected to be promoted and enlarged. While carbon nanomaterials, thin films and fibers have been produced by various vapor phase reactions, obtained materials were nano structures and thin films, and in order to form them into optional shapes, separate steps were required. FIG. 4 compares the conventional method for vapor phase growth and the present invention with respect to production processes and obtained shapes.

In the second aspect of the present invention, nanocarbon materials can be produced by a CVD reaction using a general large size HIP equipment and a vessel made of a heat resistant material such as graphite as a reaction vessel, and therefore, productivity is enhanced significantly and materials of low price can be provided. Specifically it becomes possible to charge a starting material of 10 ton/batch in large-scaled HIP equipment being currently available on the market, and production of 5 ton/batch per day at yield of 50% can be obtained.

In addition, it is possible to allow a filler to carry a catalyst for generating a nanocarbon material directly thereon or to carry a nano size catalyst ionized in a solution thereon, and therefore, a nanocarbon material such as CNT of a desired shape having a controlled diameter can be produced with high selectivity.

BRIEF DESCRIPTION OF DRAWINGS (FIG. 1) A diagrammatic view explaining a theory of the present invention.

(FIG. 2) A chart showing that the number of steps of the present invention is very small by comparing a conventional production process of artificial graphite with one example of the production process of the present invention.

(FIG. 3) A graph showing a comparison of a period of time required for production between conventional artificial graphite and one example of the present invention.

(FIG. 4) A chart showing comparison between the production method of conventional vapor-phase-grown graphite and carbon hexagonal plane derivative and the production method of the present invention as well as shapes obtained therefrom.

(FIG. 5) A photograph showing an appearance of one example of a pre-baked filler in the form of fine powder.

(FIG. 6) A photograph showing appearances of a graphite crucible to be used at hot isostatic pressing treatment and an obtained vapor-phase-grown graphite structure.

(FIG. 7) A photograph showing a cross-section of a vapor-phase-grown graphite structure. Herein the portions A indicate graphite vapor-phase-grown between the starting particles (a porous layer is being formed), the portions B indicate graphite vapor-phase-grown in the starting particles, and the portion C indicates a carbonaceous material on an outer surface of the starting particle (shell) (here, the carbonaceous material includes carbide, glassy carbon and hardly-graphitizable carbon, and the like, but does not include graphite substantially). The total length of a scale is 10 μm.

(FIG. 8) An electron microscope photograph of the pre-baked filler of Example 1 (phenol resin powder heat-treated at 750° C.). The total length of a scale is 10 μm.

(FIG. 9) A photograph showing an appearance of the vapor-phase-grown graphite structure obtained in Example 1.

(FIG. 10) An electron microscope photograph of the broken surface of the vapor-phase-grown graphite structure obtained in Example 1. The total length of a scale is 50 μm.

(FIG. 11) An electron microscope photograph of the vapor-phase-grown graphite structure obtained in Example 1, showing graphite and carbon hexagonal plane derivative generated between the particles. The total length of a scale is 10 µm.

(FIG. 12) An electron microscope photograph of the vapor-phase-grown graphite structure obtained in Example 1. The total length of a scale is 10 µm.

(FIG. 13) A laser Raman spectrum of vapor-phase-grown graphite portion generated between the starting particles in the vapor-phase-grown graphite structure obtained in Example 1. This indicates that crystallinity is very high.

(FIG. 14) A laser Raman spectrum of the outer surface portion (shell) of the starting particles of the vapor-phase-grown graphite structure obtained in Example 1. This indicates that the peak at 1360 kayser is very high and this portion has a structure being similar to that of glassy carbon or hardly-graphitizable carbon.

Figure 15:
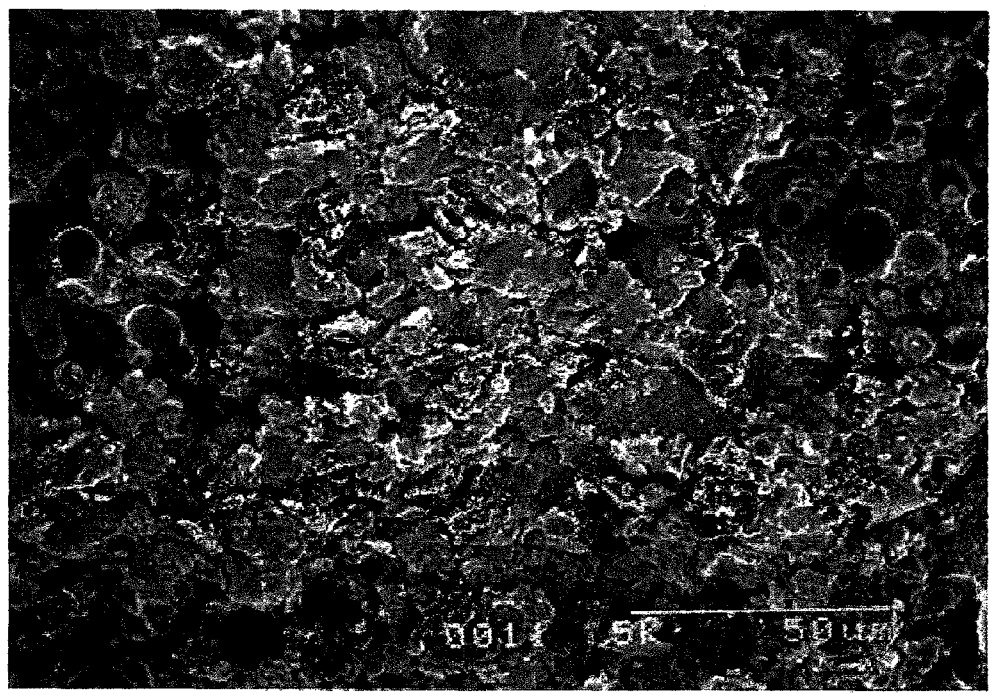

(FIG. 15) An electron microscope photograph of the surface of the vapor-phase-grown graphite structure obtained in Example 1, in which the surface was traced with a bamboo spatula. This indicates that the structure easily slides in a plane direction due to being a graphite structure and is deformed and that the structure is a material having high crystallinity. The total length of a scale is 50 µm.

(FIG. 16) An electron microscope photograph of the vapor-phase-grown graphite generated around the filler and obtained in Example 1. The total length of a scale is 10.0 µm.

Figure 16:
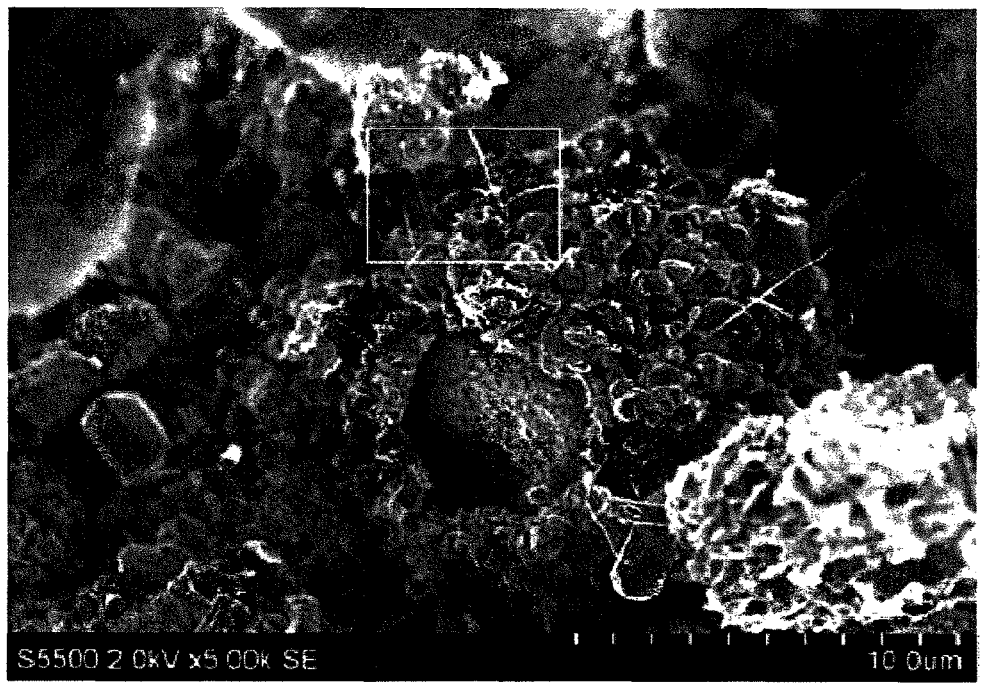
Figure 17:

(FIG. 17) A high magnification (25000×) electron microscope photograph of the portion (indicated by numeral 1) enclosed with a rectangular in FIG. 16. A number of carbon tubes of nano size were observed. The total length of a scale is 2.00 µm.

(FIG. 18) An electron microscope photograph of the vapor-phase-grown graphite generated around the filler and obtained in Example 1. The total length of a scale is 10.0 µm.

Figure 18:

(FIG. 19) A high magnification (25000×) electron microscope photograph of the portion (indicated by numeral 2) enclosed with a rectangular in FIG. 18. A number of pencil-like vapor-phase-grown graphites of micron size having a polygonal cross-section and grown in the form of long and narrow rod were observed. The total length of a scale is 2.00 µm.

(FIG. 20) An electron microscope photograph of the vapor-phase-grown graphite generated inside the filler and obtained in Example 1. The total length of a scale is 10.0 µm.

Figure 20:
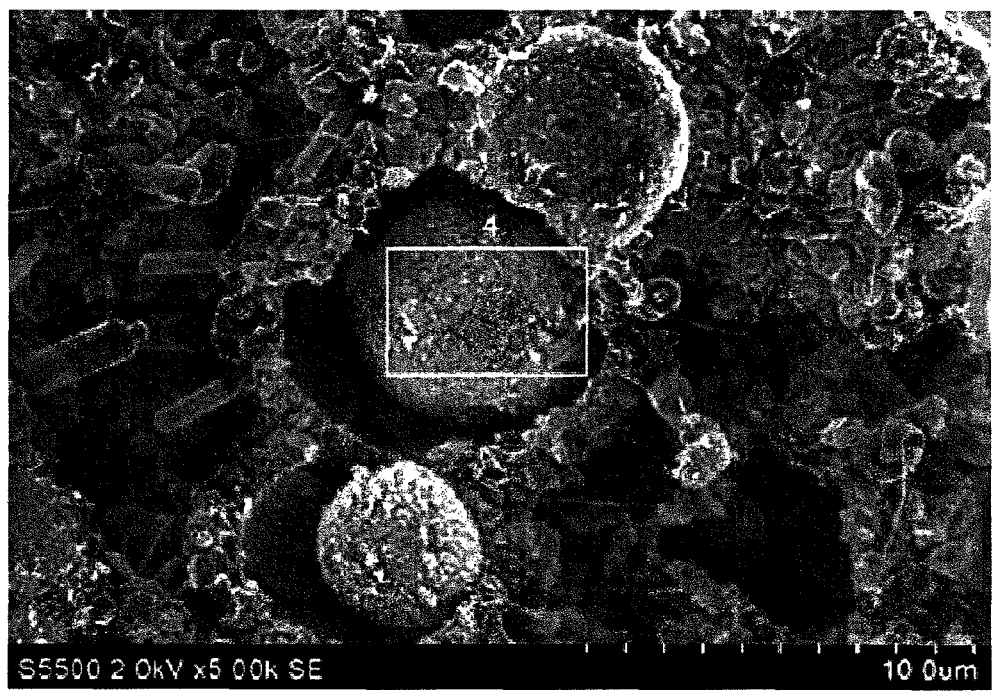

(FIG. 21) A high magnification (25000×) electron microscope photograph of the portion (indicated by numeral 4) enclosed with a rectangular in FIG. 20. The total length of a scale is 2.00 µm.

Figure 21:
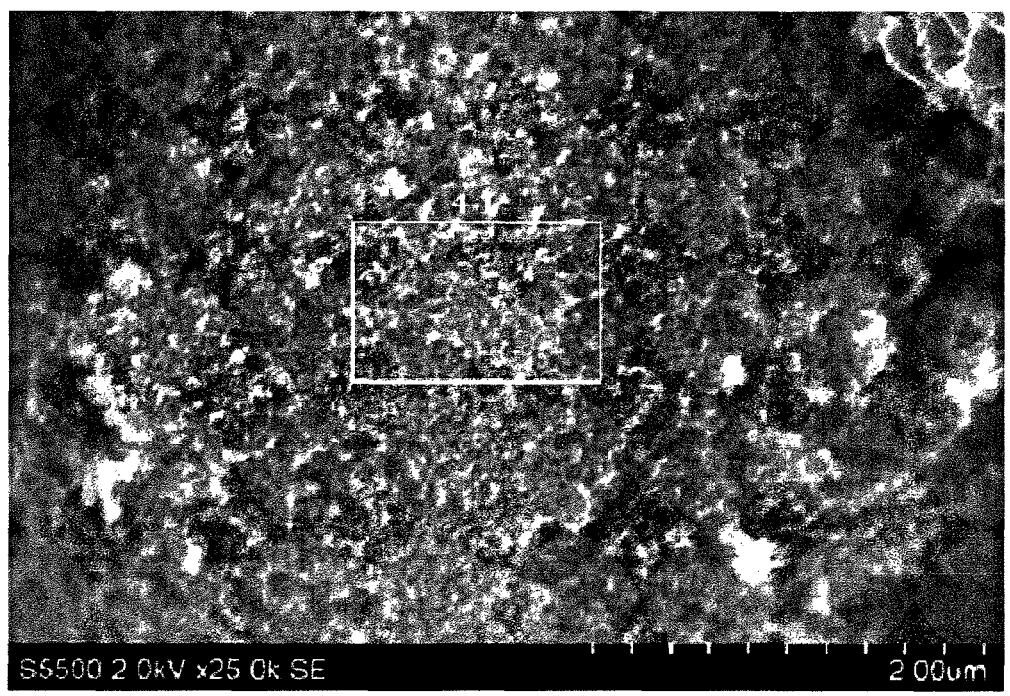
Figure 80:
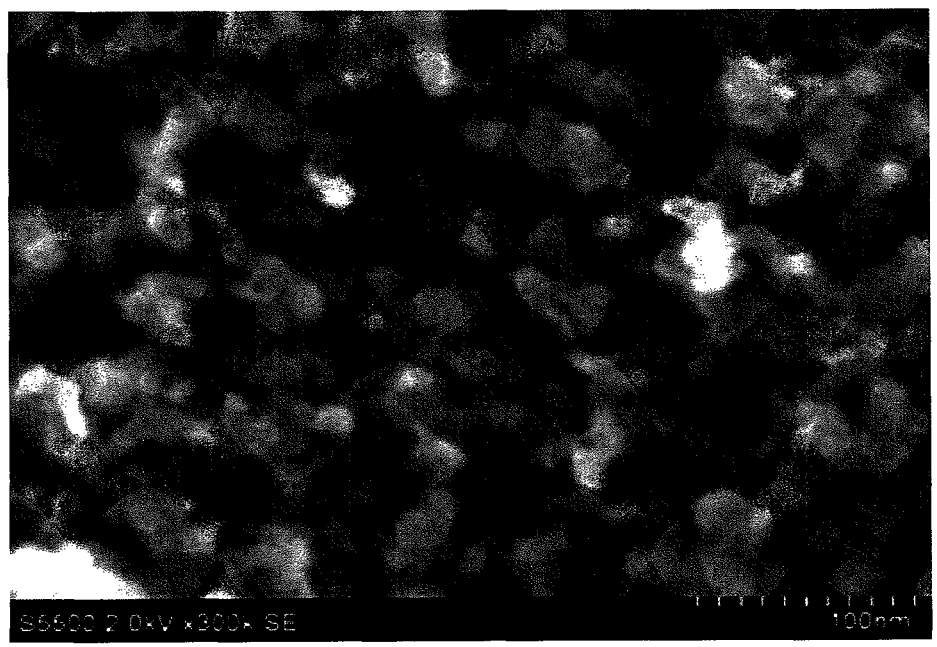
Figure 81:
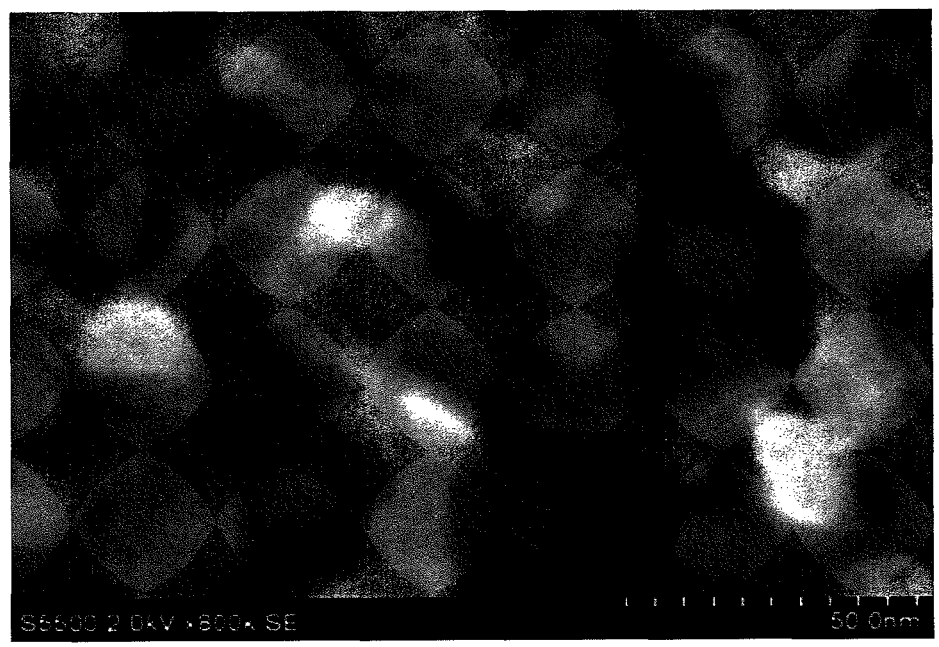

(FIG. 22) A high magnification (100000×) electron microscope photograph of the portion (indicated by numeral 4-1) enclosed with a rectangular in FIG. 21. This portion has a structure comprising about 10 nm spheroids and several tens nanometer cavities. The total length of a scale is 500 nm. A higher magnification (300000×) electron microscope photograph of this photograph is shown in FIG. 80, and a further higher magnification (800000×) electron microscope photograph thereof is shown in FIG. 81.

Figure 23:
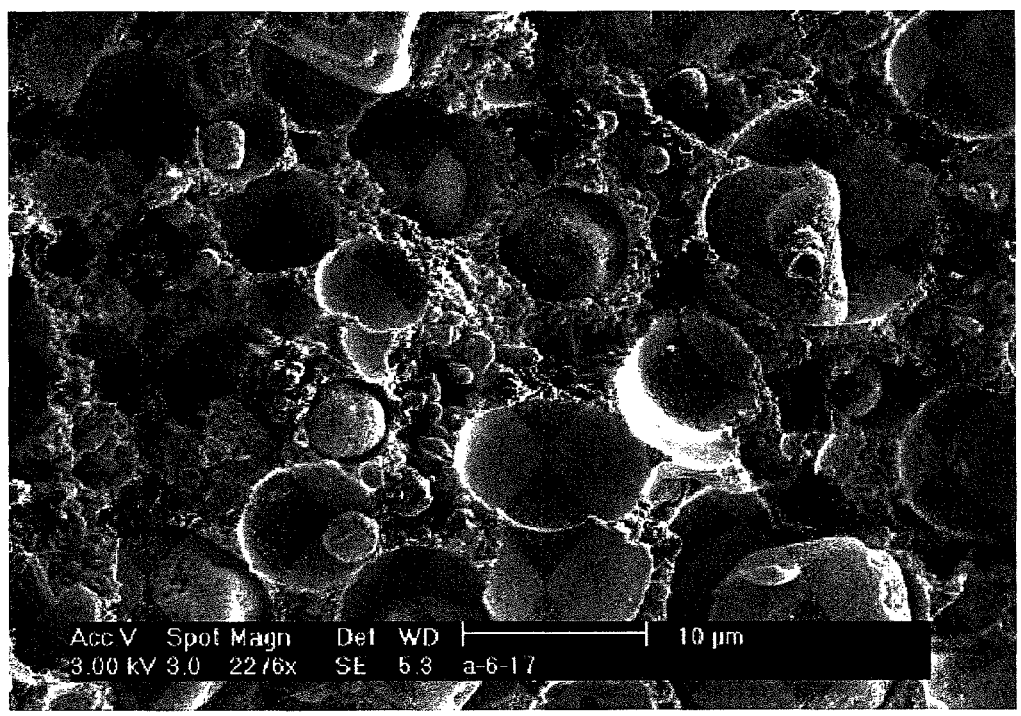

(FIG. 23) A scanning electron microscope (SEM) photograph of the broken surface of the vapor-phase-grown graphite generated in Example 10. This indicates that the vapor-phase-grown graphite A is in a state etched with hydrogen as compared with Example 1 shown in FIG. 11.

Figure 24:

(FIG. 24) A SEM photograph of the product generated in Example 10. This indicates that the carbon hexagonal planes grown in the form of like pencil around CNT are in a state etched with hydrogen (being similar to CNT generated in Example 13).

Figure 25:
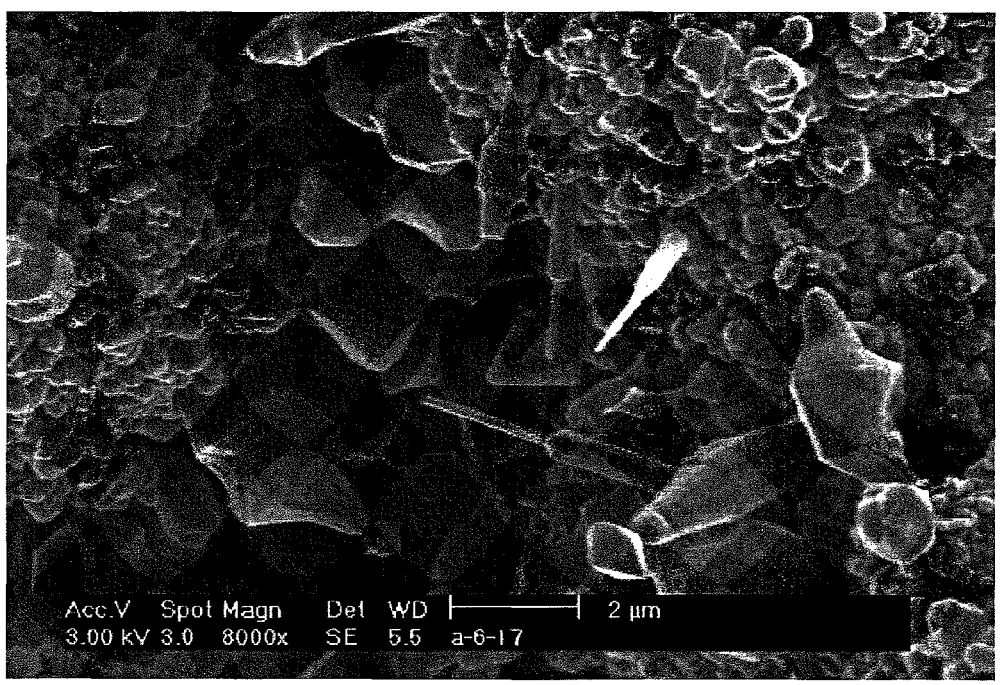

(FIG. 25) A SEM photograph of the product generated in Example 10. This indicates that the various products are in a state etched with hydrogen (being similar to ones generated in Example 13).

(FIG. 26) Vapor-phase-grown graphites in the form of fiber generated in Example 10 and existing on top of a sample.

Figure 26:
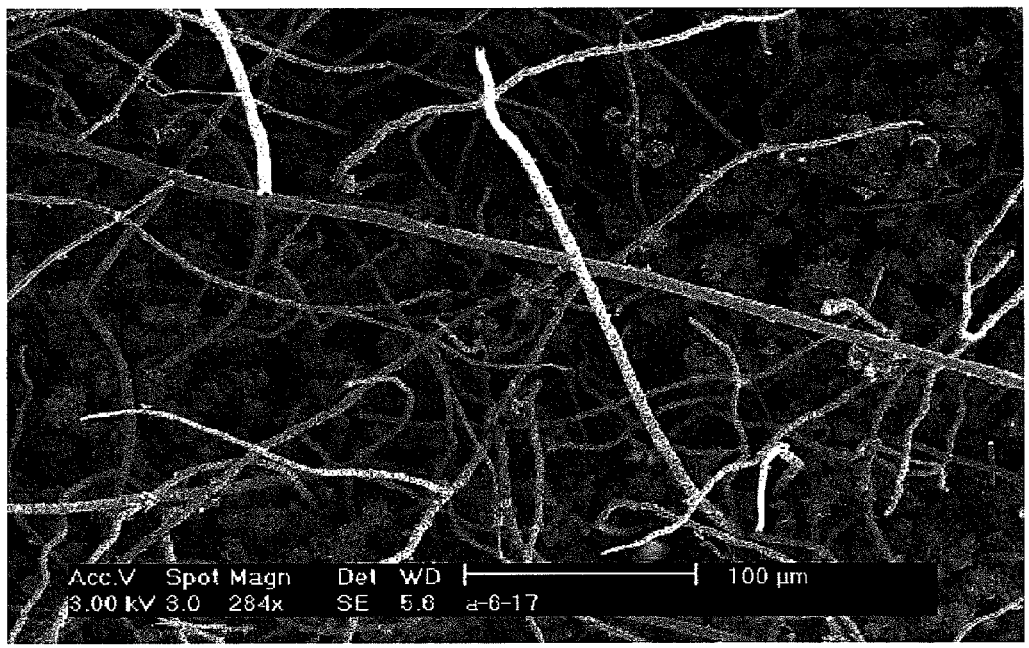
Figure 27:
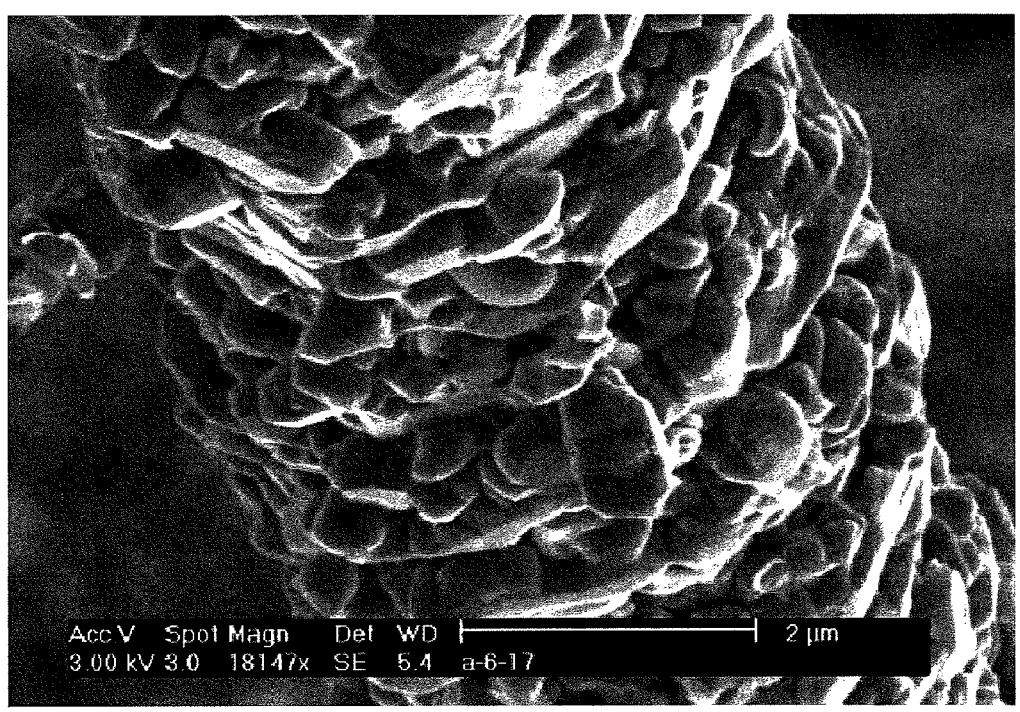

(FIG. 27) An enlarged view of FIG. 26 indicating that a number of vapor-phase-grown graphites are connected to each other to be formed into a fiber.

Figure 28:
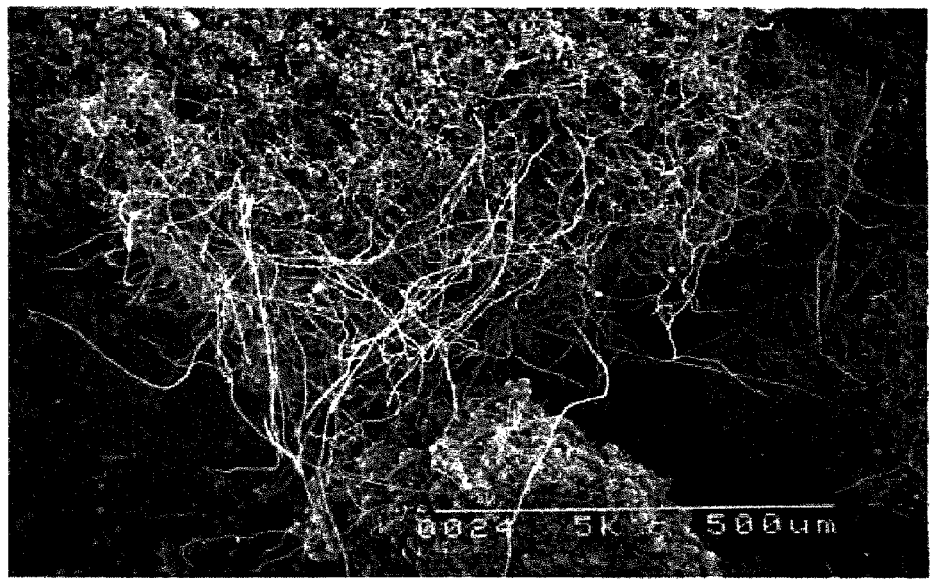

(FIG. 28) A view showing a state that graphite fibers generated in Example 10 are growing from the vapor-phase-grown graphites in a spherical form.

Figure 29:
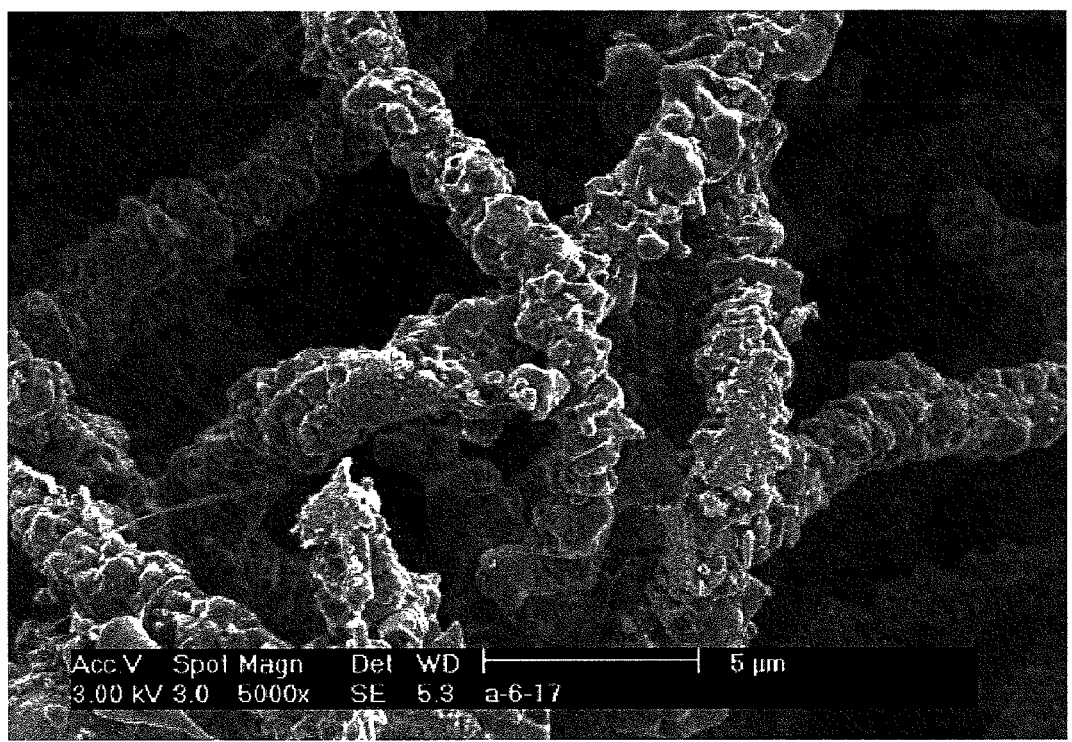

(FIG. 29) A SEM photograph of the graphite fibers generated in Example 10 and existing in a sample. The graphite fibers are the same as those in FIGS. 26 and 27, but are etched with hydrogen.

Figure 30:
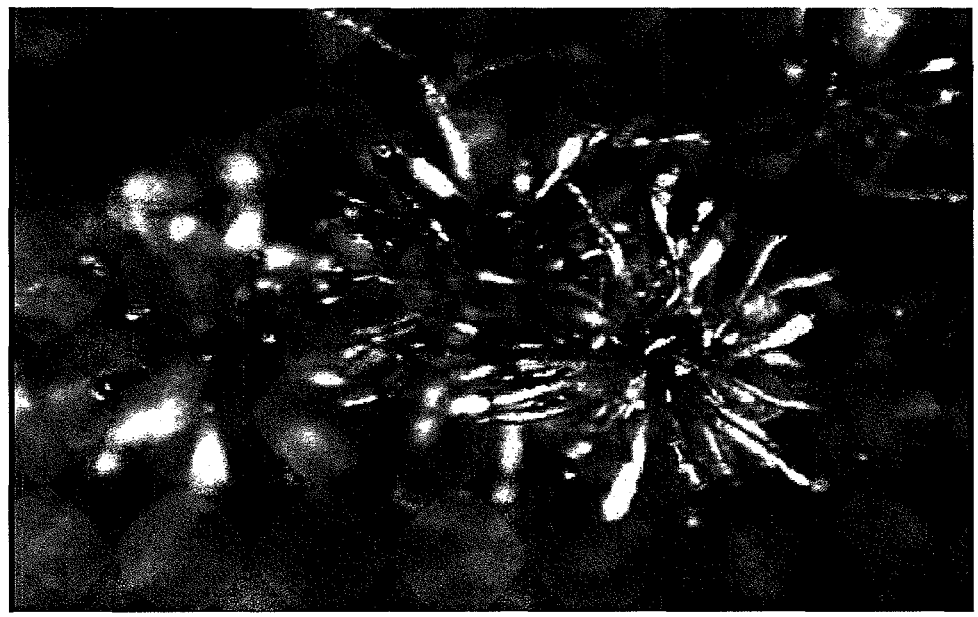

(FIG. 30) A still image taken by CCD camera of rod-like continuous graphite generated by deposition on an inside wall of a graphite crucible in Example 10.

(FIG. 31) A SEM photograph of rod-like continuous graphites generated by deposition on an inside wall of a graphite crucible in Example 10, and there is a white spherical portion at the tip of the rod-like graphite.

Figure 31:
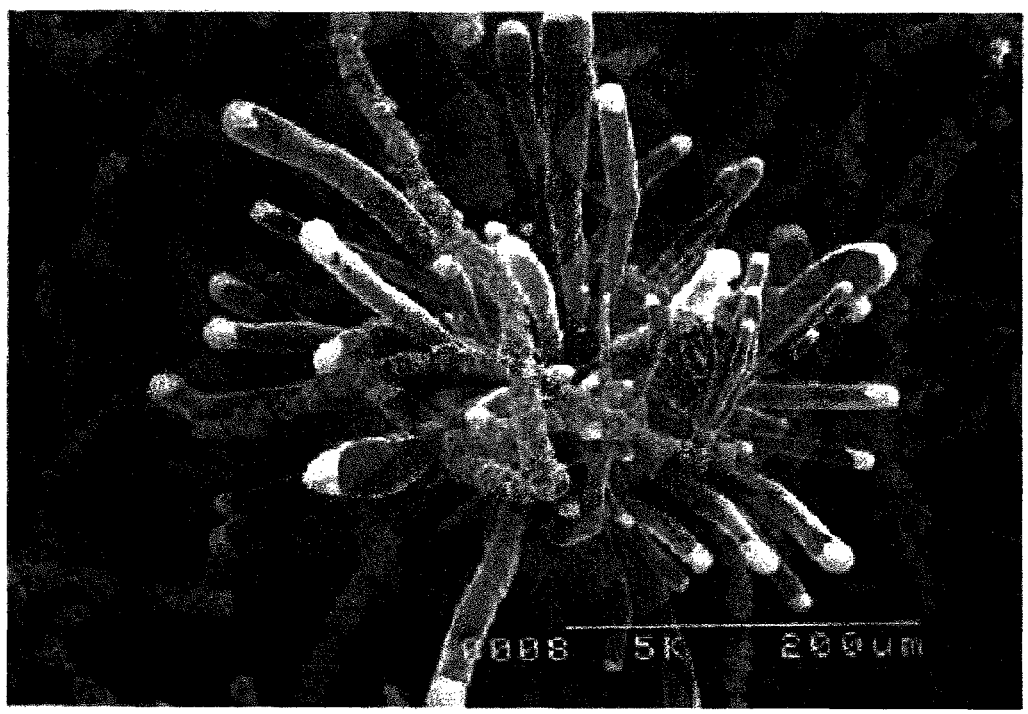

(FIG. 32) A SEM photograph showing generation of a number of rod-like continuous graphites shown in FIG. 31.

Figure 32:
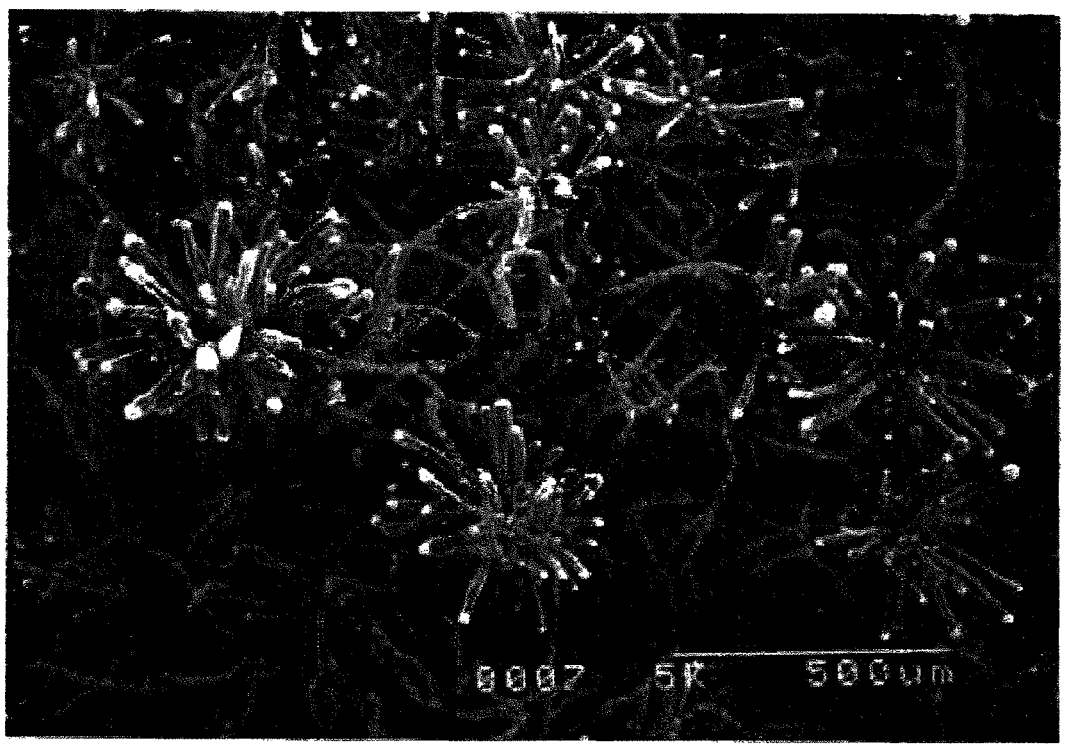

(FIG. 33) A fluorescent X-ray diagram of elements existing at a tip of the rod-like graphites shown in FIGS. 31 and 32. Si, S, Ba, Ca and Fe are detected.

(FIG. 34) A SEM photograph of the vapor-phase-grown graphites generated in Example 11.

(FIG. 35) A SEM photograph of a fibrous product in the form of connection of triangular pyramid and generated in Example 11.

Figure 35:
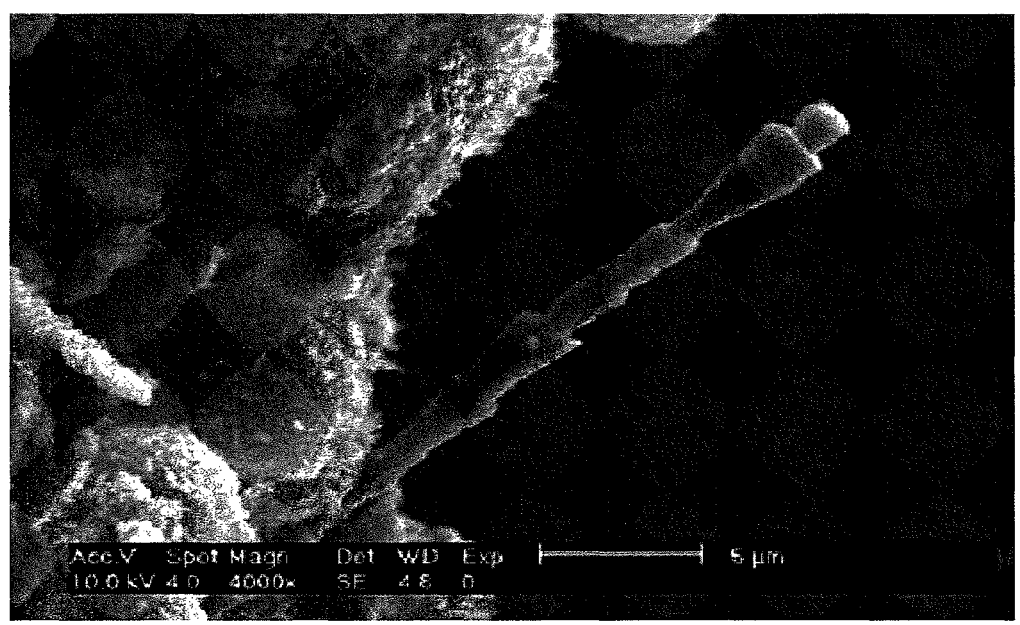

(FIG. 36) An enlarged view of FIG. 35.

(FIG. 37) A SEM photograph of the vapor-phase-grown graphites generated in Example 12.

(FIG. 38) A SEM photograph of the vapor-phase-grown graphite fibers generated in Example 12.

Figure 38:
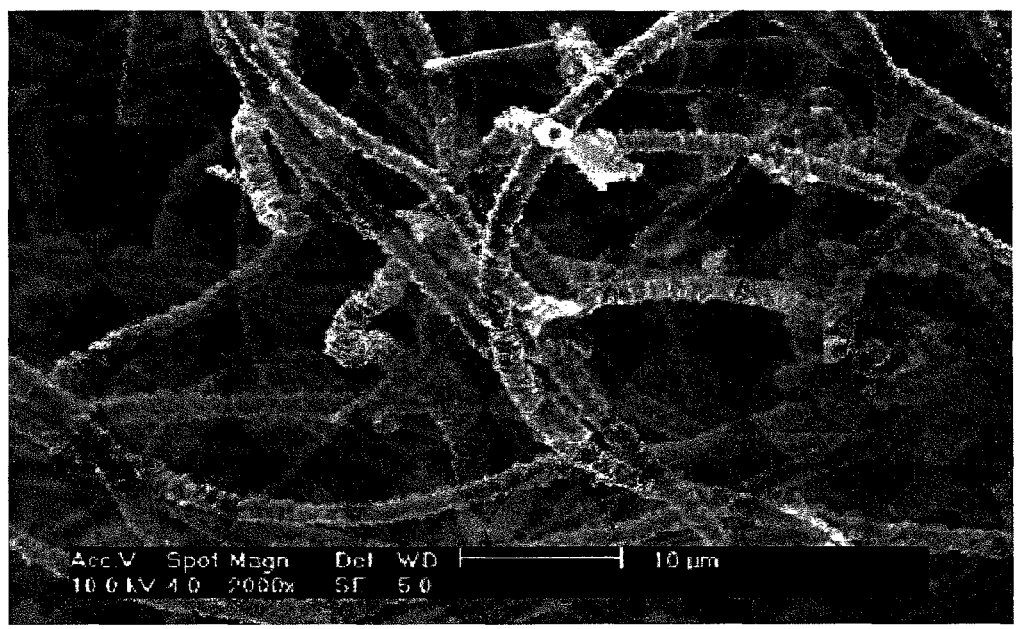

(FIG. 39) An enlarged view of FIG. 38.

(FIG. 40) A diagrammatic cross-sectional view showing a structure of a graphite crucible in the embodiment of the present invention.

(FIG. 41) A SEM photograph of the CNT having high linearity generated in Example 13.

(FIG. 42) A transmission electron microscope (TEM) photograph of the CNT generated in Example 13, which indicates that the CNT is of a hollow structure and has high linearity.

Figure 43:
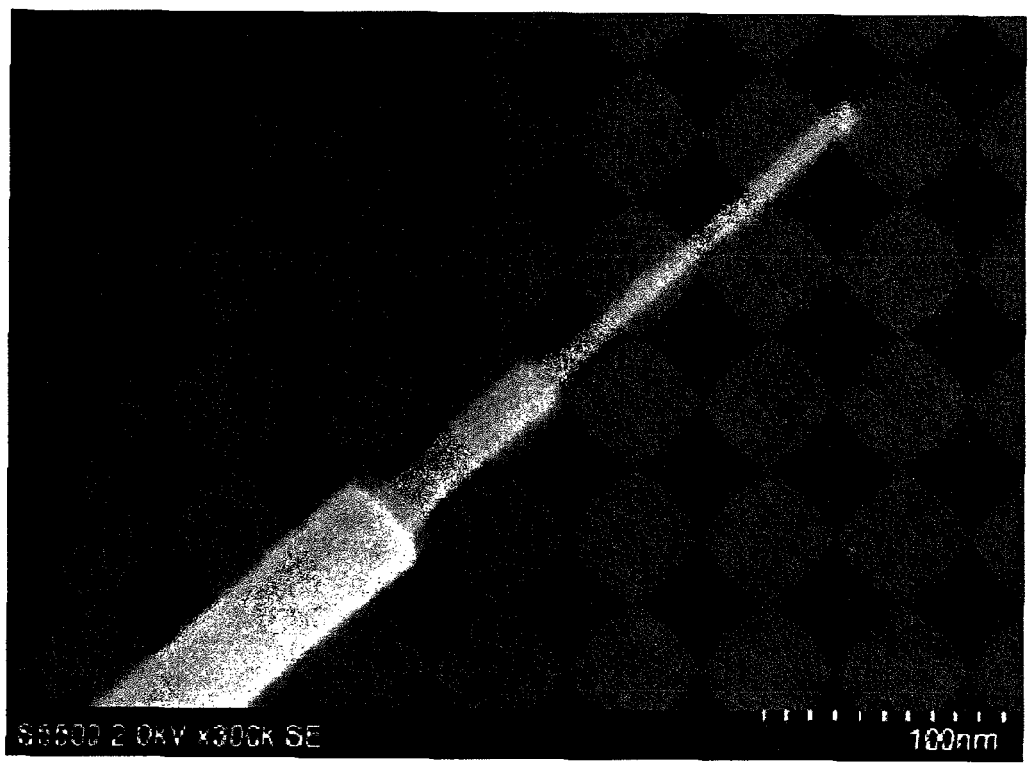

(FIG. 43) A SEM photograph of the tip portion of the CNT generated in Example 13, which indicates that the CNT has a multi-layer structure.

(FIG. 44) A SEM photograph of a carbon material having a novel structure generated in Example 13, in which carbon hexagonal planes are laminated around the CNT and grown in the form of like pencil. The carbon material is a hollow one having a polygonal cross-section, and a tip portion thereof is in the form of polygonal pyramid.

Figure 44:
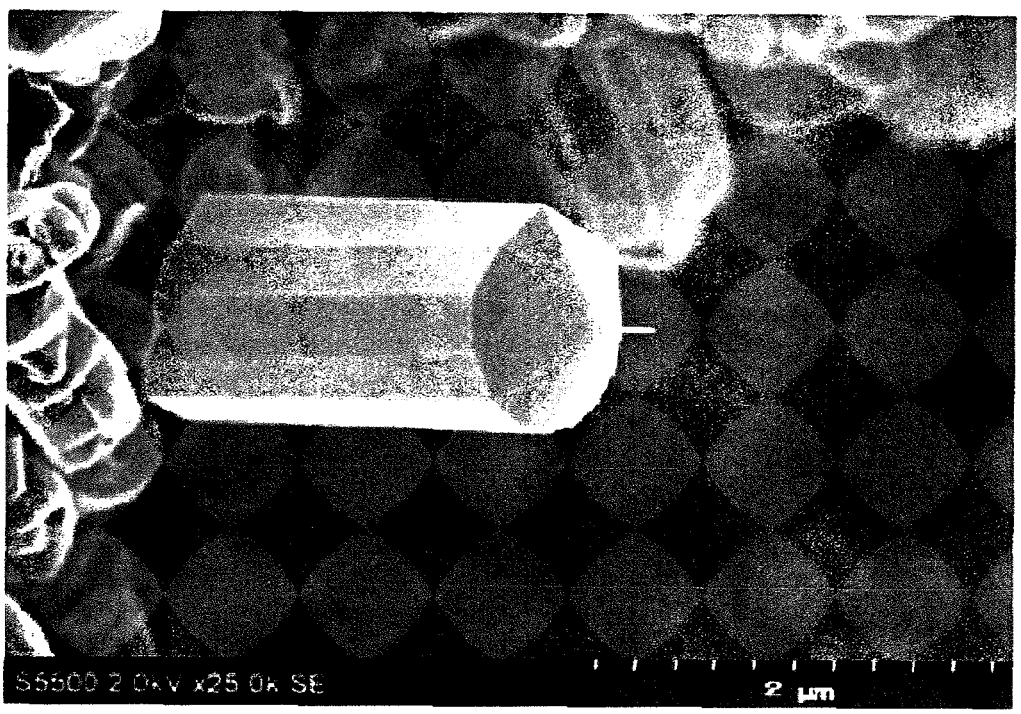

(FIG. 45) An enlarged view of FIG. 44, which indicates a structure having multi-layers laminated around CNT.

(FIG. 46) A transmission electron microscope (TEM) photograph of a carbon material having a novel structure generated in Example 13, in which carbon hexagonal planes are laminated around the CNT and grown in the form of like pencil. It can be confirmed that the carbon material has a hollow.

(FIG. 47) A SEM photograph of the CNT generated in Example 14, which indicates that the CNT being excellent in linearity and having an outer diameter of about 10 nm to about 50 nm is slightly generated.

(FIG. 48) A SEM photograph showing that the hose-like CNT of Example 16 is generated around the pre-baked starting material.

Figure 48:
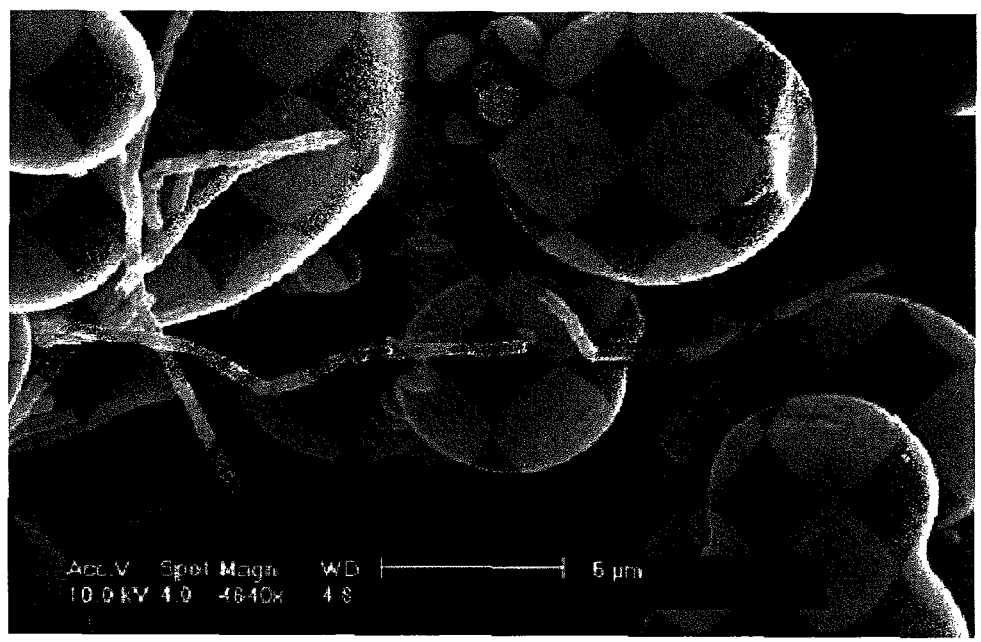

(FIG. 49) A SEM photograph of the tip portion (opening) of the hose-like CNT of FIG. 48, which indicates a feature such that the thickness of the CNT is quite thin compared to the diameter thereof and the CNT is long.

(FIG. 50) A SEM photograph of the tip portion (opening) of the CNT having an elliptical cross-section generated in Example 16.

Figure 51:
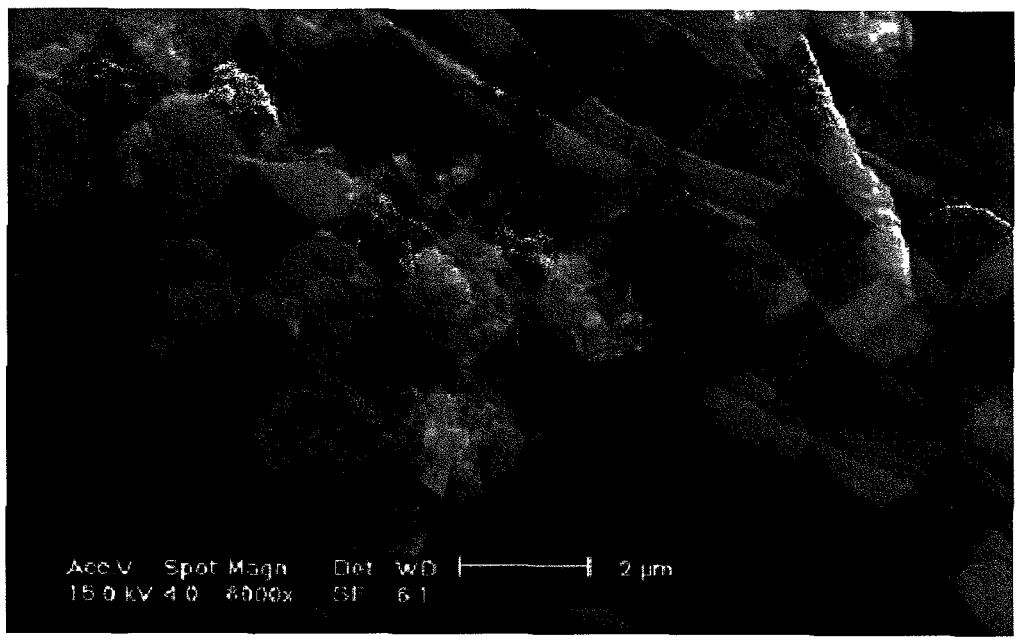

(FIG. 51) A SEM photograph of the carbon nanohorn-stacked CNF generated in Example 17. A number of fibrous products grown in the form of connection of triangular pyramid are observed.

Figure 52:
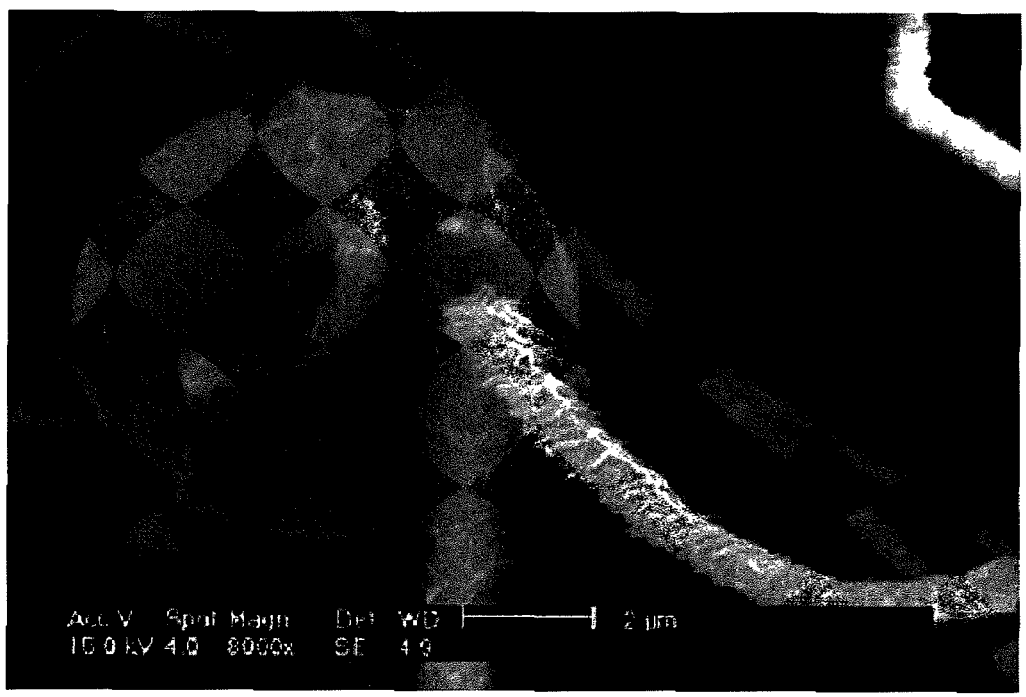

(FIG. 52) A SEM photograph of a graphene-laminated CNF generated in Example 17, which indicates that a number of graphene sheets are laminated to be grown in the form of fiber.

(FIG. 53) A SEM photograph of a cup-stacked type CNF and a screw type CNF generated in Example 17.

(FIG. 54) A SEM photograph of radially grown CNT and a graphene-laminated CNF generated in Example 18.

Figure 54:
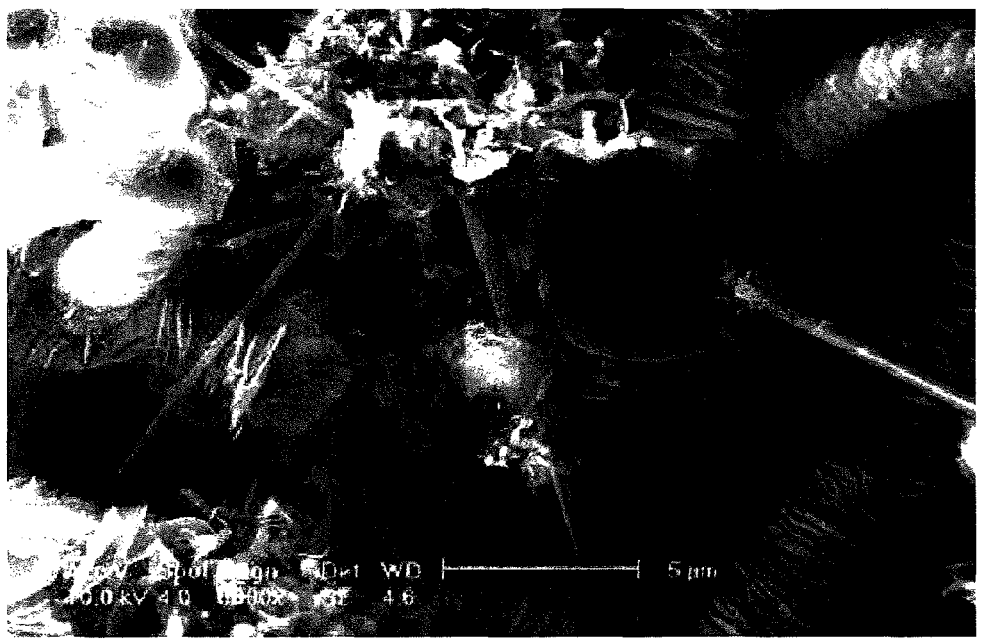

(FIG. 55) A SEM photograph of higher magnification of the graphene-laminated CNF shown in FIG. 54.

(FIG. 56) A SEM photograph of the CNT generated in Example 19.

Figure 56:
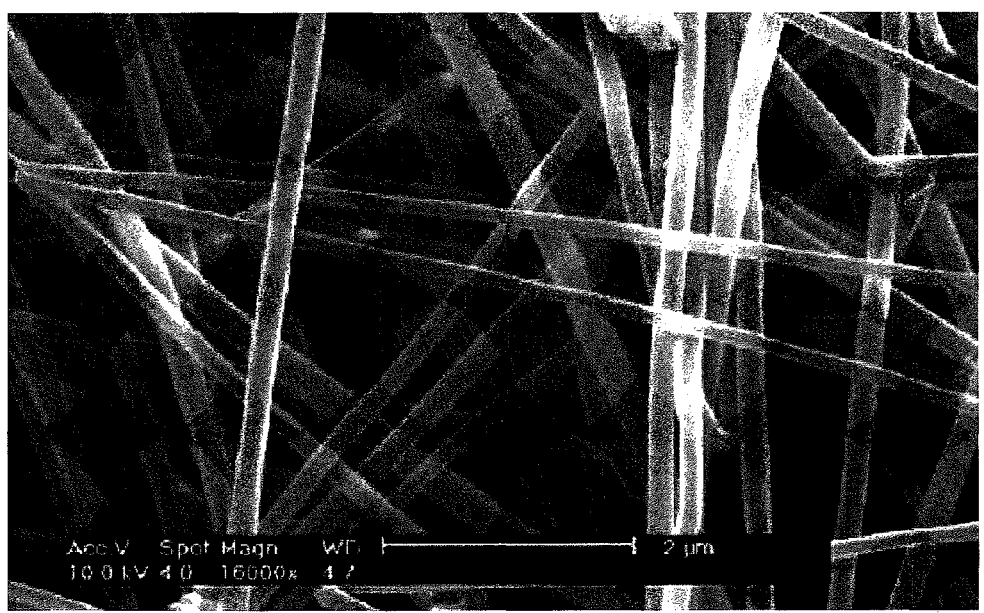
Figure 57:
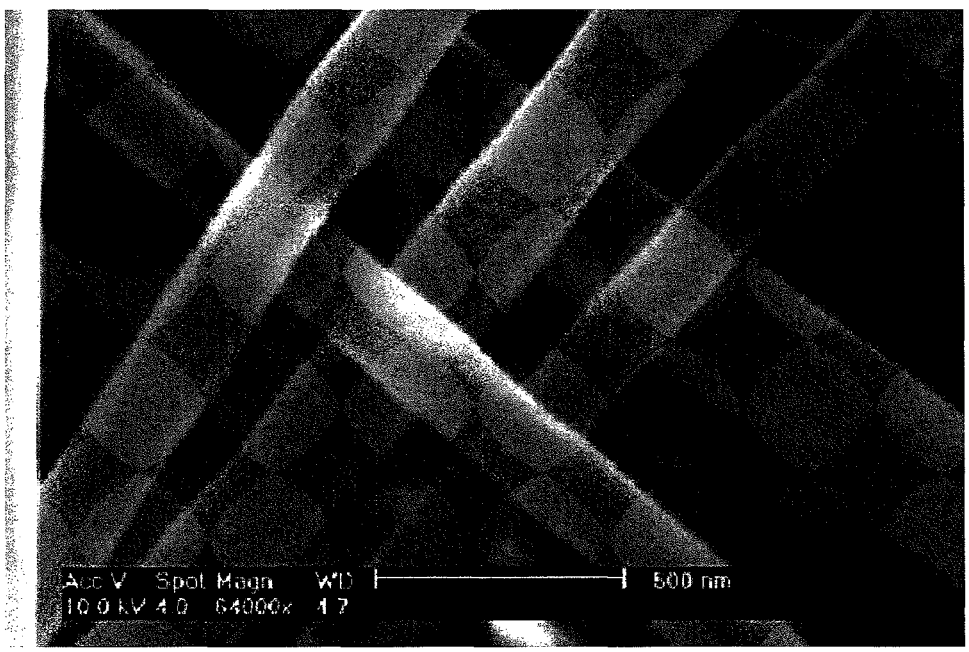

(FIG. 57) A higher magnification SEM photograph of FIG. 56.

Figure 58:
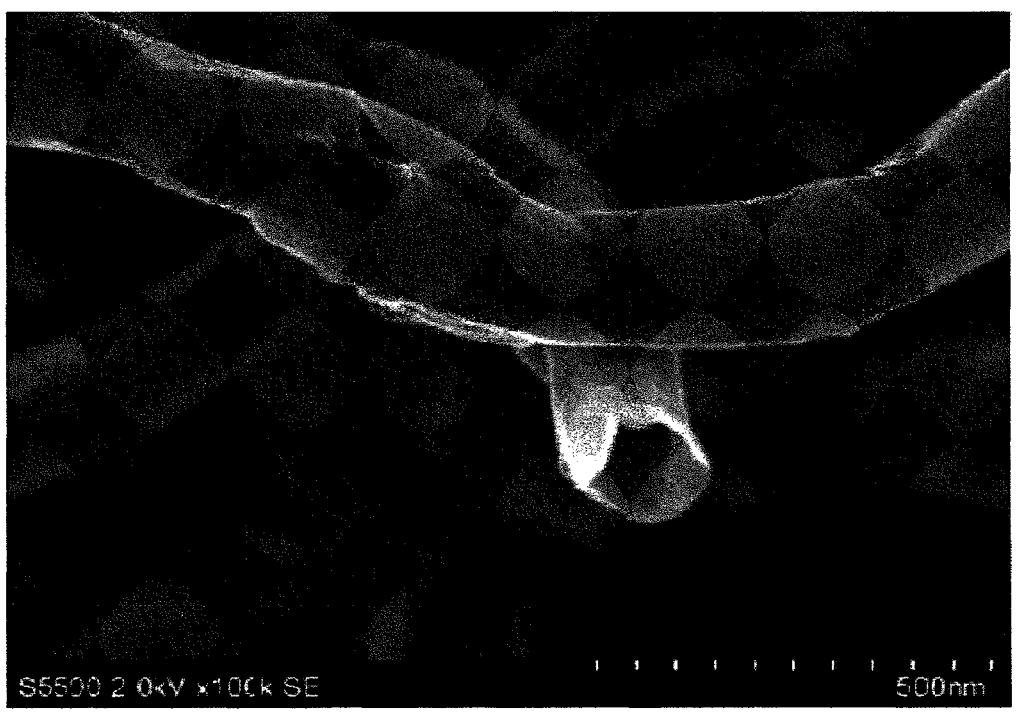

(FIG. 58) A higher magnification SEM photograph of the CNT generated in Example 19.

Figure 59:
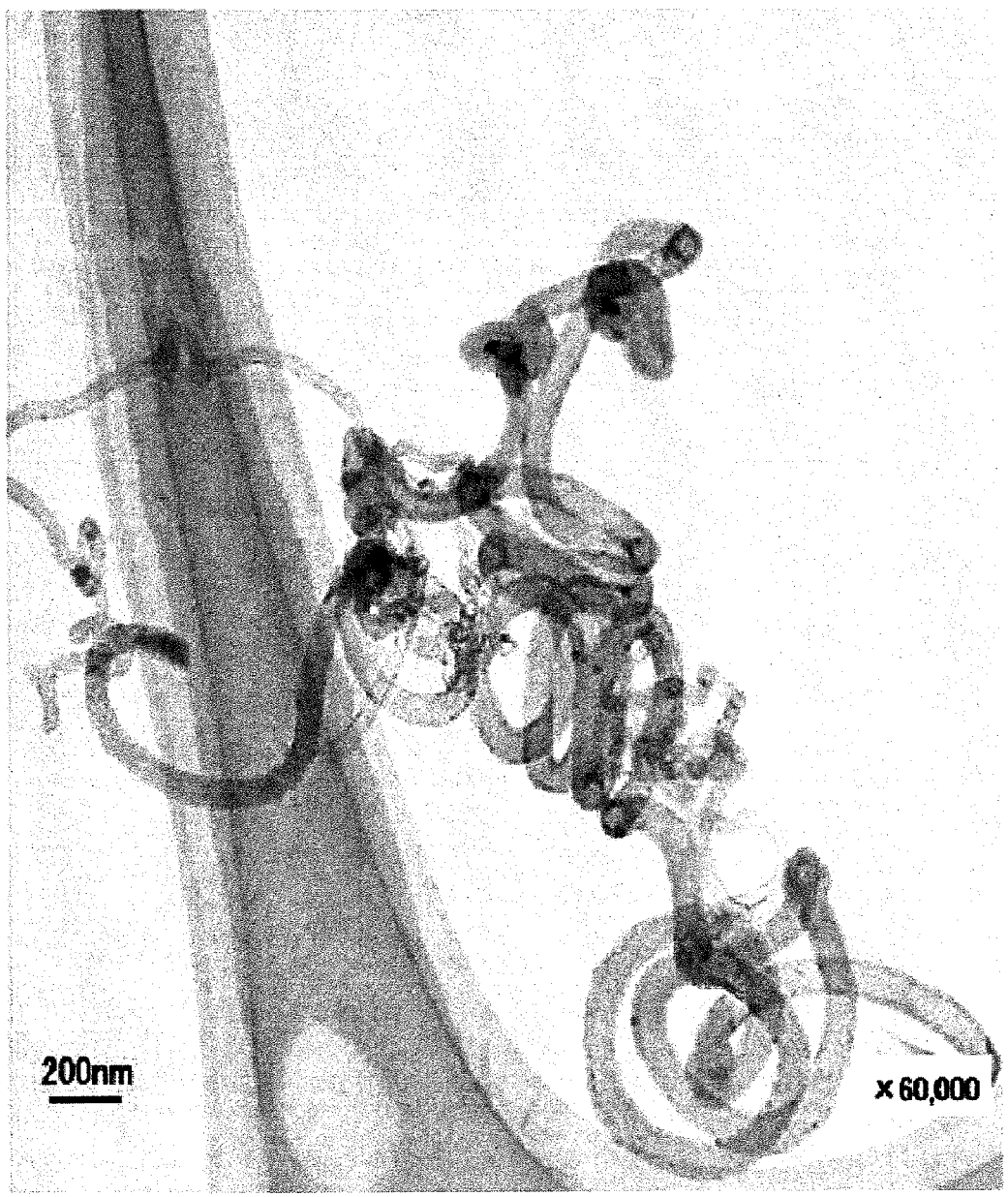

(FIG. 59) A TEM photograph of the CNT generated in Example 19.

(FIG. 60) A fluorescent X-ray map of Co of generated CNT portion, and white points indicate presence of Co.

(FIG. 61) A fluorescent X-ray peak of the end portion of CNT generated in Example 19, in which Co is detected.

(FIG. 62) A TEM photograph of the CNT generated in Example 19, which indicates that the thickness of the tube is about 24 nm and the inner diameter thereof is about 145 nm.

Figure 62:
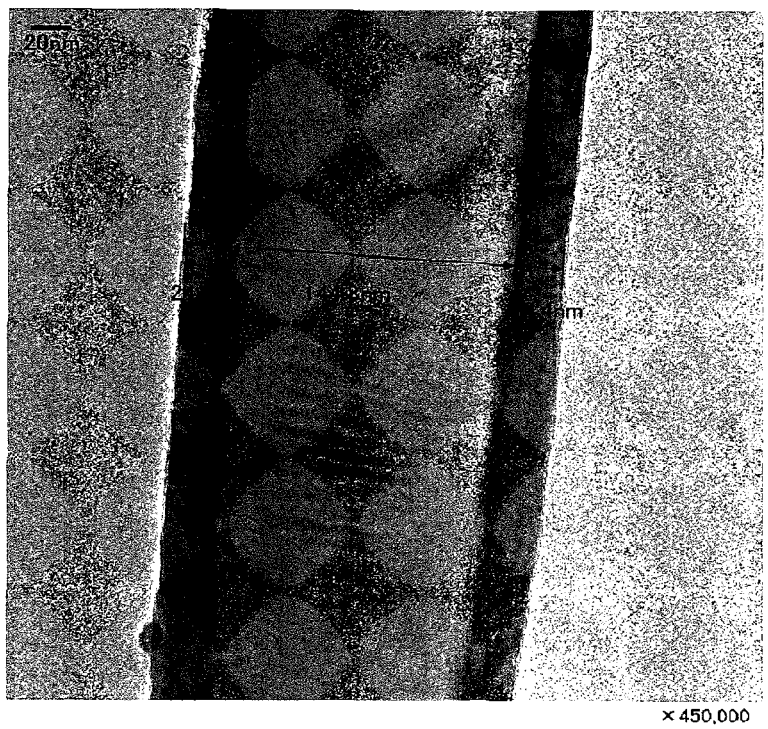

(FIG. 63) A TEM photograph showing that graphene layers are laminated in the thickness direction of the CNT of FIG. 62 (lattice fringe image).

(FIG. 64) A TEM photograph of the CNT obtained in Example 23, which indicates that the thickness of the tube is about 14 nm and the inner diameter thereof is about 14 nm.

(FIG. 65) A SEM photograph of the sample obtained in Example 22.

(FIG. 66) A SEM photograph of the CNT obtained in Example 23.

Figure 66:
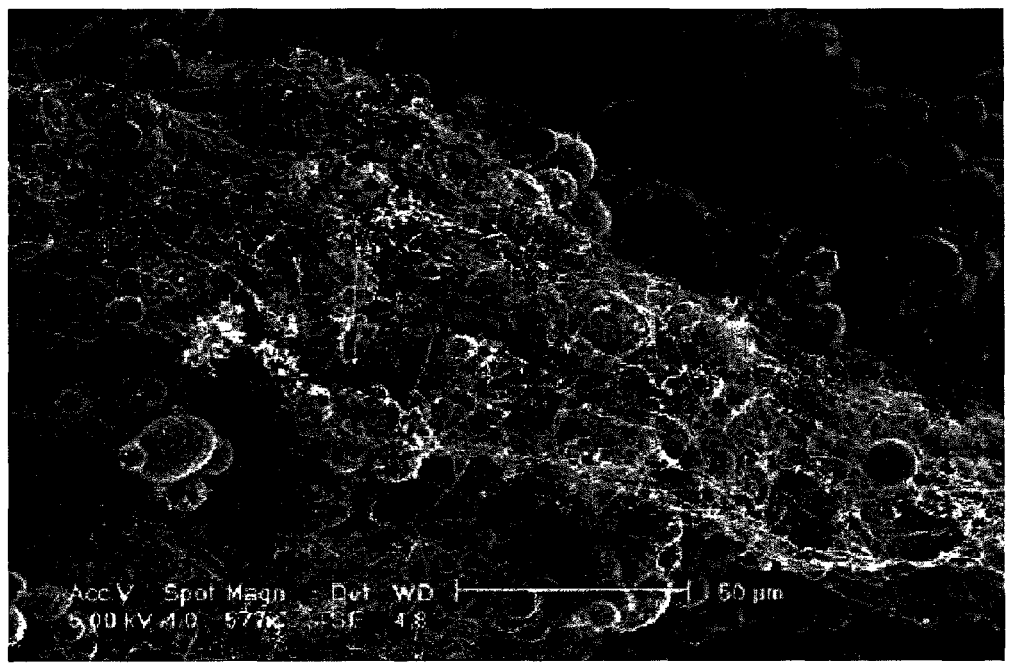

(FIG. 67) A higher magnification SEM photograph of FIG. 66.

(FIG. 68) A TEM photograph of the CNT obtained in Example 23.

(FIG. 69) A TEM photograph of the CNT obtained in Example 23. It can be considered that the circle inside the CNT is fullerene, which indicates that the CNT is a fullerene-incorporated CNT.

(FIG. 70) A SEM photograph of a large amount of CNT generated in Example 25.

(FIG. 71) A SEM photograph of a cup-stacked type CNF and a screw type CNF generated in Example 25.

Figure 71:
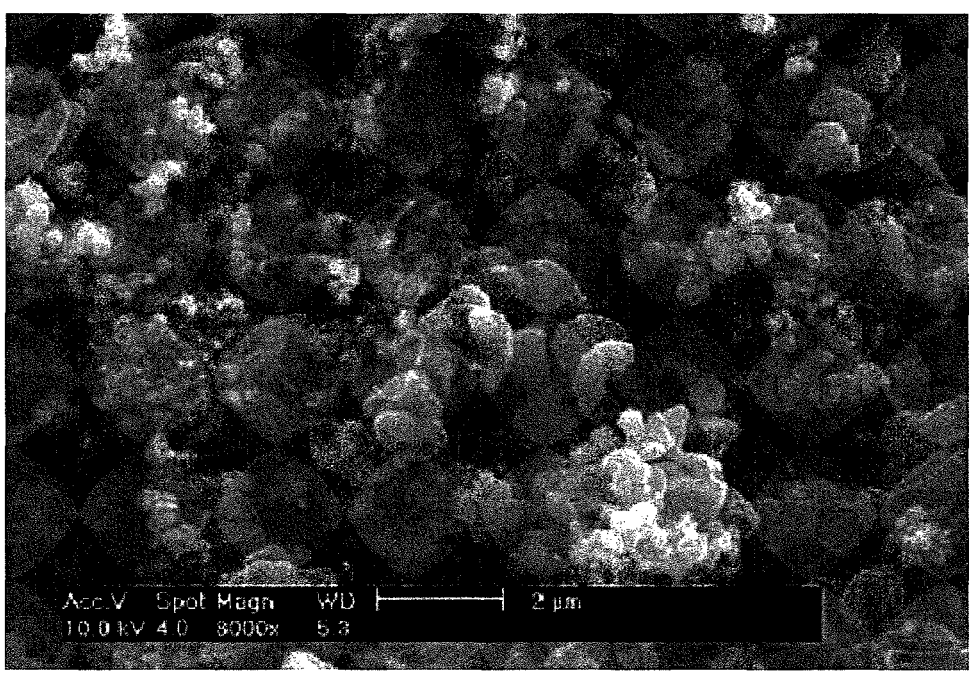

(FIG. 72) An enlarged photograph of FIG. 71.

(FIG. 73) An X-ray diffraction pattern of a sample after the treatment in Example 25. A strong peak around 26.5° showing a graphite structure is observed.

(FIG. 74) A SEM photograph of a surface of a sample after the treatment in Example 26.

Figure 74:
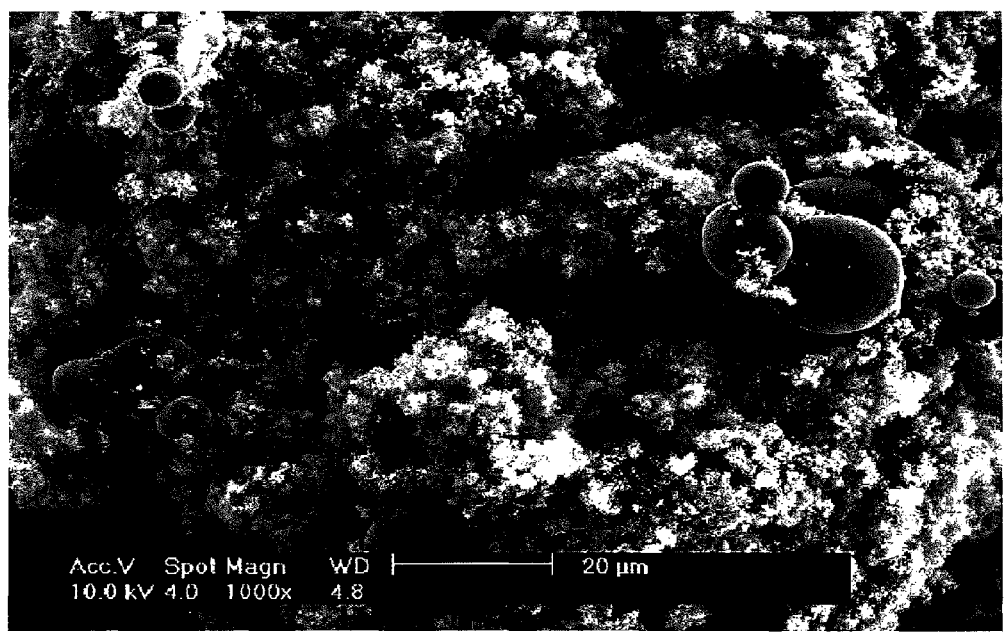

(FIG. 75) An enlarged photograph of a cluster portion of FIG. 74.

(FIG. 76) A SEM photograph of the CNT obtained in Example 16.

Figure 76:
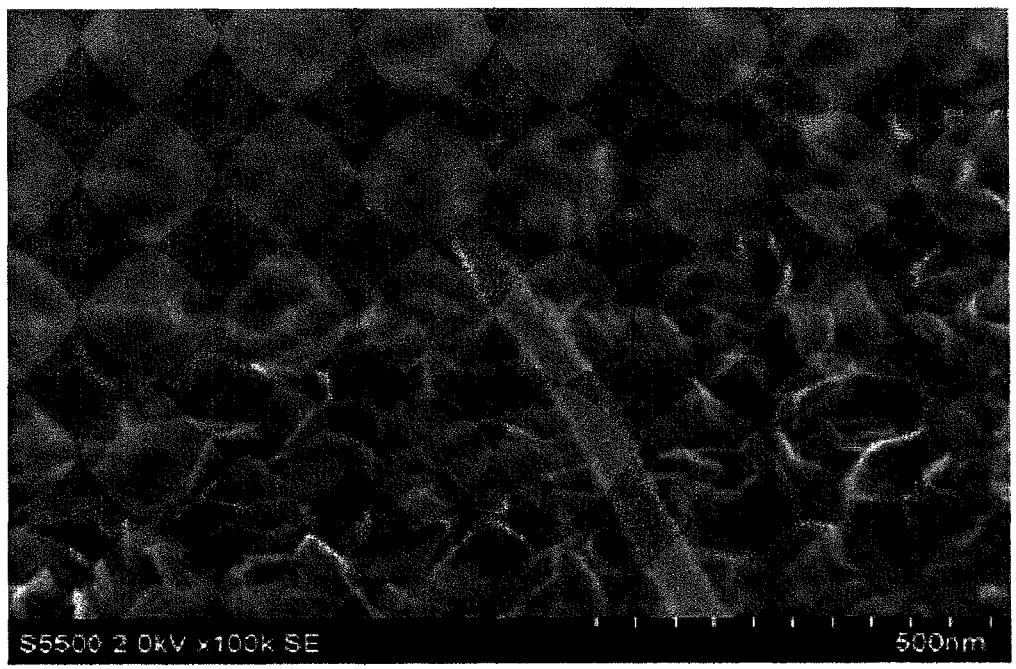

(FIG. 77) A fluorescent X-ray peak of the CNT portion of FIG. 76.

(FIG. 78) A cross-sectional view of a structure of a graphite crucible relating to one embodiment of the present invention, in which all of the top, bottom and side of the pre-baked starting material 3 are covered with spacers and a sleeve.

(FIG. 79) A laser Raman spectrum of a graphite portion vapor-phase-grown in the starting particle in the vapor-phase-grown graphite structure obtained in Example 1. It is indicated that graphite crystallinity is very high.

Figure 22:
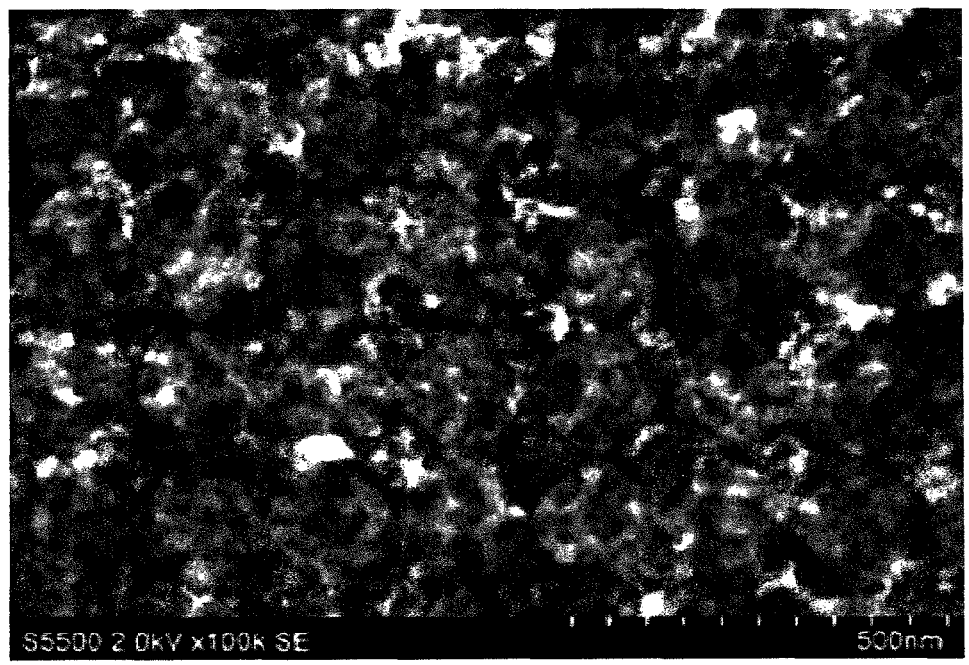

(FIG. 80) An electron microscope photograph of high magnification (300000×) of FIG. 22. The total length of a scale is 100 nm.

(FIG. 81) An electron microscope photograph of high magnification (800000×) of FIG. 80. The total length of a scale is 50.0 nm.

EMBODIMENT FOR CARRYING OUT THE INVENTION

Since carbon generated in a vapor phase plays a role of a binder, an obtained material is connected uniformly even to minute portions of carbonated and graphitized filler, thereby making it possible to obtain carbon materials and graphite materials of various shapes such as a mass, a block, a cylinder, a polygonal rod and a plate.

Figure 2:
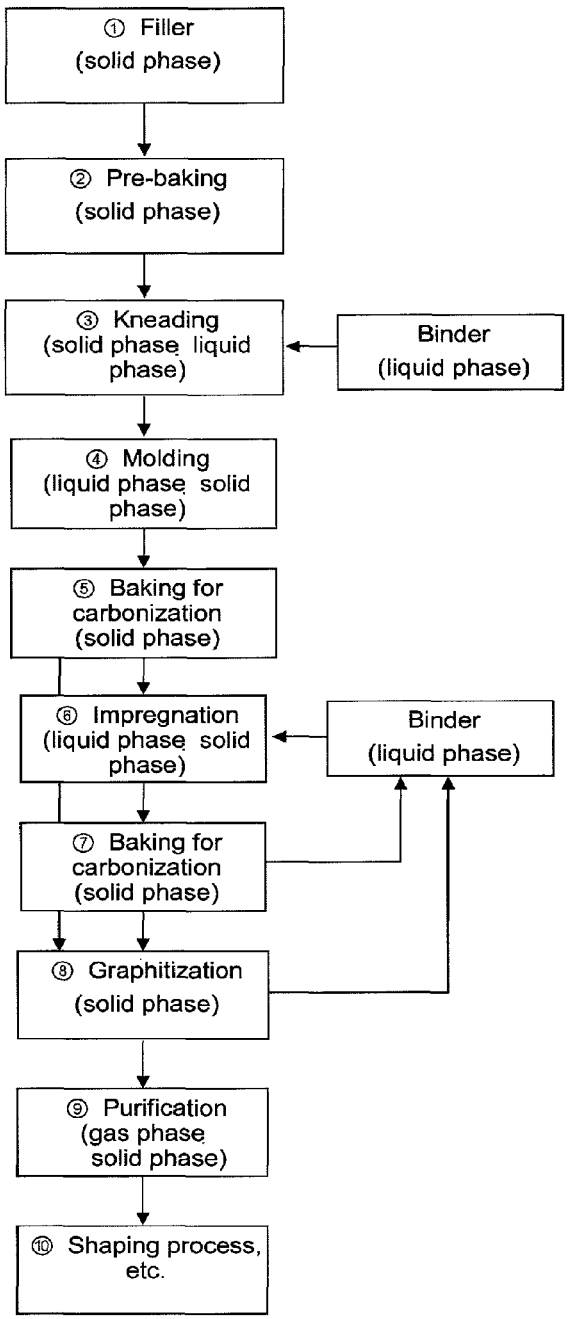
Figure 2:
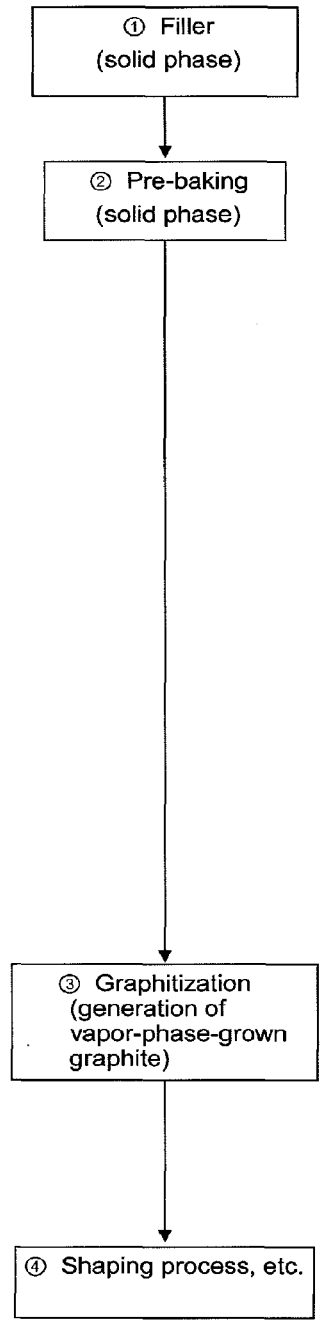
Figure 3:
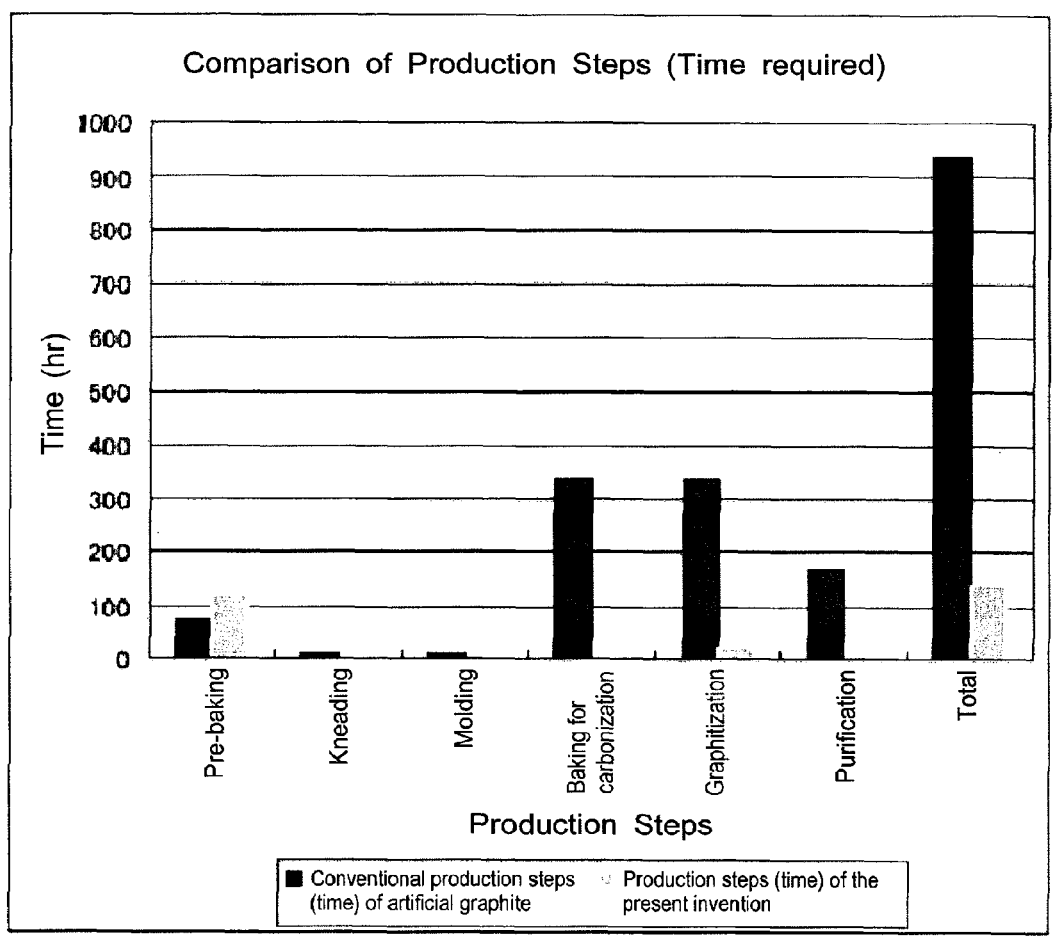

In heat treatment under isotropic gas pressure, a temperature can be elevated at a rate of several hundreds degrees per hour, and therefore, a material can be taken out within 24 hours including a cooling time. Accordingly, the production period can be shortened to a great extent while two to three months have been required for the production so far. FIG. 2 shows a comparison between the production process of conventional artificial graphite with the production process of the present invention. FIG. 3 shows a comparison of a period of time required for production of the conventional artificial graphite with a period of time required for production of the present invention. While in conventional methods, carbonization and graphitization proceed in a liquid or solid phase, vapor-phase-grown graphite is generated in a vapor phase in the present invention, and therefore, graphite material can be produced in a remarkably small number of production steps within a significantly short period of time.

A material having a desired anisotropy, open pore ratio, degree of growth of graphite crystal structure, mechanical strength and physical properties is produced by adjusting a shape and size of a starting material to be used, or adjusting a particle size distribution in the case of particles, and properly controlling pre-baking conditions, isotropic pressure and heating conditions.

Vapor-phase-grown carbon and composite materials of graphite and various carbon materials, for example, carbon fiber-reinforced carbon materials (CC composite) and graphite/carbon composite materials are produced by subjecting a pre-baked filler to mixing or laminating with various carbon materials such as a carbon fiber, a natural graphite, an artificial graphite, a graphite fiber, an expanded graphite, a glassy carbon or an amorphous carbon as an additive, charging the filler in a graphite crucible in the same manner as mentioned above and conducting heat treatment under isotropic gas pressure. The above-mentioned various carbon materials can be used alone or in combination of two or more thereof.

For the heat treatment under isotropic gas pressure, hot isotropic pressing equipment (HIP equipment) can be used suitably. In the case of producing large size graphite materials such as electrodes for steel making and graphite for nuclear reactor, desired large size graphite materials are produced using a large size equipment having an inner diameter of 800 mm and a height of 2100 mm or an inner diameter of 800 mm and a height of 3700 mm by charging the pre-baked starting material in a graphite crucible and conducting about 24-hour treatment.

In the case of producing electrode materials for primary batteries and secondary batteries such as lithium ion batteries, capacitors and fuel cells, a porous graphite block adjusted to a proper open pore ratio and pore size distribution by the above-mentioned method is cut into a sheet of 50 to 1000 μm by electric discharge machining, or water jetting, or with a multi-wire saw, thereby enabling a slurry preparation step and a coating step to be eliminated.

In the case where a graphite material to be used for a slurry preparation step and a coating step is needed similarly to a conventional method, a starting material, pre-baking conditions, a method for charging into a crucible and hot isostatic pressing treatment conditions are properly adjusted to decrease a degree of connection of vapor-phase-grown graphite to the pre-baked filler, and the obtained treated product is crushed or pulverized to be used for the above-mentioned steps.

In order to produce a carbon nanotube, a carbon nanofiber, fullerene, a carbon nanohorn or the like as a simple substance or a composite material with a pre-baked filler, vapor-phase-grown carbon and graphite, a pre-baked filler are mixed with a metal component, silicon or the like by various methods, and pre-baking conditions, a method for charging into a crucible and hot isostatic pressing treatment conditions are properly adjusted.

In the case of producing a high purity material, polymer resin materials such as PAN, a phenol resin, a furan resin and a polyimide resin are used as a starting material. This is because residues obtained by refining of petroleum and coal such as pitches and cokes contain a lot of impurities such as metals.

When producing graphite sheets to be used on packings of automobile engine and insulating materials for high temperature applications, high density graphite materials (including materials in a sheet-like form) in which carbon hexagonal planes are laminated in the plane direction can be produced by applying force (compressing) on a vapor-phase-grown graphite structure by rolling or cold press in a thickness direction of the structure.

Hydrocarbons and polymer materials in the form of particle, powder or short fiber which can be carbonized at high yield after the heat treatment are used as a starting material. Specific examples thereof which can be suitably used are petroleum pitch, coal pitch, asphalt, PVC pitch, tetrabenzophenazine pitch, naphthalene pitch, anthracene pitch, petroleum mesophase pitch, polyacrylonitrile, rayon, phenol resin, furan resin, cellulose resin and the like.

Figure 5:
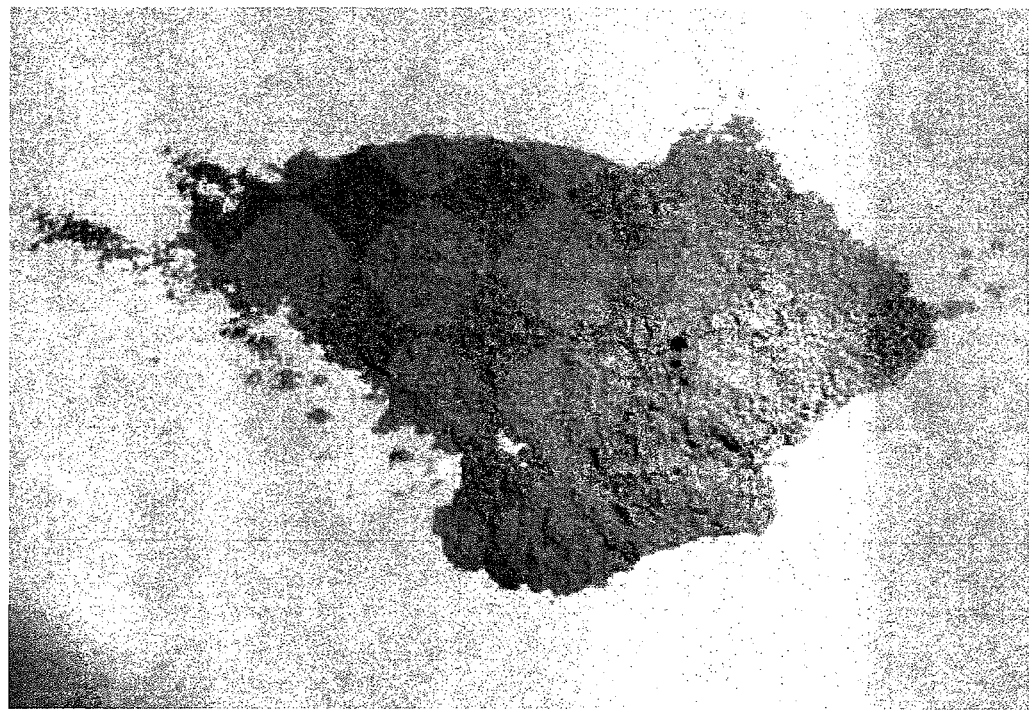

The starting material is heat-treated in inert gas atmosphere for pre-baking. Conditions such as a pre-baking temperature and a temperature elevating rate are properly set depending on a shape, density, strength and porosity of a targeted material. If the pre-baking conditions are insufficient, a large amount of gases such as moisture is generated in the following hot isostatic pressing treatment, and thereby, connection of the materials by vapor phase growth becomes insufficient. If the pre-baking temperature is too high and carbonization of the material proceeds excessively, generation of hydrogen and hydrocarbon which are starting materials for production of vapor-phase-grown graphite becomes insufficient, and a material having sufficient strength cannot be obtained. FIG. 5 shows a photograph of an appearance of one example of the starting material in the form of fine powder after the pre-baking.

The starting powdery and/or particulate material after the pre-baking is charged in a graphite crucible which are previously processed to a desired shape of material to be produced. The graphite crucible is one configured to have a screw type cap on the top thereof, and after charging of the starting material, the crucible is sealed by tightening the screw type cap. High density isotropic graphite materials and artificial graphite materials can be used as a material of the graphite crucible, and thereby, purity, bulk density, closed-pore-ratio and pore size distribution are suitably adjusted.

The function of the graphite crucible for precipitating vapor-phase-grown graphite at the hot isostatic pressing treatment is to generate vapor-phase-grown graphite while maintaining the shape of the crucible, holding the inside of the crucible at an isotropic gas pressure being equal to the outside pressure by permeating a medium gas such as argon through the wall of the crucible with a proper pore size and keeping hydrogen and hydrocarbon generated from the starting material inside the crucible without scattering outside the crucible. When the crucible material and structure are too air-tight, the crucible is broken due to a difference in pressure between the inside and the outside of the crucible, and the starting material scatters inside the equipment. In the case where the crucible material and structure have too high permeability, hydrogen and hydrocarbon generated from the starting material are scattered inside the pressure vessel of the hot isostatic pressing equipment, and vapor-phase-grown graphite cannot be generated.

Figure 6:
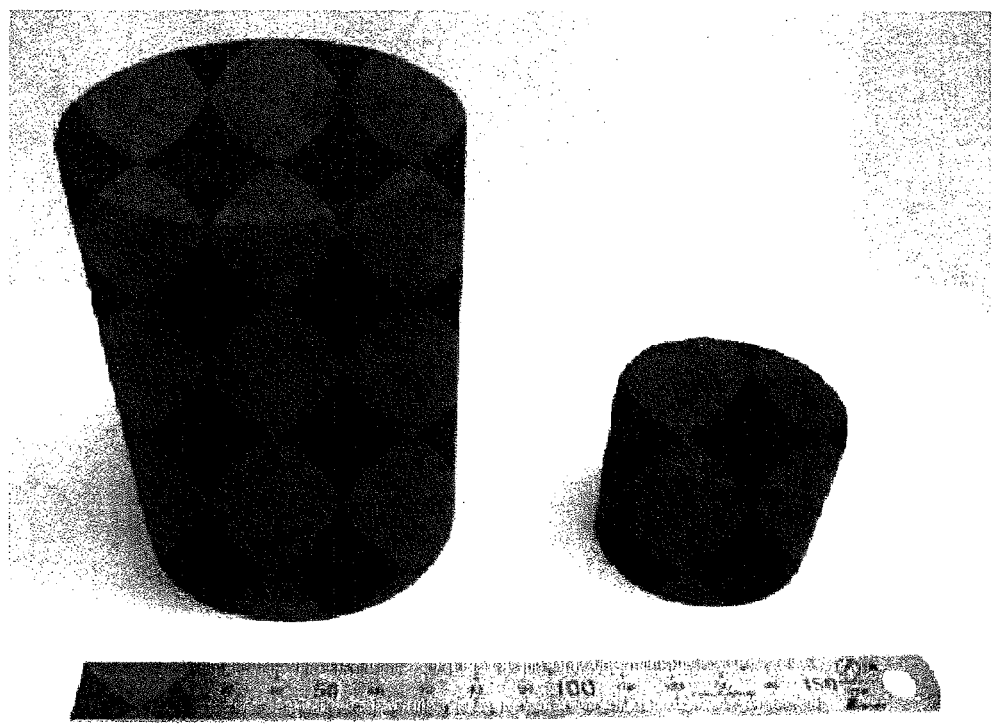

The graphite crucible charged with the starting material is set inside the hot isostatic pressing equipment, and isostatic pressing and heating treatment is carried out using inert gas such as argon gas. In this case, it is necessary to increase the inside pressure to a given value until the temperature rise to a pre-baking temperature of the starting material and apply enough pressure in a temperature range higher than the pre-baking temperature. In the temperature range higher than the pre-baking temperature, hydrogen and hydrocarbon gas to be used as starting materials for vapor-phase-grown graphite are generated, and therefore, if the inside pressure is not sufficient, these gases scatter outside the crucible and sufficient vapor phase growth does not arise. FIG. 6 is a photograph showing appearances of a screw-capped sealable graphite crucible and an obtained vapor-phase-grown graphite structure.

A temperature elevating rate in the temperature range higher than the pre-baking temperature is also important. When the temperature elevating rate is too low, amounts of hydrogen and hydrocarbon generated per hour is small, and hydrogen and hydrocarbon do not reach the concentrations necessary for generation of vapor-phase-grown graphite, resulting in scattering of an increased proportion thereof outside the crucible.

Figure 7:
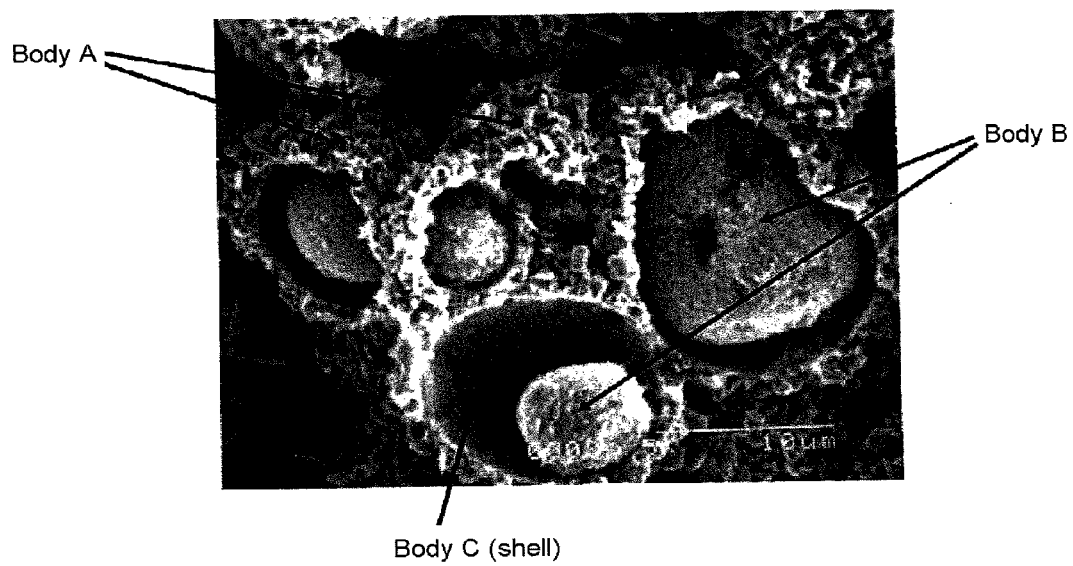

When a phenol resin, a furan resin or the like is used as a starting material, vapor-phase-grown graphite is precipitated at a pre-baking temperature within the range from 350° C. to 1100° C., and a structure sufficiently exhibiting a function of vapor-phase-grown graphite as a binder can be obtained at a pre-baking temperature within the range from 500° C. to 900° C. at 0.5% by weight of remaining hydrogen amount in the starting material. When a starting material in the spherical and/or elliptical form is used, vapor-phase-grown graphite A having a fine structure is generated around the starting material particle in the spherical and/or elliptical form, and vapor-phase-grown graphite B is generated also inside the particle in the spherical and/or elliptical form to give a structure combined with the outer surface (shell) C of the particle in the spherical and/or elliptical form. FIG. 7 is an electron microscope photograph of a vapor-phase-grown graphite structure and shows the bodies A, B and C. Here, the spherical form represents a solid body having a form like a sphere and the elliptical form represents a solid body having a form like an ellipse, and the both include solid bodies having a nearly spherical or elliptical shape and in addition, solid bodies having a shape somewhat deviated from a spherical or elliptical shape as far as they can form the three-layer structure comprising the above bodies A, B and C according to the present invention. Also, "the starting material in the spherical and/or elliptical form" means any of one comprising a starting material in the spherical form alone, one comprising a starting material in the elliptical form alone, or a mixture of a starting material in the spherical form and a starting material in the elliptical form.

A powder, particle, piece, long fiber or short fiber of the pre-baked starting material is charged in a graphite crucible and vapor-phase-grown graphite is grown using the crucible as a reaction vessel. Inner dimensions (shape) of the crucible is set in consideration of a shrinkage of the starting material depending on a shape, density, porosity, pore size distribution of a material to be produced and conditions for preparing the starting material to be used. The crucible is configured to have a top screw cap or top and bottom screw caps in order to seal the crucible after charging of the starting material, thereby preventing scattering of the starting material in the following heating and pressing steps and controlling an equilibrium between hydrogen and hydrocarbon to be used as a starting material for vapor phase growth and a compressed medium gas by open pores in the crucible material.

Figure 40:
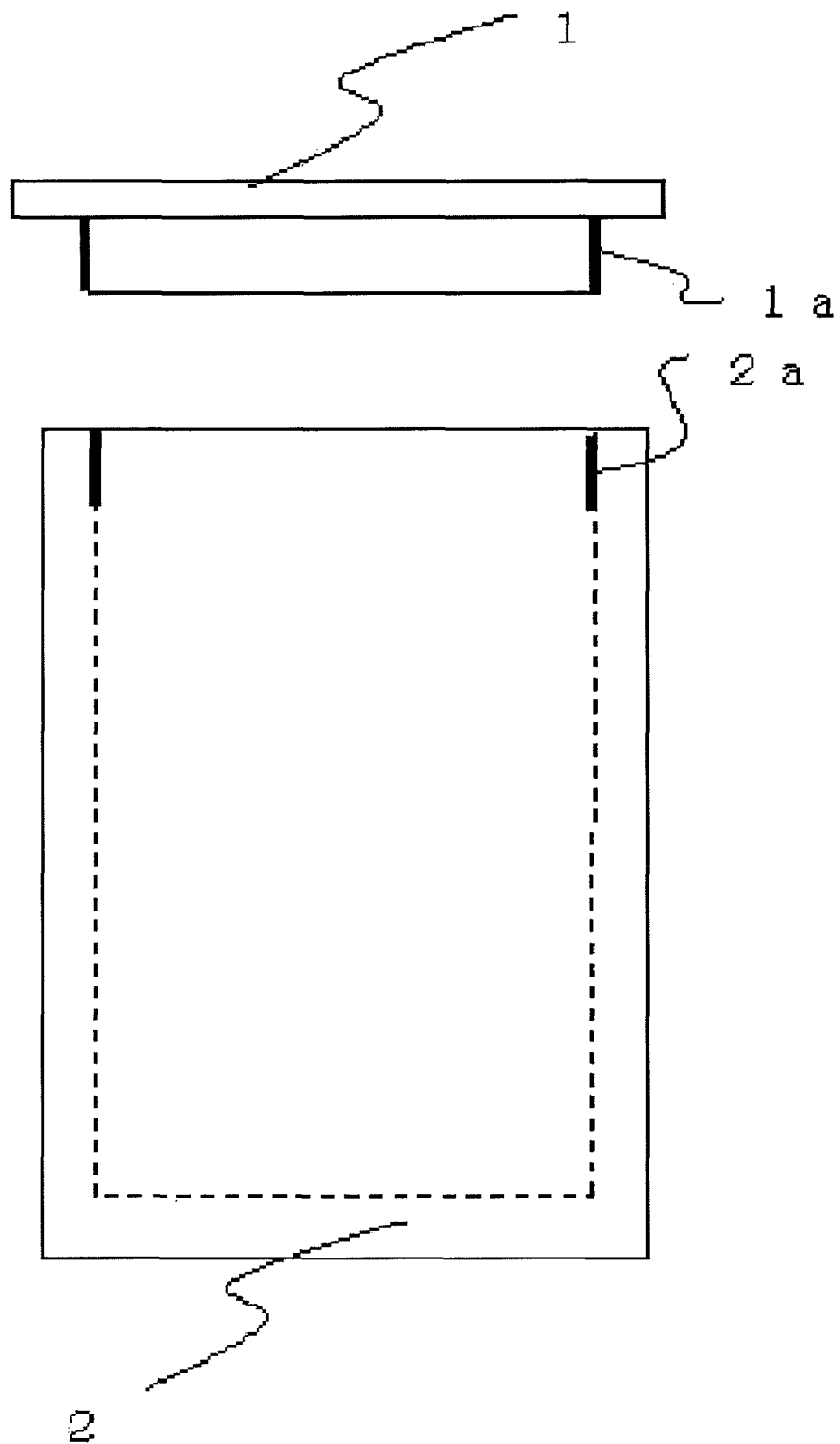
Figure 78:
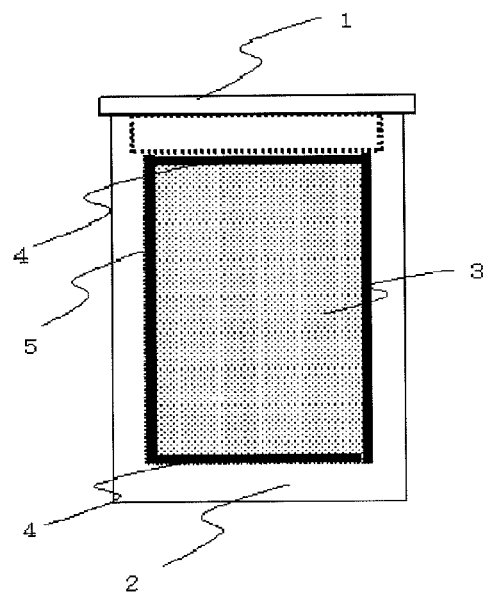

FIG. 40 is a cross-sectional view of the structure of the top screw-capped graphite crucible. The inner wall 2a at the top of the crucible body 2 and the outer circumference 1a of the crucible cap are threaded by specified tap processing, and thereby the crucible can be sealed by turning the cap to the thread after charging of the pre-baked starting material 3. In addition, the pre-baked starting material 3 can be subjected to HIP treatment by covering the whole (or a part) of the top and/or bottom thereof with spacers made of a carbon material for the purposes of preventing scattering of gas for vapor phase growth reaction and increasing the gas concentration, thereby enhancing a reaction efficient. Further, the pre-baked starting material 3 can be subjected to HIP treatment by covering the whole (or a part) of the side thereof with a sleeve made of a carbon material for the same purposes as mentioned above. FIG. 78 shows the pre-baked starting material being in a state of the top and bottom thereof being covered with the spacers 4 and the side thereof being covered with the sleeve 5. When the top of the pre-baked starting material is covered with the spacer, the spacer functions as a weight, and helps uniform shrinkage of the carbon material that proceeds as graphite is generated, and is useful to avoid cracking and crazing of the generated carbon material. Examples of the carbon material for the spacer and the sleeve are graphite, glassy carbon, diamond-like carbon, amorphous carbon and the like, and one of them can be used alone or two or more thereof can be used together. Among these, a spacer or sleeve made of graphite is preferred. In the present invention, the spacer is one covering the pre-baked starting material mainly at the top or bottom thereof and the sleeve is one covering the pre-baked starting material mainly at the side thereof. However, there is a case where discrimination of the both does not make sense, depending on the shape of the vessel.

With respect to the material of the crucible, it is preferable to use artificial graphite or isotropic graphite material having a bulk density of 1.6 to 1.9, an open pore ratio of less than 20%, a pore size of less than 3 µM and a thermal conductivity of not less than 50 W/(m·K).

In the hot isostatic pressing treatment, heating is carried out at a temperature elevating rate of 20° C. or more per hour, desirably 100° C. or more per hour. The maximum ultimate temperature during the heating is set to be 1000° C. or more, desirably 1400° C. or more. In a temperature range not less than the pre-baking temperature of the starting material, the pressure during the pressing is set to be 10 MPa or more, desirably 50 MPa or more. Upper limits of the maximum ultimate temperature and the maximum ultimate pressure are not limited particularly, and when using the hot isostatic pressing equipment, usually these upper limits are determined accordingly depending on performance of the equipment. These upper limits are obvious for a person skilled in the art, and the upper limit of the maximum ultimate temperature is usually about 3000° C. The upper limit of the maximum ultimate pressure is usually about 200 MPa, and especially in the case of high performance equipment, it is about 300 MPa.

In the above-mentioned first aspect of the present invention, the pre-baking temperature varies with various conditions such as kind of a filler to be used and the maximum ultimate temperature at the hot isostatic pressing treatment, and usually is preferably within a range from about 350° C. to about 1100° C., more preferably within a range from about 500° C. to about 900° C. The amount of remaining hydrogen can fluctuate depending on the size of the filler to be used, and usually is preferably within a range from about 0.05% by weight to about 10% by weight, more preferably within a range from about 0.5% by weight to about 5% by weight.

In the first aspect of the present invention, since vapor-phase-grown graphite having high graphite crystallinity is mainly generated, the carbon material obtained by sufficiently conducting the reaction mainly comprises vapor-phase-grown graphite having high graphite crystallinity as component element. Therefore, such carbon material can substantially be called a graphite material. In such a carbon material, in the case of generating the above-mentioned porous carbon material comprising the bodies A, B and C, the maximum ultimate temperature at the hot isostatic pressing treatment is adjusted to be within a range preferably from about 1000° C. to about 3000° C., more preferably from about 1400° C. to about 2500° C. In this case, a bulk density of the generated carbon material is within a range preferably from 0.4 to 1.5, more preferably from 0.6 to 1.2.

An open pore ratio thereof is within a range preferably from 20% to 80%, more preferably from 30% to 70%.

The explanation on the second aspect of the present invention mentioned infra can be applied to the explanation on the first aspect of the present invention as far as there is no inconsistency between the both explanations. For example, in addition to a graphite crucible, a closable vessel made of a heat resistant material can be used as a closable vessel to be used for charging the filler therein as explained in the second aspect of the present invention. Also, the fillers explained in the second aspect of the present invention can be used similarly. The purports such that the filler is preferably powdery and/or particulate material and "the filler pre-baked to an extent of containing remaining hydrogen" includes a filler which has not been pre-baked and previously contains hydrogen in such a proper amount as to be reserved by the pre-baked filler are also applied to the first aspect of the present invention as explained in the second aspect of the present invention.

Next, the second aspect of the present invention, namely, the production method of the present invention for selectively and efficiently generating nanocarbon materials is explained below. According to the present invention, nanocarbon materials can be produced selectively by using, as a starting material, the filler which is a solid organic material having high carbon density and causing CVD reaction highly efficiently without sublimation of carbon. For example, a filler is carbonized under proper pre-baking conditions to prepare a pre-baked filler in a state of hydrogen remaining therein and then the pre-baked filler is allowed to carry a catalyst thereon or a filler previously allowed to carry a catalyst thereon is pre-baked. Then, the pre-baked filler is charged in a closed vessel made of a heat-resistant material and used as a reaction vessel, and is subjected to heating and pressing treatment with hot isostatic pressing equipment (HIP) by using a compressed atmosphere such as argon.

In the present invention, the catalyst is carried directly on the filler as a solid starting material. Therefore, for example, by dissolving a catalyst such as metallic chloride or organometallic compound in a solvent for ionization and bringing the ionized catalyst into contact with the filler, it is possible to allow the filler to carry a catalyst having an extremely fine size and shape. Also, it is thought that the presence of such a catalyst allows selective and efficient generation of the nanocarbon materials by carrying out HIP treatment at relatively low temperature while avoiding high temperature range where graphite (laminated graphene layers) is easily precipitated by CVD reaction.

It can be considered that scattering of hydrocarbon, hydrogen and carbon monoxide (CO) generated from the pre-baked starting material by the heat treatment is regulated with a highly compressed medium such as argon gas, resulting in formation of a concentration distribution thereof around the pre-baked starting material. It is considered that when the heating temperature exceeds the pre-baking temperature and becomes sufficiently high, these gases are thermally excited and the CVD reaction proceeds in a three-dimensional area in the reaction vessel, thus generating nanocarbon materials such as vapor-phase-grown CNT, CNF, fullerenes, graphenes and carbon nanohorns on the catalyst carried on the filler and functioning as a reaction starting point. Various nanocarbon materials can be generated selectively by regulating factors such as kind of the filler as a starting material, a temperature for pre-baking the filler, an amount of remaining hydrogen contained in the pre-baked filler, kind, amount and size of a catalyst to be carried on the filler, a maximum ultimate temperature, a maximum ultimate pressure, a heating and pressing speed and a heating and pressing pattern at the HIP treatment and a material of a graphite vessel and a sealing method thereof.

Examples of the heat resistant materials constituting the reaction vessel are graphite and in addition, ceramics such as alumina, magnesia and zirconia, and metals such as iron, nickel, zirconium and platinum. Among these, graphite is preferred. With respect to the graphite vessel, the same one as explained above can be used. Namely, the graphite vessel functions as a reaction vessel for causing the CVD reaction with hydrogen, carbon monoxide and hydrocarbon gases generated from the pre-baked starting material during the HIP treatment. Since it is necessary to cause a chemical reaction without scattering the generated reaction gas outside the vessel while keeping isotropic high pressure by a gas pressure, the material of the vessel and the sealing structure thereof are properly selected. If the material is too dense, a difference in pressure between the inside and the outside of the vessel arises, which results in an explosive breakdown of the vessel. On the other hand, if the material is too porous, the reaction gas generated inside the vessel is easily scattered outside the vessel and efficiency of the chemical reaction is lowered to a large extent.

The material and structure of the vessel are properly selected in consideration of necessity of taking a HIP-treated product out of the vessel, sealing the vessel as easily as possible in view of facilitating charging of the starting material before the HIP treatment, and maintaining strength of the vessel at high temperature so as to be capable of withstanding the inside pressure caused by generation of the reaction gas from the pre-baked starting material, and also in consideration of exposure to high temperature during the HIP treatment.

The graphite vessel is made using artificial graphite materials specifically prepared by extrusion molding, CIP molding, squeeze molding, vibration molding or rammer molding, hard carbon materials including glassy carbon and prepared mainly by molding a thermosetting resin, carbon fiber-reinforced carbon materials or composite materials thereof. The porosity of the graphite material is important for efficiently causing the chemical reaction in the crucible, and therefore, a material of which open pore ratio has been controlled is used. In the case of a material having an open pore ratio of 20% or more, the reaction gases are excessively diffused outside the vessel, and therefore, a concentration of the gases necessary for generating the graphite cannot be kept. Example of a suitable graphite vessel is a graphite crucible.

A screw-capped graphite crucible can be used so that charging of the pre-baked starting material in the vessel and discharging of the product after the HIP treatment can be carried out efficiently. (FIG. 40)

The filler to be used in the present invention is a solid organic material having a relatively high density. In such a filler, as the increase in a molecular weight proceeds by heating, oxygen, nitrogen and hydrogen atoms in the filler structure become instable and are discharged, and thereby, carbonization proceeds. In the present invention, the (pre-baked) filler of which carbonization is stopped in a state of carbon, hydrogen and oxygen remaining in the filler is used as a pre-baked starting material.

Examples of usable filler are natural organic polymers such as starch, cellulose, protein, collagen, alginic acid, dammar, kovar, rosin, gutta-percha and natural rubber; semi-synthetic polymers such as cellulose resin, cellulose acetate, cellulose nitrate, cellulose acetate butyrate, casein plastic and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin and urethane resin, thermoplastic resins such as vinyl chloride resin, polyethylene, polypropylene and polystyrene, synthetic rubbers such as polyisoprene and butadiene, synthetic fibers such as nylon, vinylon, acrylic fiber and rayon, and other materials such as polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene and anthracene.

It is a matter of course that petroleum pitch, coal pitch, petroleum coke, coal coke, carbon black and active carbon which are generated when fossil fuels such as petroleum and coal, for example, being refined can be used as a starting material. In addition, toward the establishment of resources-recycling society, introduction of carbonization system has been advanced from the viewpoint of effective utilization of carbon in wastes, and waste plastics which are mixtures of the above-mentioned various resins, waste wood, waste plants and food wastes such as garbage can also be used as a starting material. Among these, thermosetting resins such as phenol resin are preferred from the viewpoint of a large amount of remaining carbon after heat treatment, waste plastics and waste carbides are preferred from the viewpoint of production cost and from environment point of view by an effect of reducing CO2, and carbon black is preferred from the viewpoint of production of carbon materials of fine size.

The filler to be used in the present invention is preferably a powdery and/or particulate material. In the powdery and/or particulate material of the present invention, a size and shape of the component units thereof are not limited, and the powdery and/or particulate material incorporates a powder comprising relatively fine component units or particles comprising relatively coarse component units of aggregate. The shape of these component units includes various ones such as particle, small piece, long fiber and short fiber.

The fillers to be used in the present invention can include those which contain beforehand hydrogen corresponding to the remaining hydrogen in an amount being proper for the use in the present invention even without pre-baking. When the filler contains beforehand a proper amount of hydrogen, pre-baking is not required, and the filler can be used as it is as "the filler pre-baked to an extent of containing remaining hydrogen" in the present invention. Namely, in the present invention, "the filler pre-baked to an extent of containing remaining hydrogen" includes one not subjected to pre-baking and reserving a proper amount of hydrogen which should be reserved in a filler after pre-baking. Examples of such a filler are petroleum coke, coal coke, carbon black and the like.

In the present invention, the fillers can be used alone or can be used in a mixture of two or more thereof.

The catalyst to be used in the present invention is one of factors for controlling kind, amount, shape, size (diameter, number of laminated graphene layers, length and the like) and the like of the nanocarbon materials to be generated. Examples of usable catalysts are (1) metals such as tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, zinc, lead, cadmium, thallium, bismuth, polonium, tin, lithium, indium, sodium, potassium, rubidium, gallium, and cesium, and in addition, elements such as silicon and tellurium, (2) sulfide, boride, oxide, chloride, hydroxide, nitride and organometallic compound of any one of the (1) above, and (3) a mixture of any of the (1) and (2) above and sulfur and/or sulfide (including an organosulfur compound) and a mixture of any of the (1) and (2) above and boron and/or boride (including an organoboron compound). Among these, preferred are tungsten, tantalum, molybdenum, niobium, iridium, vanadium, chromium, zirconium, titanium, iron, cobalt, nickel, manganese, copper, samarium, neodymium, silver, praseodymium, lanthanum, calcium, strontium, barium, aluminum, magnesium, zinc, lead, cadmium, bismuth, tin, lithium, indium, sodium, potassium, rubidium, gallium, cesium and silicon, (2) oxide, chloride, hydroxide, nitride and organometallic compound of any one of the (1) above, and (3) a mixture of any of the (1) and (2) above and sulfur and/or sulfide (including an organosulfur compound) and a mixture of any of the (1) and (2) above and boron and/or boride (including an organoboron compound). These can be used alone or can be used in a mixture of two or more thereof.

In the present invention, an extremely small amount of the catalyst suffices, and usually when the amount is not less than 1000 ppm, preferably not less than 2000 ppm, the present invention can be executed suitably. A further preferred amount of the catalyst is not less than 10000 ppm, more preferably not less than 100000 ppm.

Since the catalysts become a starting point of the CVD reaction for generating nanocarbon materials, it is desirable to allow the catalysts to be carried on the pre-baked starting material in a state of being dispersed as uniformly as possible. In addition, the finer the size of the catalysts is, the finer nanocarbon materials can be generated.

Example of a method for allowing the catalysts to be carried on the pre-baked starting material is to mix the pre-baked starting material with the catalysts prepared in a fine form.

In addition, there is exemplified a method for pouring a filler before pre-baked or a filler after pre-baked (pre-baked filler) in catalysts in a fused form or in a solution and then dispersing the filler therein substantially uniformly and carrying out a drying step or the like. For example, in the case of using the filler before pre-baked, a water or alcohol solution of a chloride of cobalt, nickel, iron or the like is prepared, and the filler is dissolved in this solution, followed by polymerization, drying, heat treatment and pulverization steps, thus enabling the catalysts to be finely carried on the filler nearly uniformly. The filler carrying the catalysts can be subjected to pre-baking.

In the case of using the pre-baked starting material, metal, for example, vanadium, chromium, titanium, iron, cobalt, nickel, manganese, copper, calcium, aluminum or magnesium is allowed to be carried directly on the material by a spattering, spraying, electroplating or electroless plating method or catalysts are allowed to be carried on the pre-baked starting material by preparing a solution by dissolving a chloride or organometallic compound of the metal mentioned above in a solvent such as alcohol and then pouring the pre-baked starting material in the solution, followed by stirring, adsorption, precipitation, filtration, drying and heat treatment steps.

Further, the catalysts can also be allowed to be carried on the pre-baked starting material by mixing a transition metal hydroxide with the pre-baked starting material. The transition metal hydroxide can be obtained by dissolving a transition metal alkoxide or a transition metal complex in alcohol to synthesize an alcohol solution of metal complex, hydrolyzing the solution and then filtering off the obtained precipitated product. When synthesizing a transition metal hydroxide through hydrolysis by using a transition metal alkoxide or a transition metal complex as a starting material, further fine particles can be obtained. It can be considered that fine particles of a transition metal hydroxide are reduced during the HIP treatment to form a metal, and when the transition metal hydroxide as a starting material is in the form of finer particles, the metal generated by the reduction also become finer particles, thereby enabling the generated CNT to be controlled to have a smaller size.

A method for allowing a transition metal to be carried on a surface of the pre-baked starting material by pouring the pre-baked starting material in an ionic solution of a transition metal or a solution of a transition metal complex is also an effective method. An ionic solution of a transition metal can be prepared by dissolving a chloride of a transition metal and/or a transition metal alkoxide in water, alcohol or a mixture of water and alcohol, and a solution of a transition metal complex can be prepared by dissolving a transition metal complex such as a transition metal acetylacetonate in water, alcohol or a mixture of water and alcohol. In this case, a transition metal is adsorbed in the pre-baked filler as a single metal ion or a metal complex ion, and by drying this filler, the transition metal can be carried as a catalyst on the filler. The catalyst thus allowed to be carried on the filler can function as a fine starting point for the reaction.

The filler carrying the catalyst is pre-baked at a specified temperature elevating rate in a nitrogen gas stream or in an inert atmosphere. For the pre-baking, an electric heating or gas heating type externally heating batch oven, continuous multi-tubular oven, internal heating rotary kiln, rocking oven or the like is used.

In the present invention, the kind and amount of gases for causing a reaction for vapor phase growth during the HIP treatment can be controlled by the pre-baking temperature or the amount of remaining hydrogen in the pre-baked starting material. Namely, in a fixed amount of a certain filler, the kind, concentration and total amount of gases (hydrogen, hydrocarbon, carbon monoxide, steam and the like) to be generated during the HIP treatment naturally become constant as far as the pre-baking temperature is constant. Also, each amount of the generated hydrogen, hydrocarbon, carbon monoxide, steam and the like has a correlation with the amount of remaining hydrogen. Accordingly, the degree of pre-baking can be properly adjusted by using the pre-baking temperature or the amount of remaining hydrogen as an index.

The pre-baking temperature can vary depending on various conditions such as the kind of the filler to be used and the maximum ultimate temperature at the HIP treatment, and usually is preferably not less than 400° C., desirably within a range from about 500° C. to about 1000° C.

The preferred range of the amount of remaining hydrogen varies depending on the size of the filler to be used, and is usually within a range from about 500 ppm to about 60000 ppm, preferably from about 2500 ppm to about 40000 ppm.

In the case of selectively generating CNT, it is preferable that the pre-baking temperature is within a range from about 500° C. to about 700° C. and the amount of remaining hydrogen is within a range from about 20000 ppm to about 40000 ppm. In the case of using the filler having a size of about 1 μm or less (for example, carbon black having a size of about 1 μm or less), the range from about 500 ppm to about 20000 ppm is preferred.

In the present invention, by subjecting the pre-baked starting material to HIP treatment, gases such as hydrogen, hydrocarbon and carbon monoxide are generated and the CVD reaction proceeds inside the reaction vessel. These gases can be generated at the temperature range from about 400° C. to about 1500° C. depending on kind of the starting material by controlling the pre-baking temperature and the HIP treating conditions. Accordingly, it is possible to generate at a time various kinds of nanocarbon materials in the temperature range for generating these gases by mixing a plurality of metal catalysts having different melting points.

In the present invention, the catalyst and the maximum ultimate temperature at the HIP treatment are important factors. In the case of selectively generating graphite, it is possible to obtain vapor-phase-grown graphite having a bulky form, a flower shape or the like by carrying out the HIP treatment in a relatively high temperature range where graphite grows, without using a catalyst. However, since graphite is generated by stacking of graphenes which are carbon hexagonal planes, it can be considered that when a catalyst is present within the temperature range for generating graphite, various carbon nanofibers such as a graphene-stacked type where graphenes are stacked in parallel with each other, a carbon nanohorn-stacked type where carbon nanohorn are stacked, a cup-stacked type where component units of a cup shape are stacked, and a screw type where a carbon nanofiber is grown and warped like a screw, are generated. When a catalyst is present at a temperature of a relatively low HIP treating temperature range where graphite cannot be generated selectively, various carbon nanotubes and cup-stacked CNF can be obtained.

As mentioned above, by allowing the catalyst to be carried on the pre-baked filler, various nanocarbon materials such as carbon nanofibers and carbon nanotubes can be generated selectively by using the HIP treating temperature as a control factor.

The maximum ultimate temperature range at the HIP treatment for selectively generating the respective nanocarbon materials can vary depending on various conditions such as the kind and amount of the catalyst and the maximum ultimate pressure at the HIP treatment, and is, for example, from about 850° C. to about 1300° C. in the case of carbon nanotubes and from about 850° C. to about 1800° C. in the case of carbon nanofibers.

The maximum ultimate pressure at the HIP treatment is, for example, within a range from 1 MPa to 200 MPa, preferably within a range from 10 MPa to 200 MPa.

The explanations on the first aspect of the present invention can be applied to the second aspect of the present invention unless they are inconsistent with the explanations on the second aspect of the present invention.

Herein, the nanocarbon materials are carbon materials having a structure with a size of about 0.5 nm to about 5000 nm (preferably about 3000 nm) or comprising component units with a size of about 0.5 nm to about 5000 nm (preferably about 3000 nm), and include any of carbon nanotubes (CNT), carbon nanofibers (CNF), fullerenes, graphenes and carbon nanohorns (CNH). CNT is, for example, one having an outer diameter within a range from about 0.5 nm to about 5000 nm (preferably about 3000 nm), preferably within a range from about 1 nm to about 1000 nm, further preferably within a range from about 1 nm to about 500 nm, still further preferably within a range from about 10 nm to about 300 nm. CNT includes one having a small ratio of a thickness to the outer diameter, for example, preferably a ratio of less than 20%. CNF is, for example, one having a diameter within a range from about 0.5 nm to about 5000 nm, preferably within a range from about 100 nm to about 3000 nm, further preferably within a range from about 200 nm to about 2000 nm. CNF includes a graphene-laminated CNF where graphene sheets are linearly laminated, a screw type CNF where graphene sheets are spirally laminated, a cup-stacked type CNF where component units having a cup shape are laminated, and a carbon nanohorn-stacked CNF where CNH are laminated. The thickness of graphene sheets and CNH as component units constituting these CNF is about 0.5 nm or more and less than about 10 nm. The nanocarbon material is also called carbon type nanomaterial.

Herein, the amount of hydrogen is one measured in accordance with general rules on a method for determining an amount of hydrogen of a metallic material (JIS Z 2614: 1990. The analysis method is in accordance with an inert gas heating method for "steel". Specifically a sample is heated up to 2000° C. in an argon gas atmosphere, and an integrated quantity of hydrogen is measured by gas chromatography). The amount of hydrogen is represented by % by weight or parts per million (ppm) by a weight.

The open pore ratio (apparent porosity) is a volumetric ratio of cavities (open) which are present in the volume of a material calculated from its outer dimensions and into which cavities liquid and gas can invade. Generally materials having a high open pore ratio have continuous pores and gas permeability. Herein, an open pore ratio is obtained from the following equation.

Open pore ratio (%)=((Apparent specific gravity)−Bulk specific gravity)/Apparent specific gravity)×100

Apparent specific gravity: A value measured with a densimeter AccuPyc 1330-PCW available from Shimadzu Corporation by a helium gas-substituted picnometer method, using a sample which has not been pulverized
Bulk specific gravity: A value obtained by dividing a sample weight by a volume calculated from the outer dimensions of the sample The true density is a density of a target object measured with the object being pulverized into a fine powder in order to minimize an influence of cavities contained therein, and in Examples of the present invention, the true density is measured using a powder sample having passed a 74 μm filter.

The bulk density is a synonym of a bulk specific gravity, and the apparent density is a synonym of an apparent specific gravity.

The present invention is then explained by means of Examples, but is not limited to the following Examples.

Example 1

Figure 8:
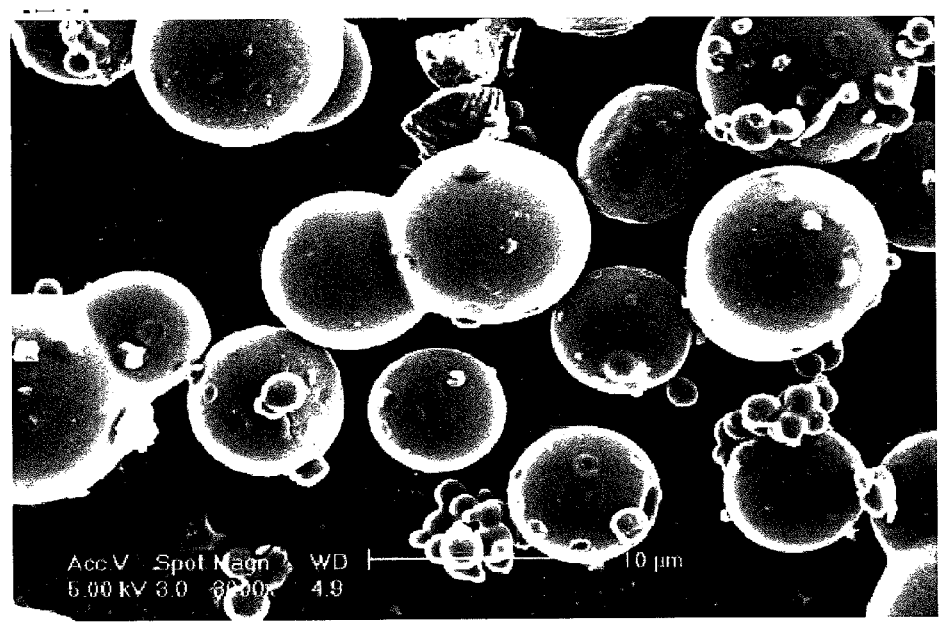

Phenol formaldehyde resin powder having an average particle size of 20 μm was pre-baked at 750° C. in an inert gas atmosphere. The amount of hydrogen contained in the starting material after the pre-baking was 0.8% by weight. The pre-baked starting material powder was charged in a graphite crucible and a screw type top cover was closed to seal the crucible. FIG. 8 is an electron microscope photograph of the starting material after the pre-baking, and at this stage, the starting material exhibits forms of thermosetting resin and hard carbon (hardly graphitizable carbon).

Figure 9:
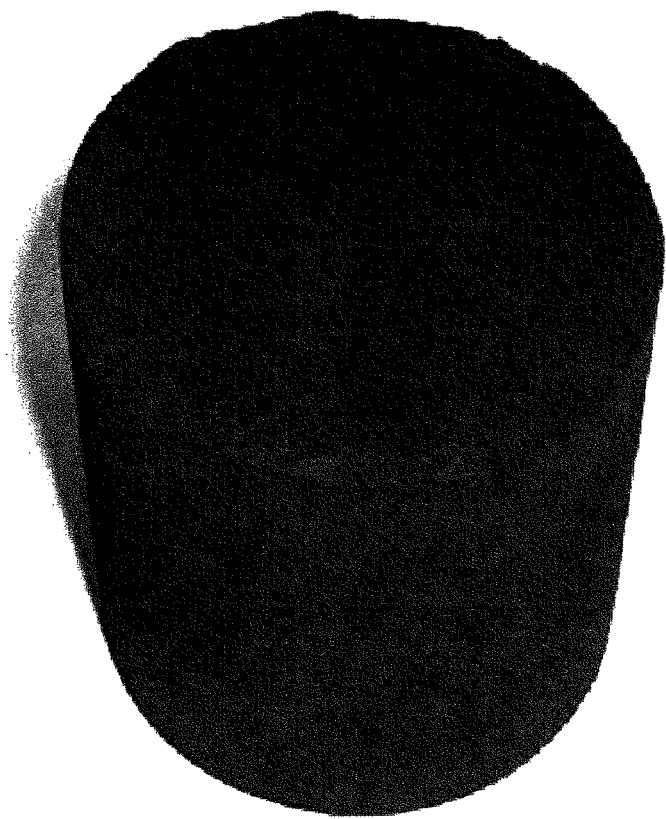

As a material for the graphite crucible, isotropic graphite having a bulk density of 1.85, an open pore ratio of 8%, a porosity of 2 μm, a heat conductivity of 140 W/(m·K) and inner dimensions of ϕ50×100 mm was used. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2000° C. and a maximum ultimate pressure of 200 MPa, respectively at a temperature elevating rate of 500° C. per hour, holding the temperature and pressure for one hour and then decreasing the temperature to room temperature and lowering the pressure. A required period of time between charging to and discharging from the graphite crucible was 22 hours. The top cover of the graphite crucible was opened and the material inside the crucible was discharged, and thus, a molded article of ϕ46×90 mm was obtained. While the starting material before the pre-baking was a fine powder when charged in the crucible, the material changed its form to one structure having sufficient strength due to generation of vapor-phase-grown graphite as shown in FIG. 9. The bulk density of the obtained vapor-phase-grown graphite structure was 1.1, and the open pore ratio and total ash content thereof were 43% and 0.005% by weight, respectively.

Figure 10:
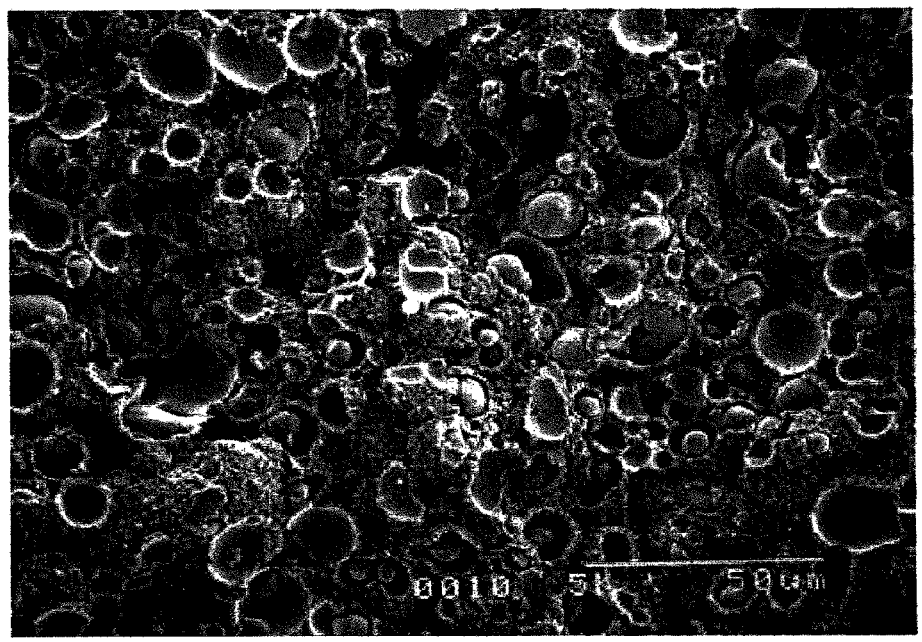

In FE-SEM photograph showing the broken surface of the obtained structure, it was confirmed that the vapor-phase-grown graphite A having a fine structure was generated around the spherical starting material particles and that the vapor-phase-grown graphite B was generated inside the spherical particle to form a structure being integrated with the outer surface (being in the form of shell) of the spherical particle. FIG. 10 is an electron microscope photograph showing the surface of the obtained structure.

Figure 11:
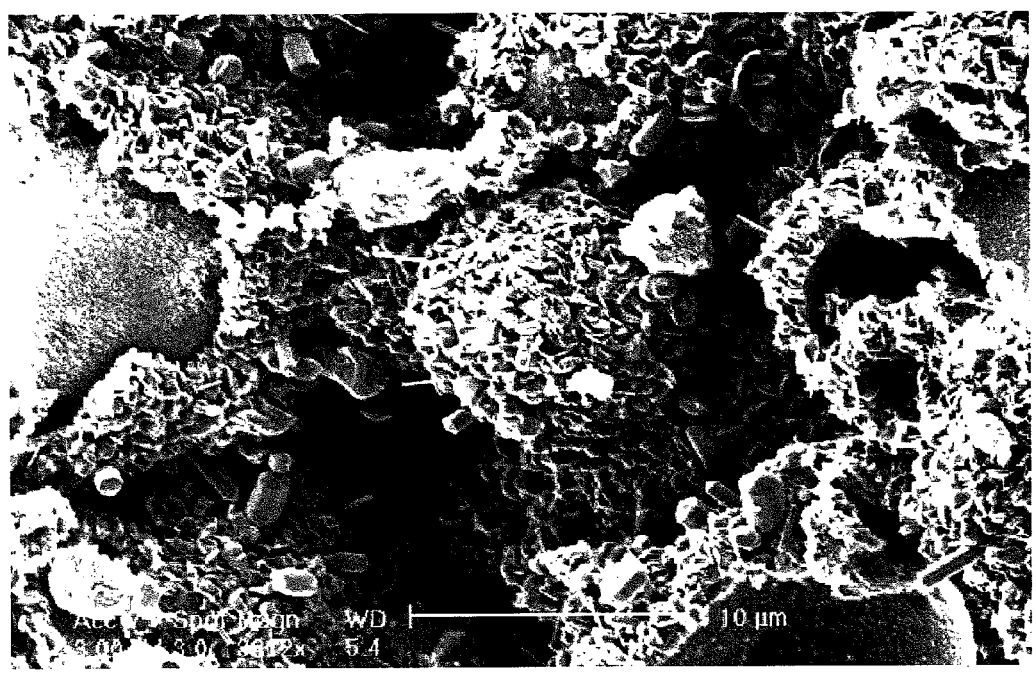
Figure 12:
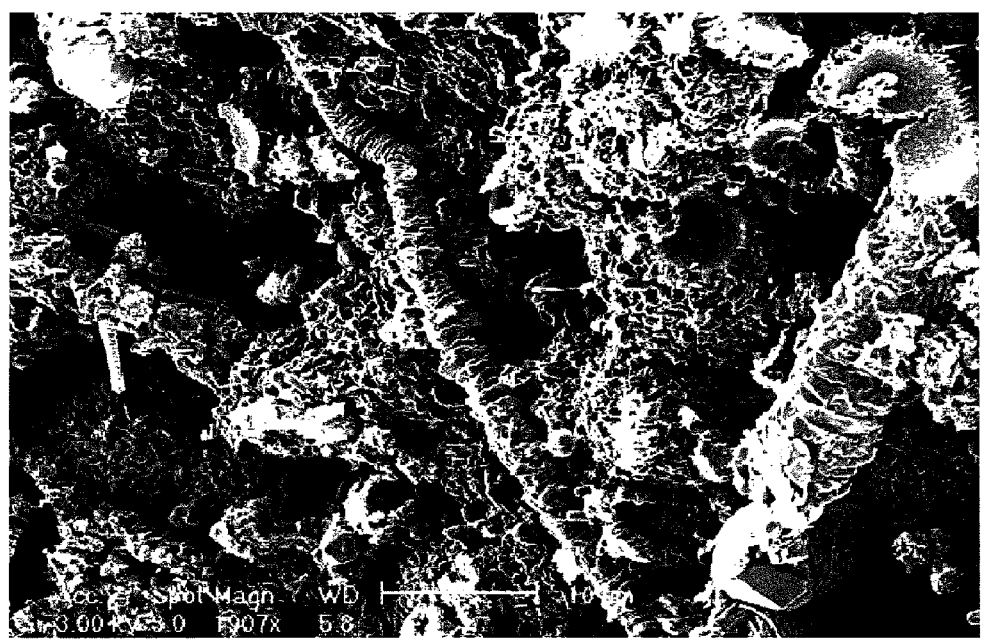

FIGS. 11 and 12 are electron microscope photographs of high magnification showing the portion of the vapor-phase-grown graphite A, in which vapor-phase-grown graphite of various nano-structures such as a flat nano-structure similar to graphene, a special fiber structure having a length of several tens micrometers formed by lamination of flat layers, and structures in the form, like needle and pencil, similar to carbon nanotubes were observed.

Figure 19:

As shown in an electron microscope photograph of FIG. 19, a lot of vapor-phase-grown graphites of novel structures (for example, a structure having a tip in the form of polygonal cone and a structure having a cavity at a center of cross-section) having a polygonal cross-section such as octagonal or decagonal cross-section of a micron size and grown in a longitudinal direction were generated.

As shown in electron microscope photographs of FIGS. 20, 21, 22, 80 and 81, the vapor-phase-grown graphite generated inside the filler has a novel structure, in which graphite spheres of about 10 nm and highly ordered fullerene structures are overlapped with each other and there are cavities of several tens of nanometers. More specifically, the diameter of the graphite spheres is from about 1 nm to about 50 nm, and the diameter of the cavities is from about 1 nm to about 50 nm.

Figure 13:
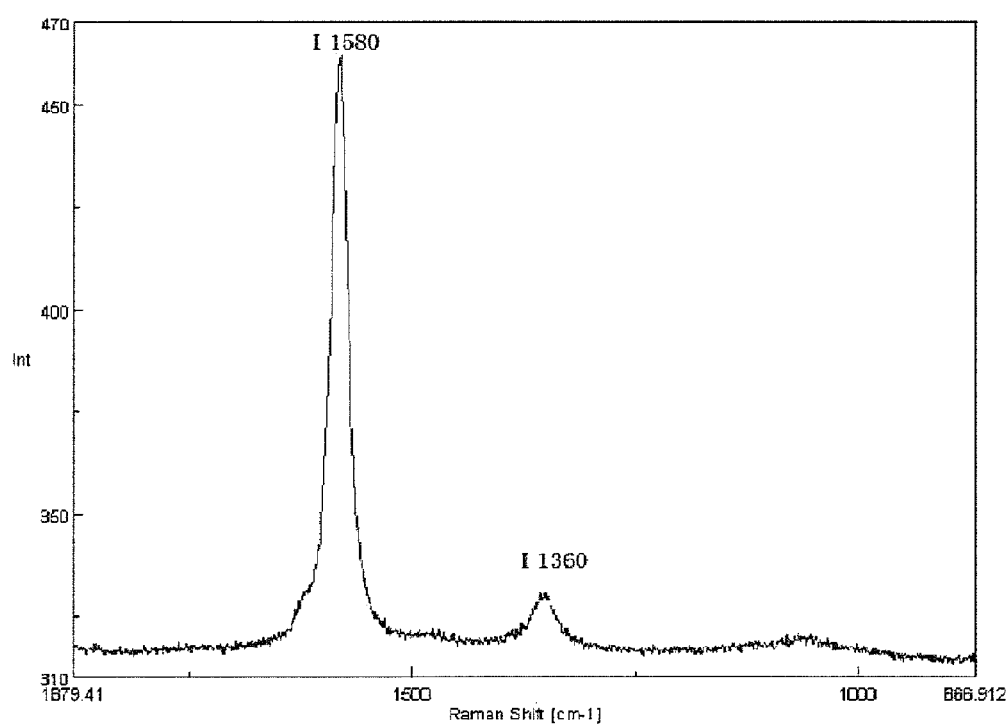
Figure 14:
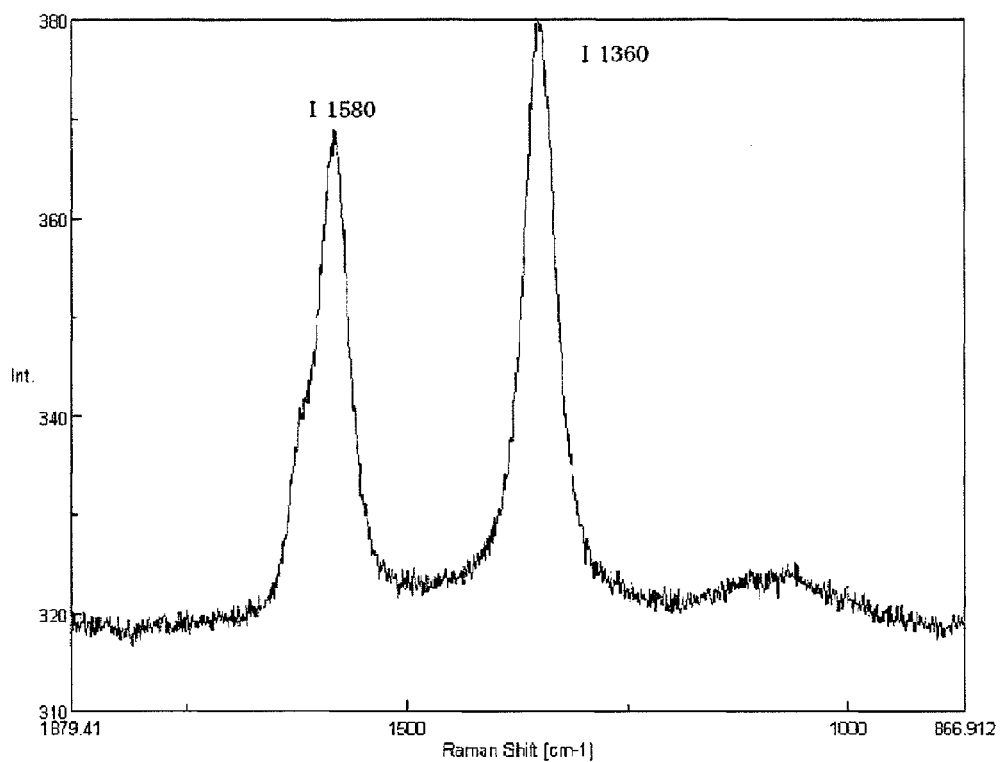
Figure 79:
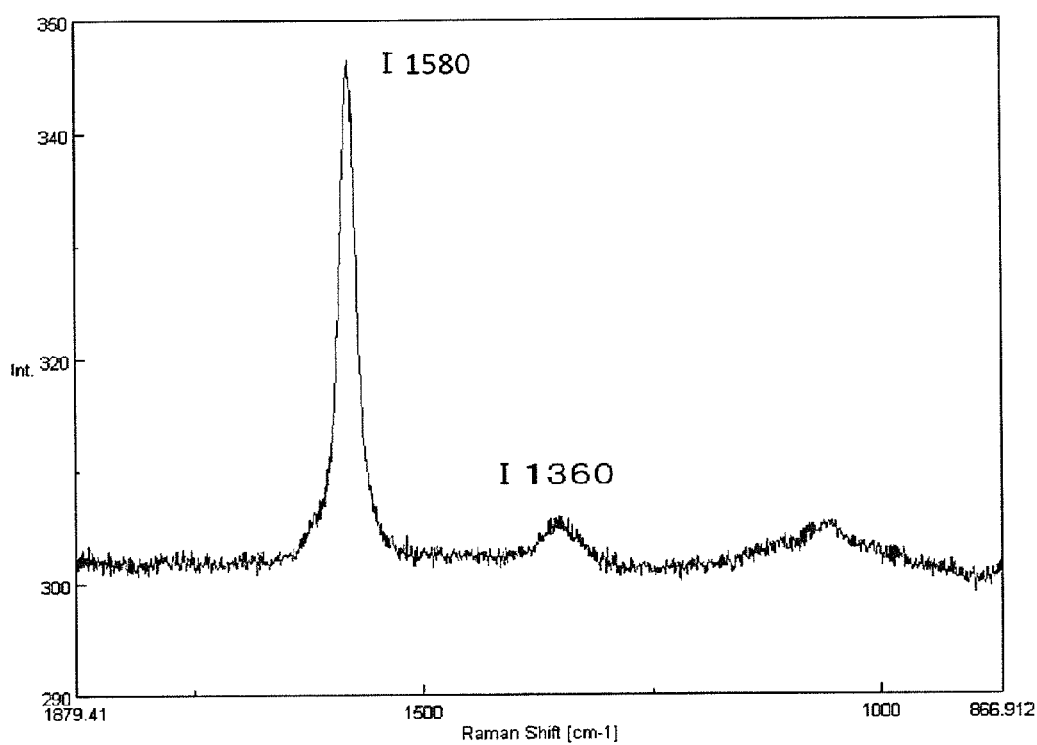

(FIG. 13) Laser Raman spectra of vapor-phase-grown graphites A and B are shown in FIGS. 13 and 79, respectively. In FIG. 13, R value represented by I1360/I1580 ($I_D/I_G$), which is a peak intensity ratio of a peak around 1580 $cm^{-1}$ that reflects lamination structure to a peak around 1360 $cm^{-1}$ that reflects turbostratic structure, according to spectrum of carbon hexagonal planes by laser Raman spectroscopy, is 0.085, and in FIG. 79, R value is 0.084, and the both R values are extremely low, which indicates that the graphite structure is one having high crystallinity of graphite. Raman spectrum of the outer surface (shell) C of the spherical phenol resin which is a thermosetting resin and a hardly graphitizable resin is shown in FIG. 14, and R value is 1.200 which is close to a value of high hardness glassy carbon.

A bamboo spatula was lightly pressed and slid on the surface of the obtained vapor-phase-grown graphite structure, resulting in occurrence of a mark in graphite color. An electron microscope photograph of the mark in graphite color is shown in FIG. 5, which indicates that by pressing the vapor-phase-grown graphite with the spatula, the carbon hexagonal planes changed its forms while sliding in parallel with the plane surface.

Example 2

Phenol formaldehyde resin powder having an average particle size of 20 μm was pre-baked at 750° C. in an inert gas atmosphere. The pre-baked starting material powder was charged in a graphite crucible and a screw type top cover was closed to seal the crucible. As a material for the graphite crucible, isotropic graphite having a bulk density of 1.85, an open pore ratio of 8%, a porosity of 2 μm, a heat conductivity of 140 W/(m·K) and inner dimensions of ϕ50×100 mm was used. After the sealing, the graphite crucible was heated up to 700° C. in one hour in argon gas stream, followed by heating up to a maximum ultimate temperature of 2000° C. at a temperature elevating rate of 500° C. per hour, holding that temperature for one hour and then decreasing the temperature to room temperature. A required period of time between charging to and discharging from the graphite crucible was 22 hours. The top cover of the graphite crucible was opened and the material inside the crucible was discharged. While the pre-baked starting material was a fine powder when charged in the crucible, the material remained in a state of fine powder, and the vapor-phase-grown graphite structure could not be obtained.

Example 3

Phenol formaldehyde resin powder having an average particle size of 20 μm was subjected to baking for carbonization at 1200° C. in an inert gas atmosphere. The amount of hydrogen contained in the starting material after the baking was 0.05% by weight. The baked starting material powder was charged in a graphite crucible and a screw type top cover was closed to seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2100° C. and a maximum ultimate pressure of 200 MPa, respectively at a temperature elevating rate of 500° C. per hour, holding the temperature and pressure for one hour and then decreasing the temperature to room temperature and lowering the pressure. The top cover of the graphite crucible was opened and the material inside the crucible was discharged. While the starting material was a fine powder when charged in the crucible, the material remained in a state of fine powder, and the vapor-phase-grown graphite structure could not be obtained.

Example 4

Phenol formaldehyde resin powder having an average particle size of 20 μm was pre-baked at 750° C. in an inert gas atmosphere. The pre-baked starting material powder was charged in a graphite crucible, and the graphite crucible was charged in hot isostatic pressing equipment without closing a top cover, and then the inside temperature and pressure were increased to reach 700° C. and 70 MPa, respectively in one hour using argon gas, followed by heating and pressing up to a maximum ultimate temperature of 2100° C. and a maximum ultimate pressure of 200 MPa, respectively at a temperature elevating rate of 500° C. per hour, holding the temperature and pressure for one hour and then decreasing the temperature to room temperature and lowering the pressure. While the starting material before the pre-baking was a fine powder when charged in the crucible, vapor-phase-grown graphite was slightly generated around the pre-baked starting material and a structure having sufficient strength could not be obtained.

Example 5

Phenol formaldehyde resin powder having an average particle size of 20 μm was pre-baked at 750° C. in an inert gas atmosphere. The pre-baked starting material powder was charged in a graphite crucible and a screw type top cover was closed to seal the crucible. As a material for the graphite crucible, isotropic graphite having a bulk density of 1.85, an open pore ratio of 8%, a porosity of 2 μm, a heat conductivity of 140 W/(m·K) and inner dimensions of ϕ50×100 mm was used. A spacer having the same material quality as that of the ϕ50×100 mm crucible was used as a weight on the top of the starting material powder. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2100° C. and a maximum ultimate pressure of 200 MPa, respectively at a temperature elevating rate of 500° C. per hour, holding the temperature and pressure for one hour and then decreasing the temperature to room temperature and lowering the pressure. The top cover of the graphite crucible was opened and the material inside the crucible was discharged, and thus, a molded article of ϕ46×50 mm was obtained. While the starting material before the pre-baking was a fine powder when charged in the crucible, the material changed to one structure having sufficient strength. The bulk density of the obtained vapor-phase-grown graphite structure was 1.4, and the open pore ratio and total ash content thereof were 33% and 0.005% by weight, respectively.

Example 6

Phenol formaldehyde resin powder having an average particle size of 20 μm was pre-baked at 750° C. in an inert gas atmosphere. A starting material prepared by adding 10% by weight of 3 mm long carbon fibers to the pre-baked powder was charged in a graphite crucible and a screw type top cover was closed to seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2100° C. and a maximum ultimate pressure of 200 MPa, respectively at a temperature elevating rate of 500° C. per hour, holding the temperature and pressure for one hour and then decreasing the temperature to room temperature and lowering the pressure. The top cover of the graphite crucible was opened and the material inside the crucible was discharged, and thus, an integrated composite material of ϕ46×70 mm comprising carbon fibers, vapor-phase-grown graphite and carbide of the starting material powder was obtained.

Example 7

Phenol formaldehyde resin powder having an average particle size of 20 μm was pre-baked at 750° C. in an inert gas atmosphere. A starting material prepared by adding 10% by weight of natural graphite powder having a particle size of 30 μm and 10% by weight of artificial graphite powder having a particle size of 20 μm to the pre-baked powder was charged in a graphite crucible and a screw type top cover was closed to seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2100° C. and a maximum ultimate pressure of 200 MPa, respectively at a temperature elevating rate of 500° C. per hour, holding the temperature and pressure for one hour and then decreasing the temperature to room temperature and lowering the pressure. The top cover of the graphite crucible was opened and the material inside the crucible was discharged, and thus, an integrated composite material of ϕ46×60 mm comprising carbon fibers, vapor-phase-grown graphite and carbide of the starting material powder was obtained.

Example 8

Phenol formaldehyde resin powder having an average particle size of 20 μm was pre-baked at 750° C. in an inert gas atmosphere. The pre-baked starting material powder was charged in a graphite crucible and a screw type top cover was closed to seal the crucible. After the sealing, the graphite crucible was charged in hot isostatic pressing equipment, and then the inside temperature and pressure were increased to reach 700° C. and 70 MPa, respectively in one hour using nitrogen gas, followed by heating and pressing up to a maximum ultimate temperature of 2000° C. and a maximum ultimate pressure of 200 MPa, respectively at a temperature elevating rate of 500° C. per hour, holding the temperature and pressure for one hour and then decreasing the temperature to room temperature and lowering the pressure. The top cover of the graphite crucible was opened and the material inside the crucible was discharged, and thus, a molded article of ϕ46×90 mm was obtained. The starting material changed to one structure having sufficient strength. The bulk density of the obtained vapor-phase-grown graphite structure was 1.0, and the open pore ratio and total ash content thereof were 50% and 0.005% by weight, respectively. The obtained structure showed a fluorescent X-ray peak indicating residual of nitrogen used as a pressing medium.

Example 9

The vapor-phase-grown graphite structure obtained in Example 1 was charged in a metal die and subjected to cold pressing at a load of 200 kgf to obtain a cubic molded article of 20 mm×20 mm×20 mm. The bulk density of the obtained molded article was 2.0.

Example 10

Figure 33:
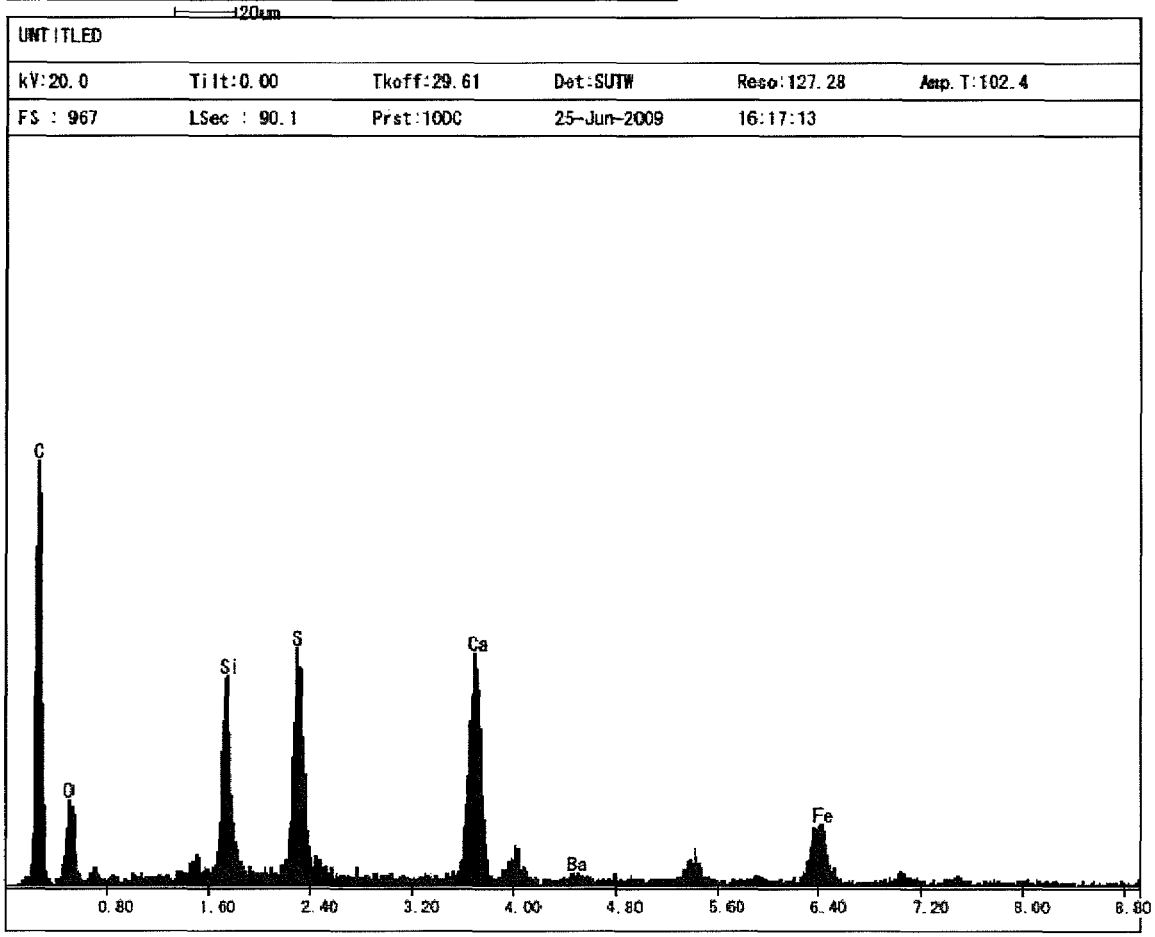

Phenol formaldehyde resin powder having an average particle size of 20 μm was pre-baked at a maximum ultimate temperature of 900° C. in an inert gas atmosphere. The amount of hydrogen remaining in the starting material after the pre-baking was measured in accordance with general rules on a method for determining an amount of hydrogen of a metallic material (JIS Z 2614: 1990), and the measured amount was 5000 ppm. Each of the starting materials pre-baked at each temperature was charged in a screw type graphite crucible made of a material having a bulk density of 1.80 and an open pore ratio of 10%, and a screw type top cover was turned to tighten the screw and seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 2500° C. and a maximum ultimate pressure of 190 MPa, respectively at a temperature elevating rate of 500° C. per hour, holding the temperature and pressure for one hour and then decreasing the temperature to room temperature and lowering the pressure. A required period of time between charging to and discharging from the graphite crucible was 8 to 12 hours. The bulk density of the treated sample was 1.15 g/cm$^3$, its apparent density was 1.68 g/cm$^3$, and its true density was 1.73 g/cm$^3$. Measurement of the density was carried out by a helium gas-substituted picnometer method with a densimeter AccuPyc 1330-PCW available from Shimadzu Corporation, and the true density was measured with the sample being pulverized into fine powder. The inside of the treated sample contained a lot of remains which seem to have resulted from etching by excited hydrogen of various vapor-phase-grown graphites as generated in Example 1. Particularly on the top of the sample were observed graphite fibers grown in the form of fiber from the vapor-phase-grown graphite, and on the inner wall of the used graphite crucible were observed rod-like continuous graphite grown on the peripheries of elements other than carbon. (FIG. 23 to FIG. 32) A fluorescent X-ray peak indicating presence of elements such as Si, Ca, Fe and Ba was obtained from the tip of the rod-like continuous graphite. (FIG. 33)

Example 11

Phenol formaldehyde resin powder having an average particle size of 20 μm was pre-baked at a maximum ultimate temperature of 900° C. in an inert gas atmosphere. The amount of hydrogen remaining in the starting material after the pre-baking was measured in accordance with general rules on a method for determining an amount of hydrogen of a metallic material (JIS Z 2614: 1990), and the measured amount was 5000 ppm. A mixture of 2 parts by weight of the pre-baked starting material and 1 part by weight of artificial graphite powder having an average particle size of 5 μm was charged in a screw type graphite crucible made of a material having a bulk density of 1.80 and an open pore ratio of 10%, and a screw type top cover was turned to tighten the screw and seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 1800° C. and a maximum ultimate pressure of 190 MPa, respectively at a temperature elevating rate of 500° C. per hour, holding the temperature and pressure for one hour and then decreasing the temperature to room temperature and lowering the pressure. The bulk density of the treated sample was 0.4 g/cm$^3$, its apparent density was 2.11 g/cm$^3$, and its true density was 2.16 g/cm$^3$.

Figure 34:
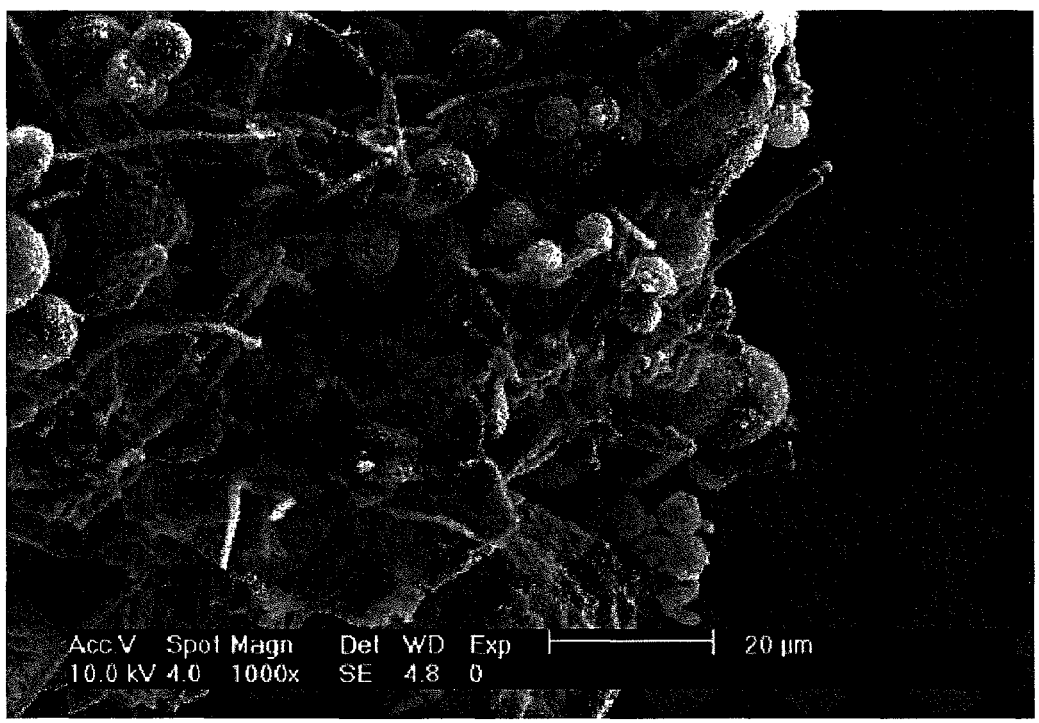
Figure 36:
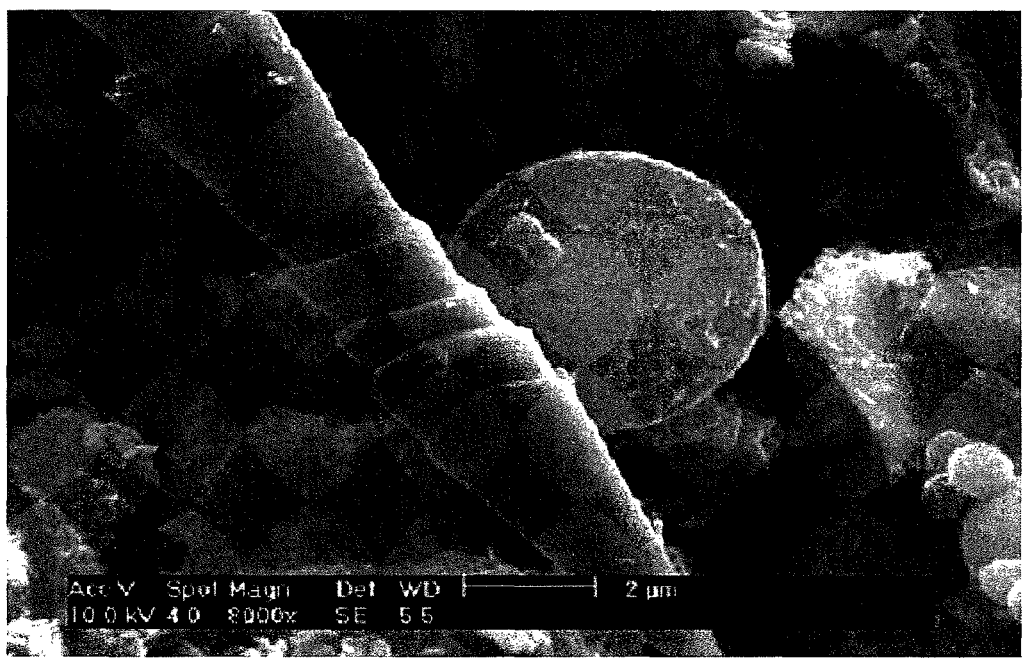

Measurement of the density was carried out by a helium gas-substituted picnometer method with a densimeter Accu-Pyc 1330-PCW available from Shimadzu Corporation, and the true density was measured with the sample being pulverized into fine powder. Vapor-phase-grown graphite fibers having a diameter of several micrometers and a length of from several tens micrometers to several millimeters had been generated on the treated sample. In these vapor-phase-grown graphite fibers, a fiber formed by connection of a linear one and triangular pyramid one which seems to be carbon nanohorn was observed. (FIG. 34 to FIG. 36)

Example 12

Figure 37:
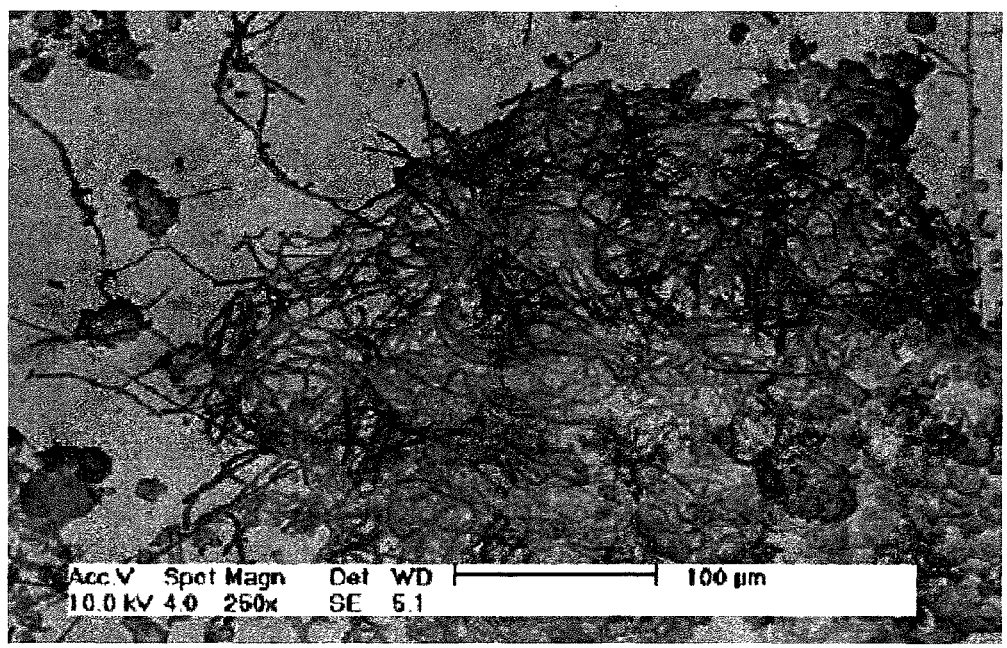
Figure 39:
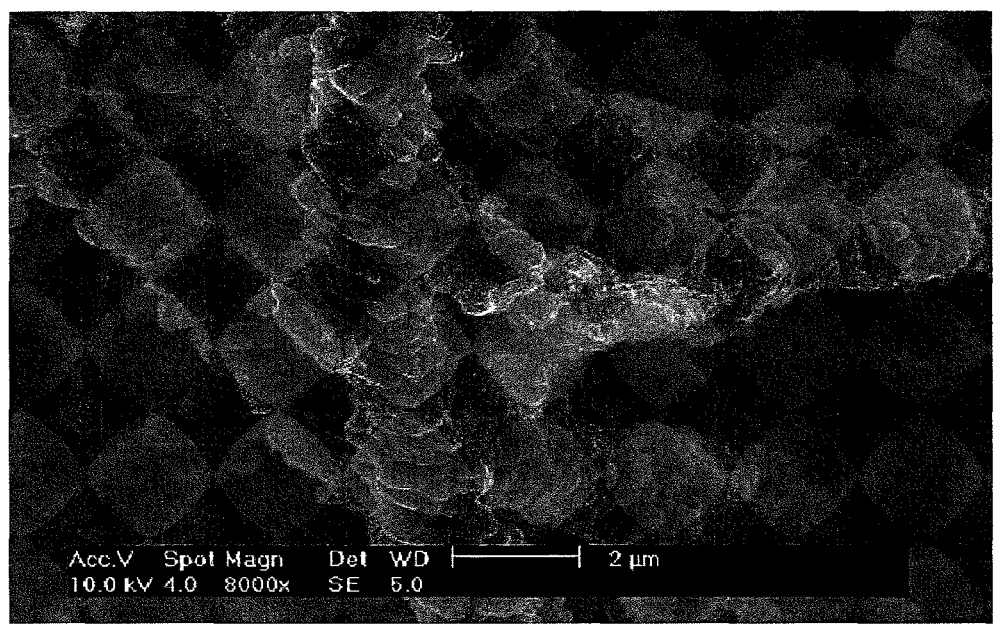

Phenol formaldehyde resin powder having an average particle size of 20 μm was pre-baked at a maximum ultimate temperature of 900° C. in an inert gas atmosphere. The amount of hydrogen remaining in the starting material after the pre-baking was measured in accordance with general rules on a method for determining an amount of hydrogen of a metallic material (JIS Z 2614: 1990), and the measured amount was 5000 ppm. A mixture of 2 parts by weight of the pre-baked starting material and 1 part by weight of mesophase spherical graphite powder having an average particle size of 25 μm was charged in a screw type graphite crucible made of a material having a bulk density of 1.80 and an open pore ratio of 10%, and a screw type top cover was turned to tighten the screw and seal the crucible. After the sealing, the graphite crucible was charged in hot isostatic pressing equipment, and then the inside temperature and pressure were increased to reach 700° C. and 70 MPa, respectively in one hour using argon gas, followed by heating and pressing up to a maximum ultimate temperature of 1800° C. and a maximum ultimate pressure of 190 MPa, respectively at a temperature elevating rate of 500° C. per hour, holding the temperature and pressure for one hour and then decreasing the temperature to room temperature and lowering the pressure. The bulk density of the treated sample was 1.12 g/cm$^3$, its apparent density was 2.01 g/cm$^3$, and its true density was 2.06 g/cm$^3$. Measurement of the density was carried out by a helium gas-substituted picnometer method with a densimeter AccuPyc 1330-PCW available from Shimadzu Corporation, and the true density was measured with the sample being pulverized into fine powder. Vapor-phase-grown graphite fibers having a diameter of several micrometers and a length of from several tens micrometers to several millimeters had been generated in the treated sample. In these vapor-phase-grown graphite fibers, a fiber formed by connection of a linear one and triangular pyramid one which seems to be carbon nanohorn was observed. (FIG. 37 to FIG. 39)

Example 13

Figure 41:
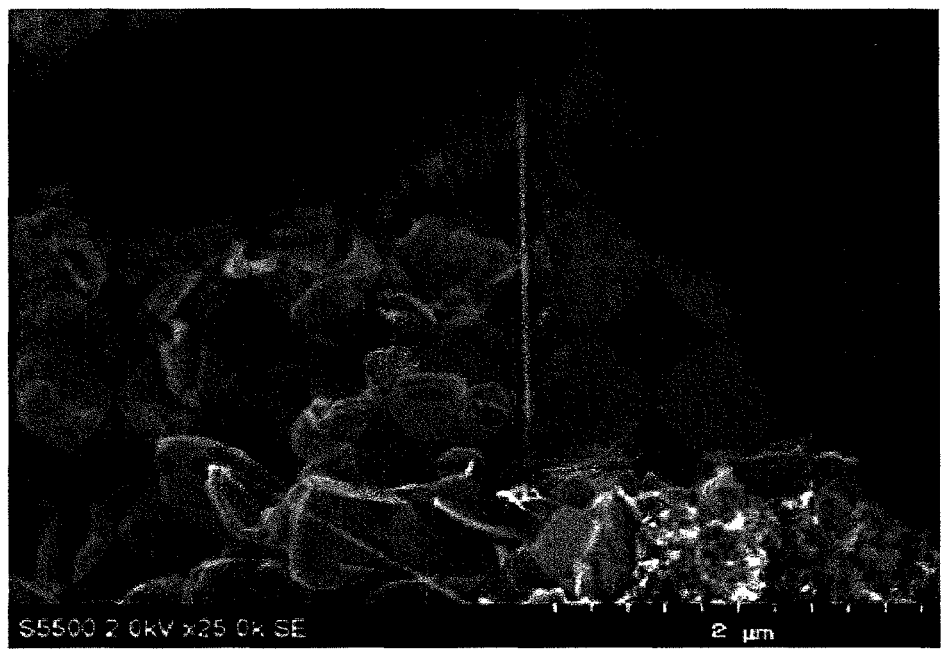
Figure 42:
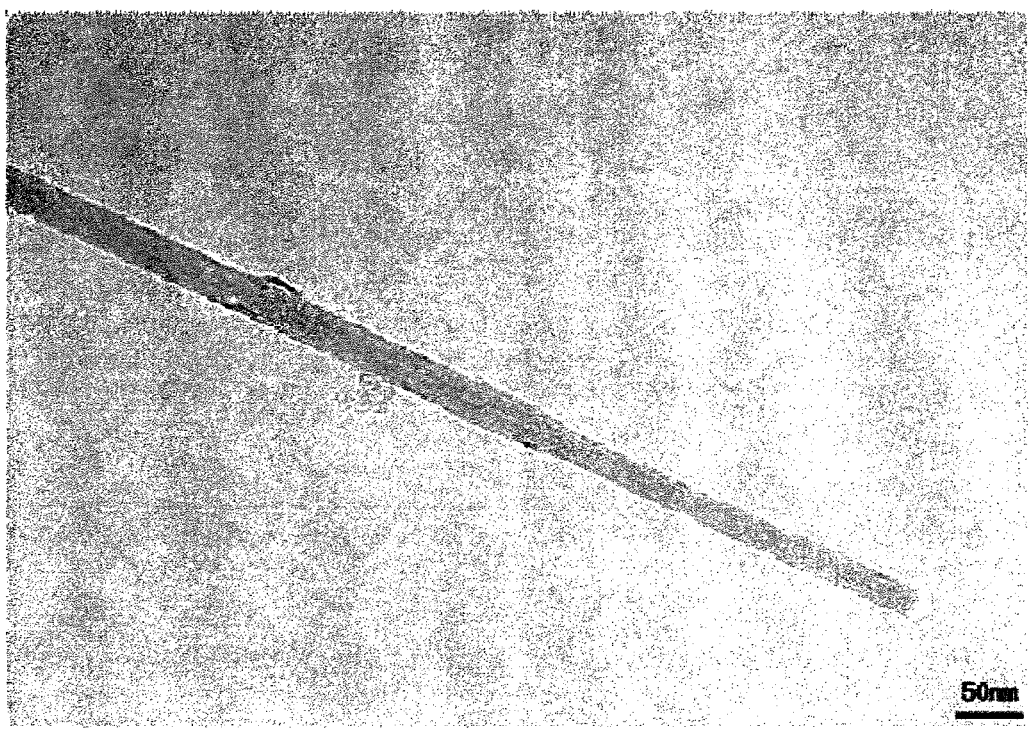

Spherical phenol resin was pre-baked at a maximum ultimate temperature of 900° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 3500 ppm. The pre-baked starting material was poured into a platinum crucible and was subjected to ashing in an electric oven. The sample formed into ashes was added to an alkali mixture solvent to be dissolved, followed by extraction with hydrochloric acid and then elemental analysis with an inductively coupled plasma spectrometry (ICPS) analyzer ICPS-8000 (available from Shimadzu Corporation). As a result of the analysis, the amounts of Fe, Si and Zn contained in the pre-baked starting material were 500 ppm, 200 ppm and 120 ppm, respectively. This pre-baked starting material was charged in a screw type (FIG. 40) graphite crucible, and a screw type top cover was turned to tighten the screw and seal the crucible. The graphite crucible was charged in hot isostatic pressing equipment, and then the inside temperature was increased to 2000° C. at a temperature elevating rate of 1000° C. per hour while carrying out isostatic pressing at 190 MPa using argon gas. CNT having an outer diameter of about 10 nm to about 50 nm and being excellent in linearity was generated slightly on the treated product. (FIGS. 41 and 42)

Figure 45:
Figure 46:
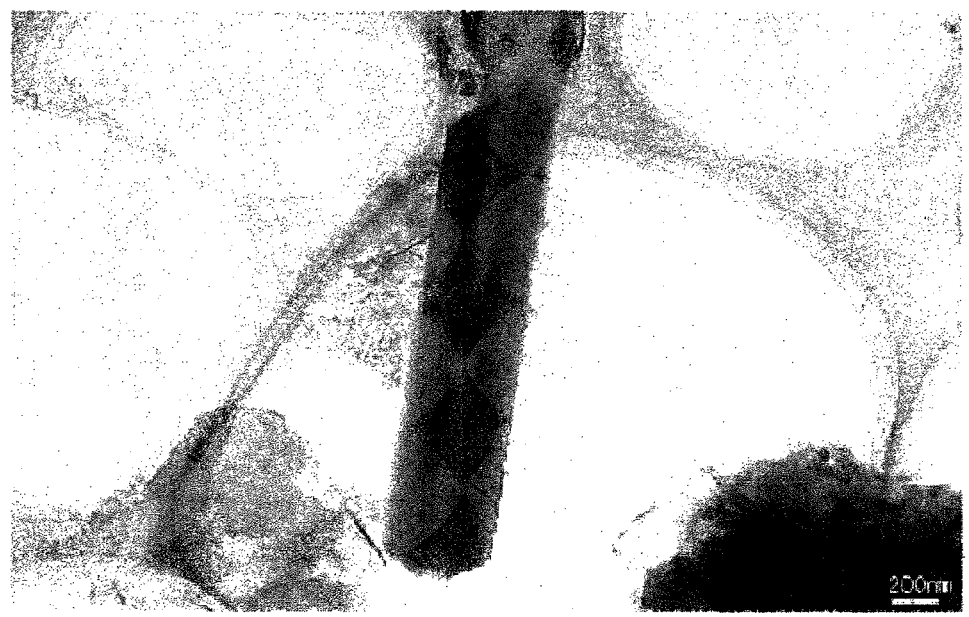

The generated products were CNT being in a process of forming into MWCNT, in which a second layer and a third layer of carbon hexagonal planes were stacked on the surface of the single CNT (FIG. 43), vapor-phase-grown graphites formed by stacking of carbon hexagonal planes flatly (FIG. 41), and carbon materials having a novel pencil-like structure formed by stacking of carbon hexagonal planes around CNT so that the cross-section was in a polygonal shape and the tube became a center of the material (FIGS. 44, 45 and 46). It can be considered that these were generated in the HIP treatment in such a manner that growth of CNT occurred in a lengthwise direction in a low temperature range, growth of carbon such as graphene occurred on the surface of the CNT in a diameter direction as the temperature became higher, and at a temperature of 1500° C. or more, growth in a diameter direction was accelerated.

In the pencil-like carbon material, its portion corresponding to a lead had an outer diameter of from about 0.5 μm to about 2 μm and a length of from about 2 μm to about 20 μm, its center was a hollow of CNT, and its cross-sectional structure was polygonal. The pencil-like carbon material was one having extremely high crystallinity, in which carbon hexagonal planes were oriented in an axial direction of the tube in the same manner as in CNT.

Example 14

Spherical phenol resin was pre-baked at a maximum ultimate temperature of 900° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 3000 ppm. The amounts of Fe, Si and Zn contained in the pre-baked starting material were measured by the same method as in Example 13, and the amounts of Fe, Si and Zn were 500 ppm, 200 ppm and 150 ppm, respectively. This pre-baked starting material was charged in a screw type (FIG. 40) graphite crucible, and a screw type top cover was turned to tighten the screw and seal the crucible. The sealed graphite crucible containing the pre-baked starting material was charged in HIP equipment, and then the inside temperature was increased to 1500° C. at a temperature elevating rate of 500° C. per hour while carrying out isostatic pressing at 190 MPa using argon gas. CNT having an outer diameter of about 10 nm to about 50 nm and being excellent in linearity was generated slightly on the treated product.

Figure 47:
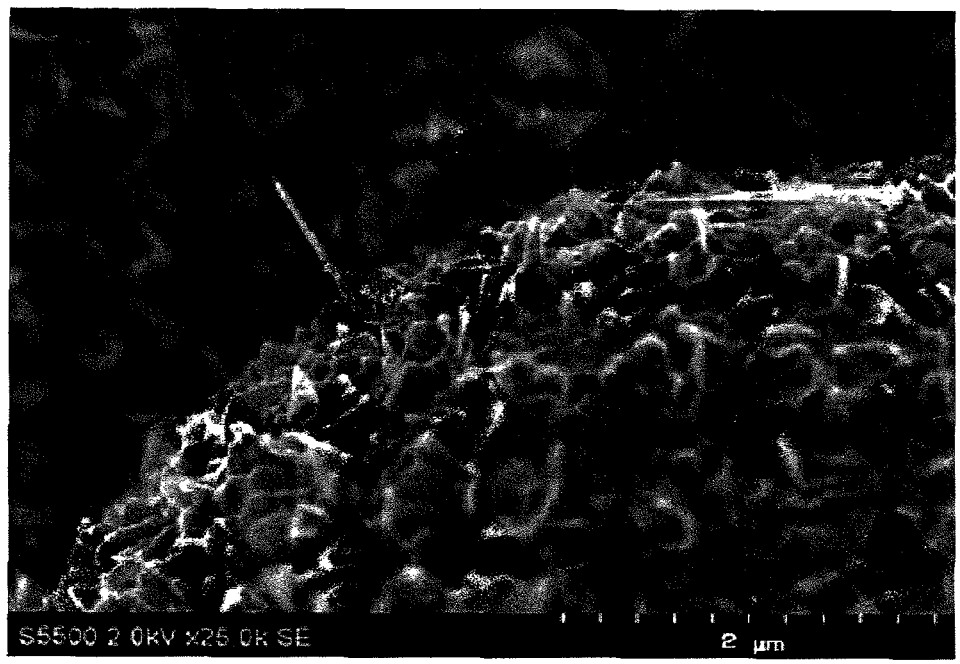

On the surface of the slightly generated single CNT were stacked a second layer and a third layer of carbon hexagonal planes, and this CNT was one being in a process of forming into MWCNT, and a pencil-like carbon material as observed in Example 13 was not observed. In addition, a lot of flaky stacked graphite was generated. (FIG. 47)

Example 15

Spherical phenol resin was pre-baked at a maximum ultimate temperature of 900° C. in a nitrogen gas stream. The amounts of Fe, Si and Zn contained in the pre-baked starting material were measured by the same method as in Example 13, and the amounts of Fe, Si and Zn were 500 ppm, 200 ppm and 120 ppm, respectively. This pre-baked starting material was charged in a screw type (FIG. 40) graphite crucible, and a screw type top cover was turned to tighten the screw and seal the crucible. The sealed graphite crucible containing the pre-baked starting material was charged in HIP equipment, and then the inside temperature was increased to 1200° C. at a temperature elevating rate of 500° C. per hour while carrying out isostatic pressing at 190 MPa using argon gas. A large diameter hose-like CNT having a thickness of from about 10 nm to about 20 nm, an outer diameter of from about 100 nm to about 200 nm and a length of from about 10 μm to about 20 μm was generated slightly on the treated product.

Example 16

Figure 49:
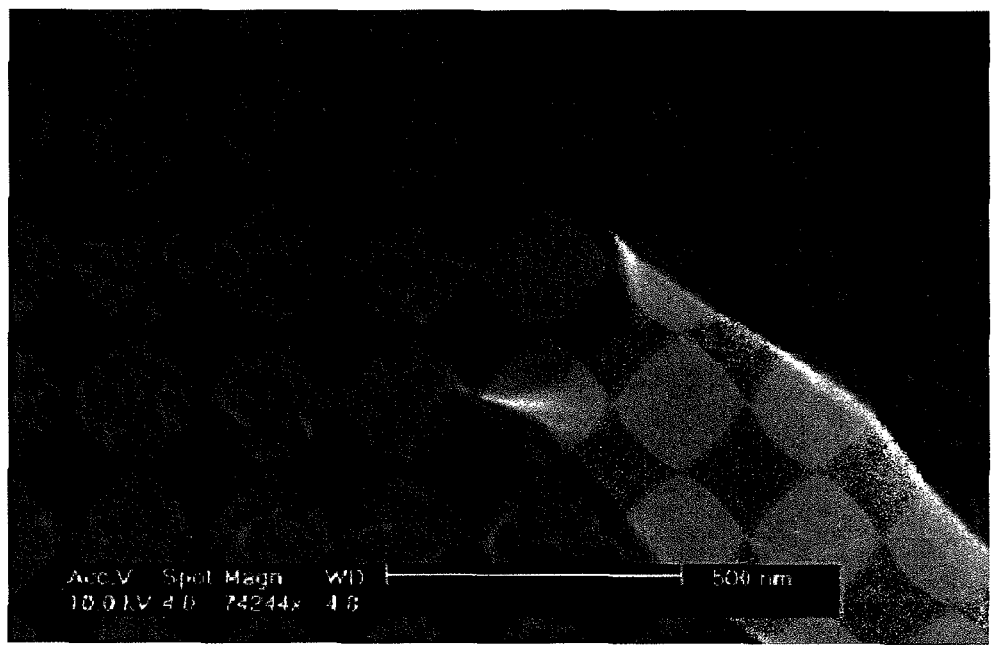
Figure 50:
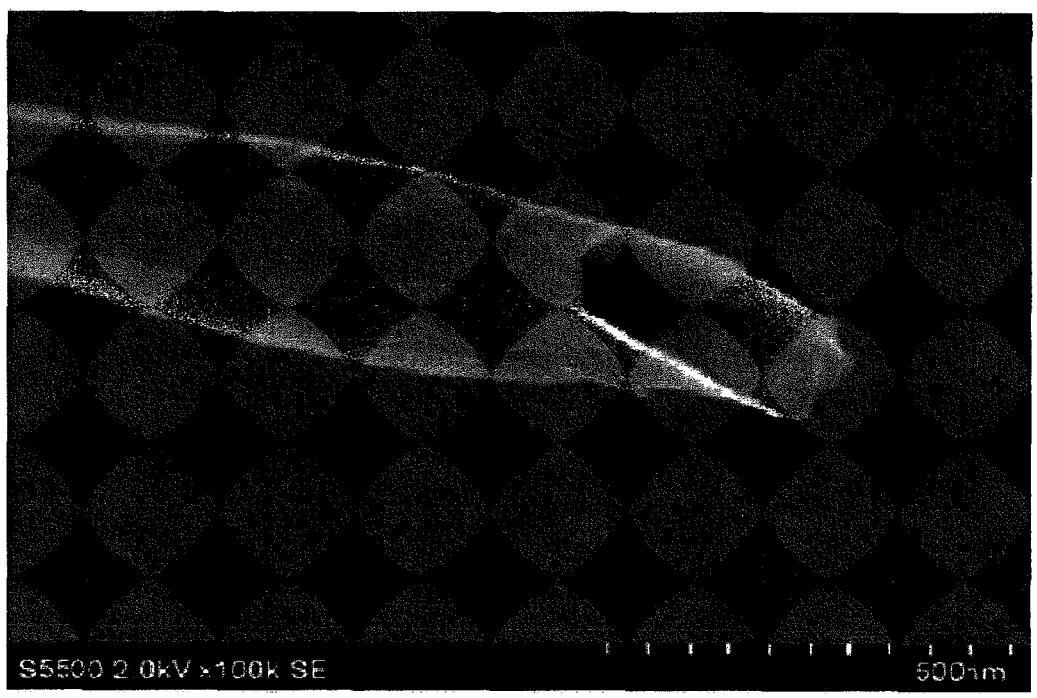

Spherical phenol resin was pre-baked at a maximum ultimate temperature of 900° C. in a nitrogen gas stream. One part by weight of metallic silicon powder was mixed to four parts by weight of the pre-baked starting material, and after pulverizing and mixing the mixture in an agate mortar, the powder of the starting material was charged in a screw type graphite crucible, and a screw type top cover was turned to tighten the screw and seal the crucible. The sealed graphite crucible containing the pre-baked starting material was charged in HIP equipment, and then the inside temperature was increased to 1200° C. at a temperature elevating rate of 500° C. per hour while carrying out isostatic pressing at 190 MPa using argon gas. A lot of large diameter hose-like CNT having a thickness of from about 10 nm to about 20 nm, an outer diameter of from about 100 nm to about 200 nm and a length of from about 10 μm to about 20 μm were generated on the treated product. The cross-section of the hose-like CNT was circular, elliptical or polygonal, and was featured by being thin and long for its diameter as compared with conventional reported CNT. A ratio of the thickness to the outer diameter was less than 5%. (FIGS. 48, 49 and 50)

Example 17

Spherical phenol resin was pre-baked at a maximum ultimate temperature of 600° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 24000 ppm. To 1 mol of cobalt acetylacetonate (Special Grade available from NACALAI TESQUE, INC., hereinafter referred to as Co(AcAc)2 was mixed 10 liter of methoxyethanol (available from NACALAI TESQUE, INC., purity: 99%). In this case, since Co(AcAc)2 was solidified soon, the mixture was sufficiently pulverized and stirred with a glass rod or a stirrer. Thereafter, a specific amount, totally 100 ml of distilled water was dividedly added dropwise to the mixture with a syringe or a micropipet. The precipitate generated at the same time as the addition was allowed to stand overnight, and the solution containing the precipitate was subjected to filtration under reduced pressure with an aspirator equipped with a diaphragm pump to recover the precipitate only. The obtained precipitate was air-dried in a draft for 24 hours. The cobalt precipitate and the pre-baked material were dry-mixed to give a starting material to be subjected to HIP treatment with a cobalt concentration of 5000 ppm assuming that the total cobalt used initially had been precipitated in the generated precipitate (cobalt precipitate). The mixture was charged in a screw type graphite crucible, and a screw type top cover was turned to tighten the screw and seal the crucible. The sealed graphite crucible containing the starting material was charged in HIP equipment, and then the inside temperature was increased to 1450° C. at a temperature elevating rate of 500° C. per hour while carrying out isostatic pressing at 190 MPa using argon gas.

Figure 53:
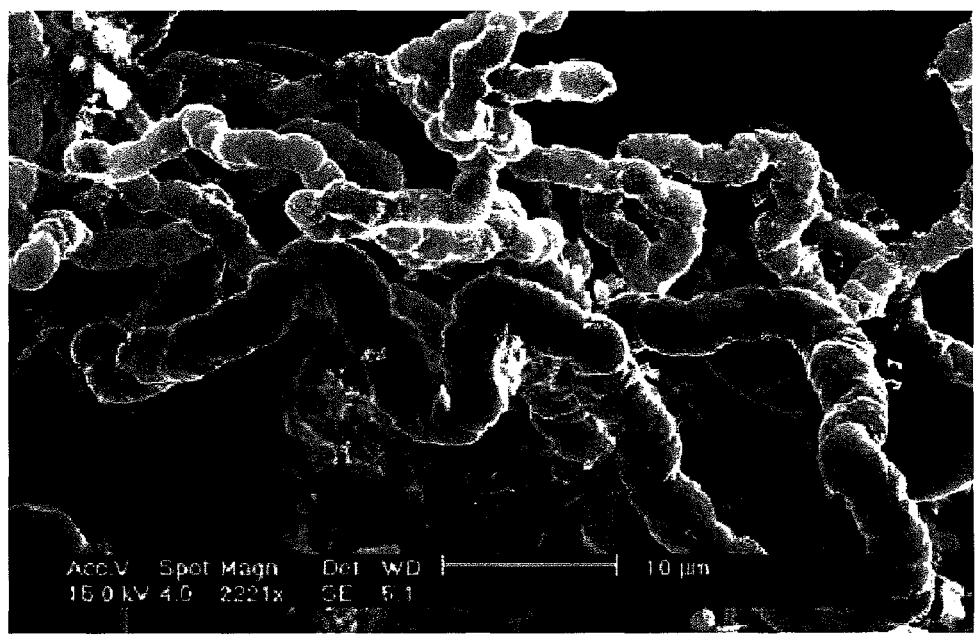

A lot of fibrous carbon was generated on the surfaces of the treated sample. There were four kinds of products generated, that is, carbon nanohorn-stacked carbon nanofibers (CNF) in the form of bamboo having a diameter of from about 200 nm to about 1000 nm and a length of from about 10 μm to about several millimeters (FIG. 51), graphene-laminated CNF having a diameter of from about 200 nm to about 1000 nm and a length of from about 10 μm to about several millimeters (FIG. 52), and cup-stacked type and screw type CNF having a diameter of from about 500 nm to about 2000 nm and a length of about several millimeters (FIG. 53). In any of the products, many long fibers were generated on the surface portion of the sample, and short fibers were generated around the spherical phenol resin.

Example 18

Spherical phenol resin was pre-baked at a maximum ultimate temperature of 600° C. in a nitrogen gas stream. Cobalt chloride hexahydrate was dissolved in ethanol to prepare a 0.6 mol/liter solution. Then, 120 g of the pre-baked phenol resin was poured into 500 ml of this solution, followed by sufficiently stirring with a stirrer. The residue after filtration of ethanol was put in a ceramic vessel and heated at 400° C. in the atmosphere in an electric oven for five hours to prepare a pre-baked starting material carrying a catalyst thereon. The concentration of cobalt measured by fluorescent X-ray analysis (SEM-EDX) was 3000 ppm. The pre-baked starting material carrying the catalyst thereon was charged in a screw type graphite crucible, and a screw type top cover was turned to tighten the screw and seal the crucible. The sealed graphite crucible containing the starting material was charged in HIP equipment, and then the inside temperature was increased to 1400° C. at a temperature elevating rate of 300° C. per hour while carrying out isostatic pressing at 190 MPa using argon gas.

Figure 55:
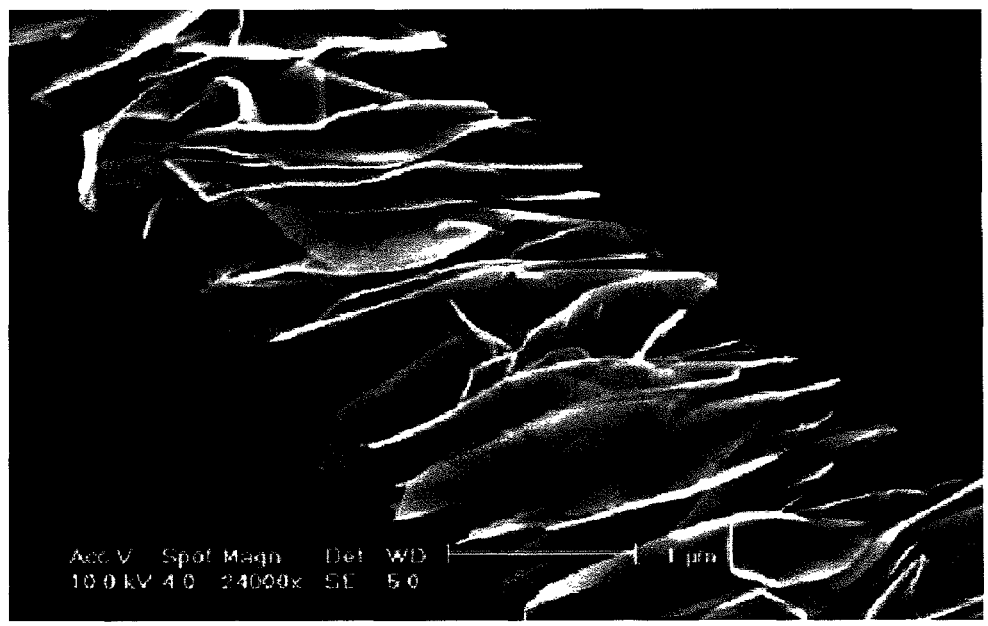

A lot of graphene-stacked CNF having a diameter of from about 0.5 microns to about several microns were generated on the treated sample. Also, CNT having a thin tip and an outer diameter of about 100 nm was generated slightly around the spherical phenol resin. (FIG. 54) The thickness of one layer of the graphene-stacked CNF was about several nanometers. (FIG. 55)

Example 19

Spherical phenol resin was pre-baked at a maximum ultimate temperature of 600° C. in a nitrogen gas stream. Cobalt precipitate was prepared by treating in the same manner as in Example 17. The cobalt precipitate and the pre-baked starting material were dry-mixed to give a starting material to be subjected to HIP treatment with a cobalt concentration of 5000 ppm assuming that the total cobalt used initially had been precipitated in the cobalt precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 1200° C. at a temperature elevating rate of 500° C. per hour while carrying out isostatic pressing at 190 MPa using argon gas.

A lot of CNT with a nearly circular cross-section having an outer diameter of from about 100 nm to about 300 nm, a thickness of from about 10 nm to about 30 nm and a length of from about 10 μm to about 10 mm were generated on the treated product. The CNT was featured by having a thin thickness for its diameter as compared with conventional reported CNT, and a ratio of the thickness to the outer diameter was less than 20%. (FIGS. 56, 57, 58 and 59)

Figure 60:
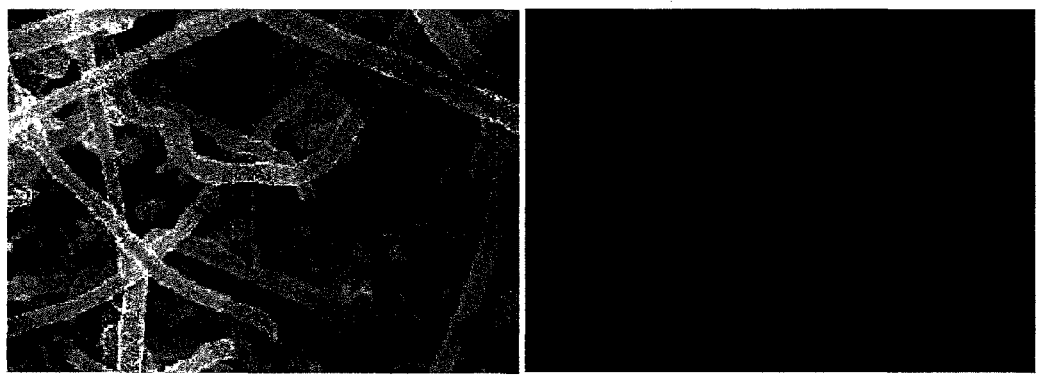
Figure 61:
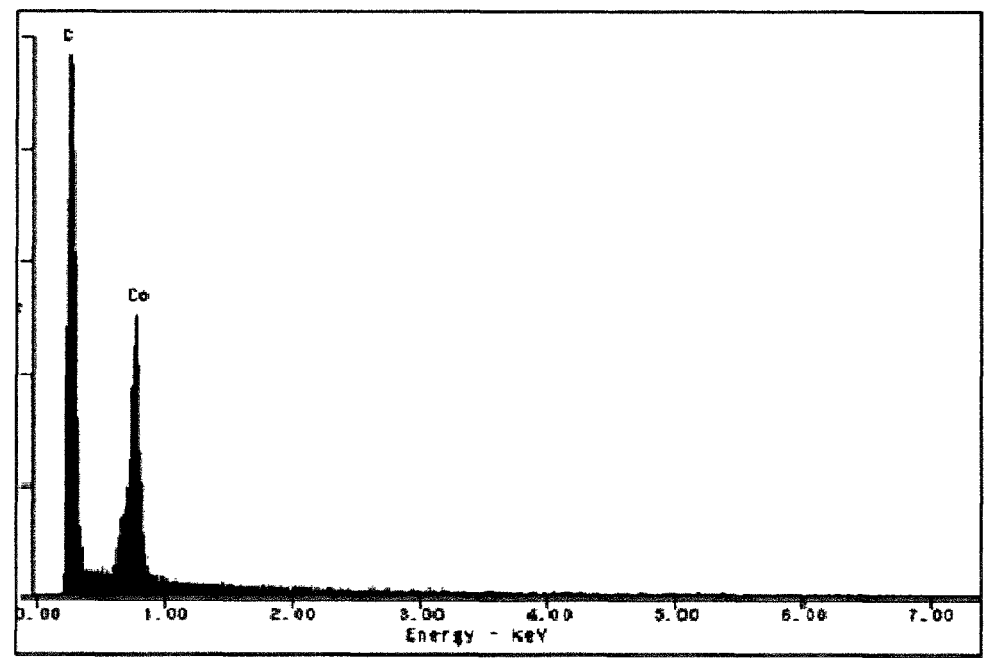

FIG. 60 shows a fluorescent X-ray map of generated CNT portion, and it was confirmed that cobalt used as a catalyst was present in a size of from about 100 nm to about 200 nm (in the form of dots) and functioned as a starting point for generating CNT. FIG. 61 shows a fluorescent X-ray peak of the tip portion of the CNT.

Figure 63:
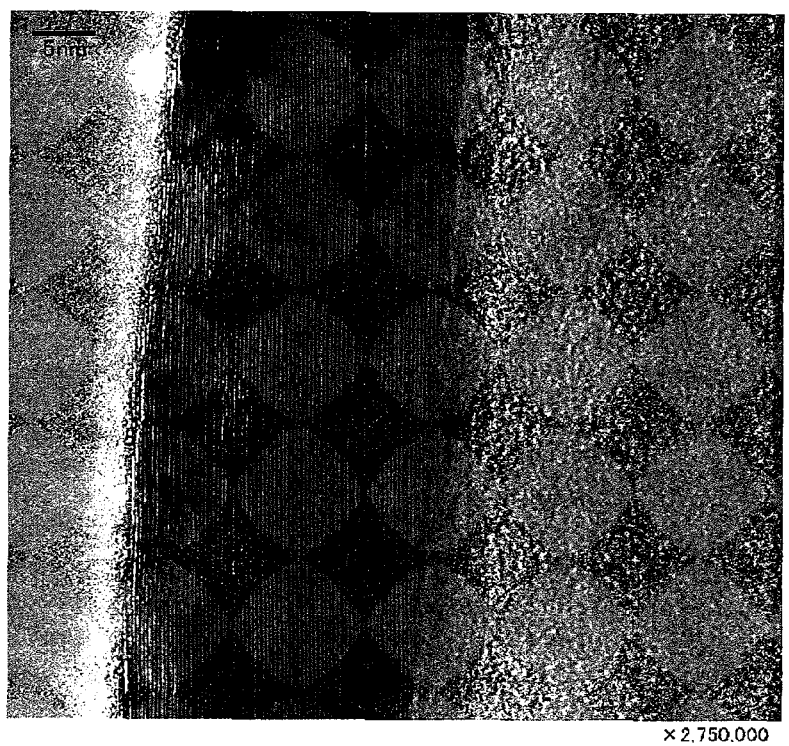

FIG. 62 shows a TEM photograph of the obtained CNT, which indicates the measured thickness of the tube wall and the measured inner diameter thereof. The outer diameter was 193.5 nm, and the thickness was from 24.3 to 24.4 nm, and the ratio of the thickness to the outer diameter was about 13%. A lattice fringe image of a TEM photograph showing that graphene layers are stacked in the thickness direction of this CNT is shown in FIG. 63. The photograph indicates an image comprising about 70 layers of laminated graphene, and this CNT was confirmed to be a multi-layer CNT having extremely good crystallinity.

Figure 64:

Graphene layer is very good in electron conductivity, and has a possibility for catalytic activity, selective reaction of pharmaceuticals or the like utilizing the graphene surface, and therefore, effective utilization thereof is expected. Further, in the CNT as a one-dimensional space, a behavior being different from conventional physical and chemical reactions is anticipated, and therefore, interest is taken in its effective utilization. In the case of general CNT, even if an outer diameter is increased for easy utilization of the inside, it only leads to increase in the number of graphene layers stacked and the inner diameter does not change. For example, the CNT obtained in Example 23 has the same sizes as that of conventional CNT. FIG. 64 shows a TEM photograph of this CNT, and the outer diameter and the thickness determined from the lattice fringe image were 42.9 nm and 14.3 to 14.4 nm, respectively and the ratio of the thickness to the outer diameter was about 33%. On the other hand, the inside space of the thin CNT obtained in Examples 16, 19 and 21 is very wide and is suitably used since gases and liquids are easily passed therethrough.

Example 20

Spherical phenol resin was pre-baked at a maximum ultimate temperature of 600° C. in a nitrogen gas stream. Iron precipitate was obtained by treating in the same manner as in the preparation of the cobalt precipitate in Example 17, using 1 mol of iron acetylacetonate (Special Grade available from NACALAI TESQUE, INC., hereinafter referred to as Fe(AcAc)2) and 10 liter of methoxyethanol (available from NACALAI TESQUE, INC., purity: 99%). The iron precipitate and the pre-baked starting material were dry-mixed to give a starting material to be subjected to HIP treatment with a iron concentration of 5000 ppm assuming that the total iron used initially had been precipitated in the generated iron precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 1200° C. at a temperature elevating rate of 500° C. per hour while carrying out isostatic pressing at 190 MPa using argon gas.

A lot of carbon nanotubes having an outer diameter of about 100 nm, a length of from about 10 μm to about 10 mm and a thickness of from about 10 nm to about 20 nm were generated on the treated products.

Example 21

Spherical phenol resin was pre-baked at a maximum ultimate temperature of 600° C. in a nitrogen gas stream. Nickel precipitate was obtained by treating in the same manner as in the preparation of the cobalt precipitate in Example 17, using 1 mol of nickel acetylacetonate (Special Grade available from NACALAI TESQUE, INC., hereinafter referred to as Ni(AcAc)2) and 10 liter of methoxyethanol (available from NACALAI TESQUE, INC., purity: 99%). The nickel precipitate and the pre-baked starting material were dry-mixed to give a starting material to be subjected to HIP treatment with a nickel concentration of 5000 ppm assuming that the total nickel used initially had been precipitated in the generated nickel precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 1200° C. at a temperature elevating rate of 500° C. per hour while carrying out isostatic pressing at 190 MPa using argon gas.

A lot of carbon nanotubes having an outer diameter of about 100 nm and a length of from about 10 μm to about 10 mm were generated on the treated products.

Example 22

Figure 65:
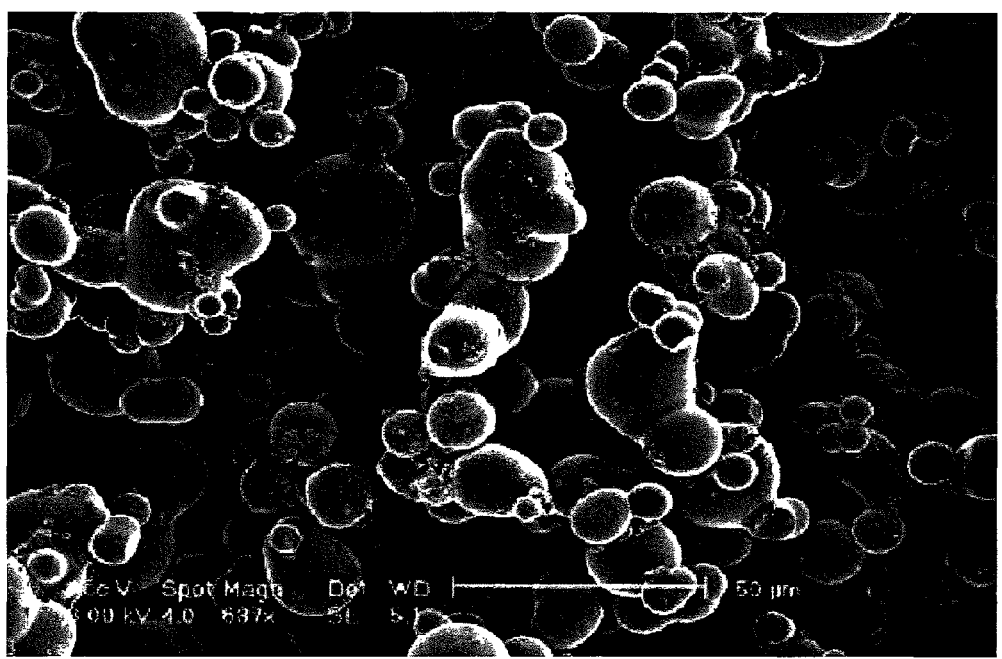

Spherical phenol resin was pre-baked at a maximum ultimate temperature of 600° C. in a nitrogen gas stream. Cobalt precipitate was obtained by treating in the same manner as in Example 17. The cobalt precipitate and the pre-baked starting material were dry-mixed to give a starting material to be subjected to HIP treatment with a cobalt concentration of 5000 ppm assuming that the total cobalt used initially had been precipitated in the generated cobalt precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 800° C. at a temperature elevating rate of 500° C. per hour while carrying out isostatic pressing at 190 MPa using argon gas. An electron microscope photograph of the treated sample is shown in FIG. 65, in which most of spherical phenol resins were carbonized as they were, and vapor-phase-grown graphite was not generated and several CNT were generated slightly around the spheres.

Example 23

Spherical phenol resin was pre-baked at a maximum ultimate temperature of 600° C. in a nitrogen gas stream.

Cobalt precipitate was obtained by treating in the same manner as in Example 17. The cobalt precipitate and the pre-baked starting material were dry-mixed to give a starting material to be subjected to HIP treatment with a cobalt concentration of 5000 ppm assuming that the total cobalt used initially had been precipitated in the generated cobalt precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 1000° C. at a temperature elevating rate of 500° C. per hour while carrying out isostatic pressing at 190 MPa using argon gas.

Figure 67:
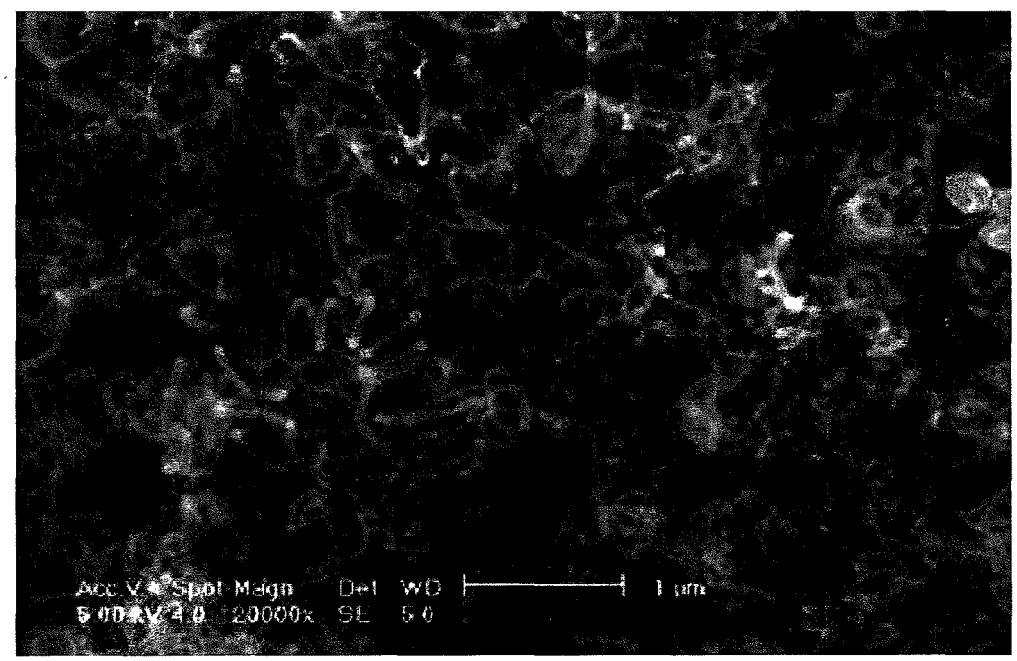
Figure 68:
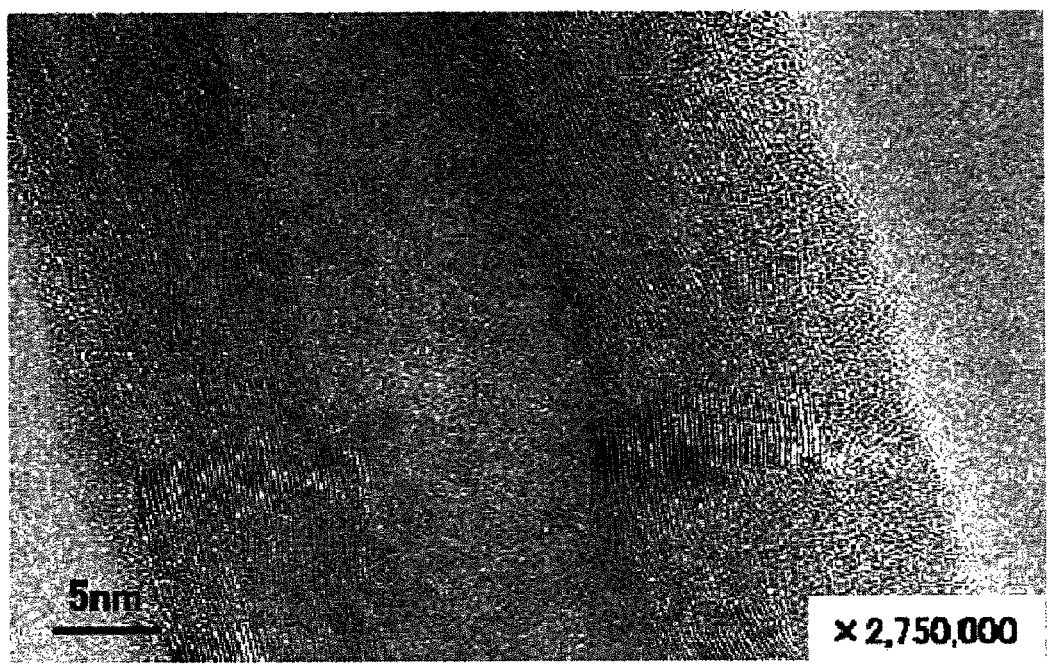
Figure 69:
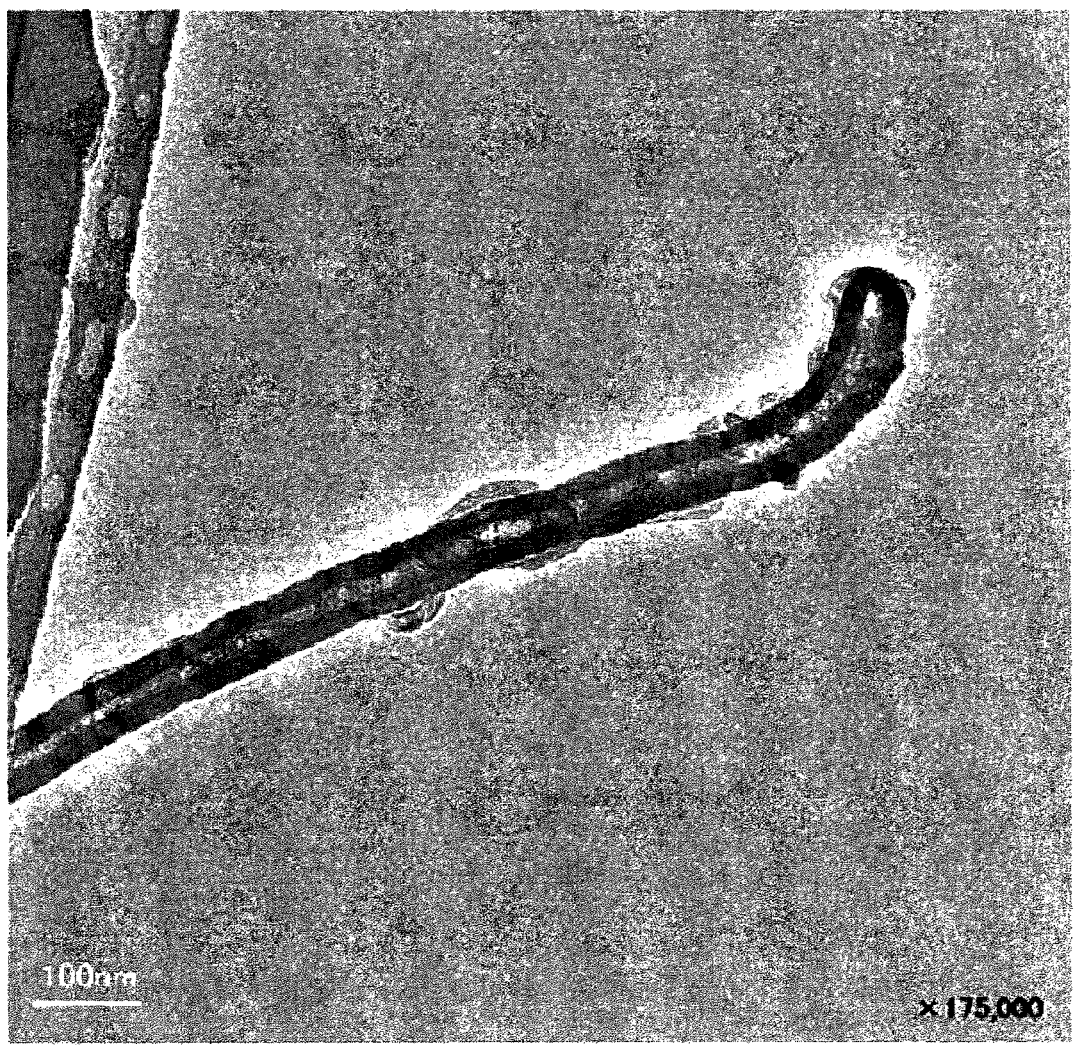

A lot of CNT having an outer diameter of from about 10 nm to about 30 nm were generated selectively in the treated sample, and vapor-phase-grown graphite was not generated. FIGS. 66 and 67 show electron microscope photographs of the generated CNT. FIG. 68 shows the result of TEM observation of the obtained CNT. The lattice fringe image showing that graphenes are stacked in the form of tube was obtained. In addition, as shown in FIG. 69, a fullerene-incorporated CNT, in which fullerene was inside the CNT, was present.

Example 24

Bottles for beverage made of polyethylene terephthalate resin (PET) were pulverized and pre-baked at a maximum ultimate temperature of 600° C. in a nitrogen gas stream. The amount of hydrogen remaining in the starting material after the pre-baking was measured in accordance with general rules on a method for determining an amount of hydrogen of a metallic material (JIS Z 2614: 1990), and the measured amount was 32000 ppm. Cobalt precipitate was obtained by treating in the same manner as in Example 17. The cobalt precipitate and the pre-baked starting material were dry-mixed to give a starting material to be subjected to HIP treatment with a cobalt concentration of 5000 ppm assuming that the total cobalt used initially had been precipitated in the generated cobalt precipitate. The mixture was charged in a screw type graphite crucible, and a screw type top cover was turned to tighten the screw and seal the crucible. The sealed graphite crucible containing the starting material was charged in HIP equipment, and then the inside temperature was increased to 1000° C. at a temperature elevating rate of 500° C. per hour while carrying out isostatic pressing at 190 MPa using argon gas.

A lot of CNT having an outer diameter of from about 10 nm to about 30 nm were generated selectively in the treated sample, and vapor-phase-grown graphite was not generated.

Example 25

To 100 ml of methoxyethanol was added 4.95 g of cobalt acetylacetonate (Co(AcAc)2), followed by stirring with a glass rod or a stirrer to be completely dissolved. Then, to this solution was added 10 g of pre-baked starting material measured previously (pre-baked at 600° C.) little by little, and after the total amount had been added, stirring was carried out for another 30 minutes. The mixture after the stirring was allowed to stand overnight, and then was subjected to filtration under reduced pressure with an aspirator equipped with a diaphragm pump to recover the solid content. The obtained solid content was air-dried in a draft for 24 hours. This operation was repeated ten times, and thereby, a cobalt-carrying starting material to be subjected to HIP treatment and having a cobalt concentration of 5000 ppm was prepared. The starting material carrying the catalyst thereon was charged in a screw type graphite crucible, and a screw type top cover was turned to tighten the screw and seal the crucible. The sealed graphite crucible containing the starting material was charged in HIP equipment, and then the inside temperature was increased to 1000° C. at a temperature elevating rate of 500° C. per hour while carrying out isostatic pressing at 90 MPa using argon gas.

Figure 70:
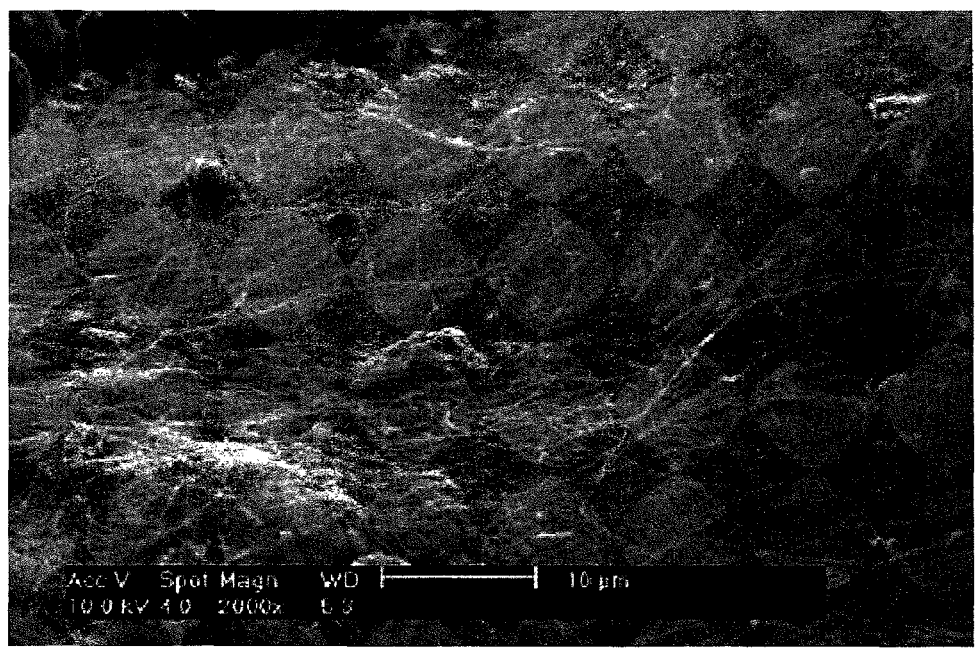

A lot of CNT having an outer diameter of several tens nanometers and a length of from about several micrometers to about several tens micrometers were generated on the surface of the treated products. (FIG. 70)

Figure 72:

On the other hand, a screw type CNF was selectively generated inside the product, and a composite material of a slightly generated CNT and a cup-stacked type and screw type CNF was obtained. (FIGS. 71 and 72)

Figure 73:
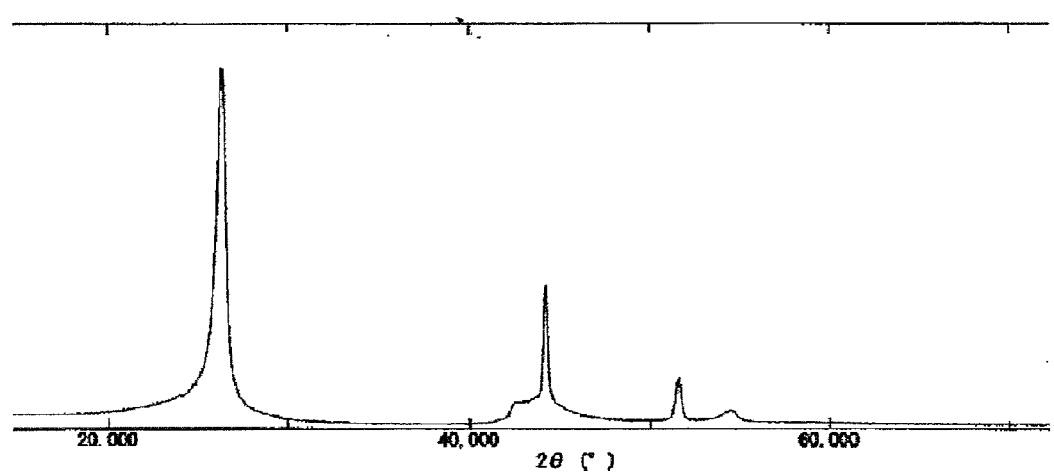

FIG. 73 shows an X-ray diffraction pattern of the sample, and strong diffraction peak indicating 002, 004, 101 and 110 of graphite were observed.

Example 26

The starting material carrying cobalt thereon, which was prepared in the same manner as in Example 25, was charged in a screw type graphite crucible, and a screw type top cover was turned to tighten the screw and seal the crucible. The sealed graphite crucible containing the starting material was charged in HIP equipment, and then the inside temperature was increased to 900° C. at a temperature elevating rate of 500° C. per hour while carrying out isostatic pressing at 190 MPa using argon gas.

Figure 75:
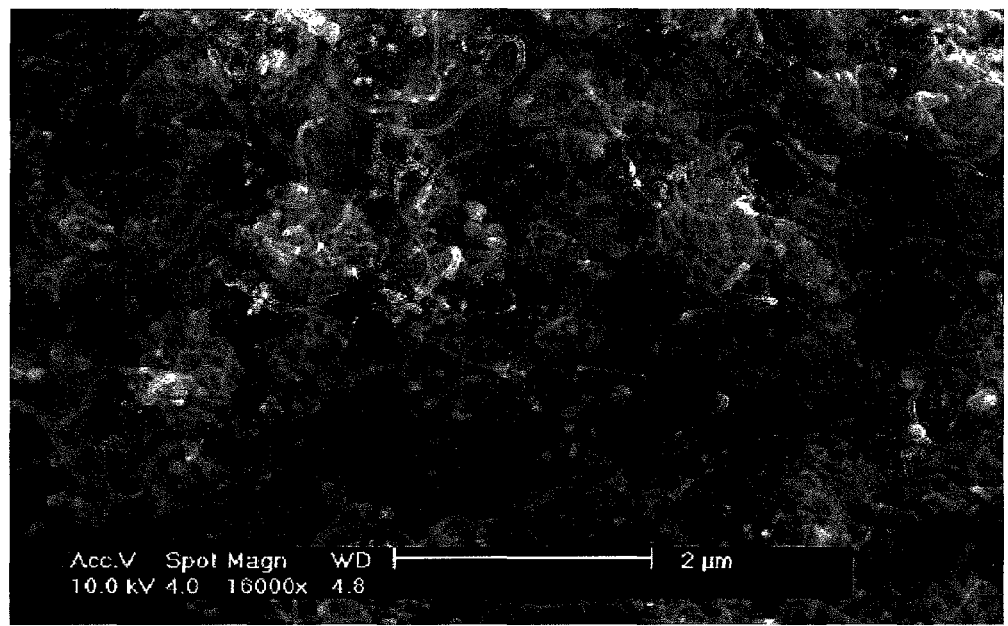

A lot of curled CNT in a state of being collected in the form of cluster were generated in the treated sample. FIG. 74 is a SEM photograph showing the surface of the sample, and white cloudy ones are clusters. FIG. 75 is a SEM photograph showing enlarged view of the clusters. A lot of curled CNT were generated, and cup-stacked type and screw type carbon nanofibers are partially contained. Yield of the curled CNT to the charged starting material was 60%.

Study on Examples 13 to 26

Table 1 shows the main treating conditions and the state of products in Examples 13 to 26. It is considered that when the maximum ultimate temperature at the HIP treatment is high, graphite is precipitated significantly by vapor phase growth, and therefore, in order to selectively generate CNT, a proper maximum ultimate temperature is within a range from about 850° C. to 1300° C. Further, with respect to the shape of CNT, when the HIP treating temperature is 1000° C., CNT having a diameter of 10 nm level (about 10 nm or more and less than about 100 nm) are mainly obtained, and when the HIP treating temperature is 1200° C., CNT having a diameter of 100 nm level (about 100 nm or more and less than about 1000 nm) are mainly obtained.

In the case of the HIP treating temperature being 1000° C., when the pressure was 190 MPa, CNT were selectively generated, while when the pressure is 90 MPa, a lot of CNT were generated on the surface portion of the treated sample and in the whole sample, a lot of cup-stacked type and screw type CNF were generated. These cup-stacked type and screw type CNF showed a peak of graphite in X-ray diffraction, and therefore are considered to have a graphite structure.

With respect to the pre-baking temperature, CNT have been obtained efficiently in the case of pre-baking at 600° C. and containing remaining hydrogen in a large amount as compared with the case of pre-baking at 900° C. In addition, when the pre-baking temperature was 600° C., CNT were generated efficiently irrespective of the kind of resins.

Figure 77:
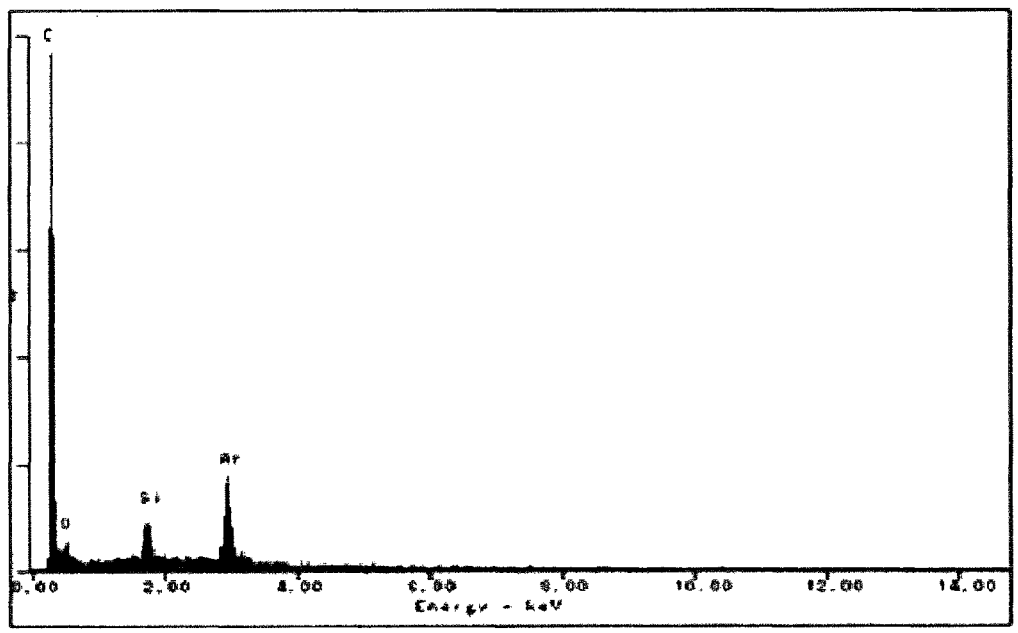

According to the fluorescent X-ray analysis of the generated CNT and CNF, a peak being characteristic to argon was detected. This indicates that argon used as a pressing medium at the HIP treatment had been occluded in the material, and thus, it was confirmed that the material has a characteristic of occluding hydrogen. FIG. 76 shows an electron microscope photograph of the CNT obtained in Example 16 and FIG. 77 shows the result of fluorescent X-ray analysis of the CNT portion. In addition to the carbon peak, the peaks of the catalyst Si and the occluded Ar were confirmed.

TABLE 1-1

| Example | Starting filler | Pre-baking temp. ° C. | Metal component ppm | HIP treating pressure MPa | HIP treating temp. ° C. |
|---|---|---|---|---|---|
| 13 | Spherical phenol resin | 900 | Fe: 500 Si: 200 Zn: 120 | 190 | 2000 |
| 14 | Spherical phenol resin | 900 | Fe: 500 Si: 200 Zn: 150 | 190 | 1500 |
| 15 | Spherical phenol resin | 900 | Fe: 500 Si: 200 Zn: 120 | 190 | 1200 |
| 16 | Spherical phenol resin | 900 | Si: 200000 | 190 | 1200 |
| 17 | Spherical phenol resin | 600 | Co: 5000 | 190 | 1450 |
| 18 | Spherical phenol resin | 600 | Co: 3000 | 190 | 1400 |

Products

| Example | CNT | Graphite | Others |
|---|---|---|---|
| 13 | generated slightly | A large number of graphites were generated around spherical phenol resin | Products having a polygonal cross-section were generated |
| 14 | generated slightly | A large number of graphites were generated around spherical phenol resin | |
| 15 | generated slightly | generated slightly | |
| 16 | CNT having a large diameter (100 nm) was generated | generated slightly | |
| 17 | generated slightly | | CNF of carbon nanohorn-stacked type, graphene-stacked type, cup-stacked type and screw type were generated |
| 18 | generated slightly | | CNF of graphene-stacked type and carbon nanohorn-stacked type were generated |

TABLE 1-2

| Example | Starting filler | Pre-baking temp. ° C. | Metal component ppm | HIP treating pressure MPa | HIP treating temp. ° C. |
|---|---|---|---|---|---|
| 19 | Spherical phenol resin | 600 | Co: 5000 | 190 | 1200 |
| 20 | Spherical phenol resin | 600 | Fe: 5000 | 190 | 1200 |
| 21 | Spherical phenol resin | 600 | Ni: 5000 | 190 | 1200 |
| 22 | Spherical phenol resin | 600 | Co: 5000 | 190 | 800 |
| 23 | Spherical phenol resin | 600 | Co: 5000 | 190 | 1000 |
| 24 | PET resin | 600 | Co: 5000 | 190 | 1000 |
| 25 | Spherical phenol resin | 600 | Co: 50000 | 90 | 1000 |
| 26 | Spherical phenol resin | 600 | Co: 50000 | 190 | 900 |

Products

| Example | CNT | Graphite | Others |
|---|---|---|---|
| 19 | A lot of CNT having large diameter (100 nm) were generated | generated slightly | |
| 20 | A lot of CNT having large diameter (100 nm) were generated | generated slightly | |
| 21 | A lot of CNT having large diameter (100 nm) were generated | generated slightly | |

-continued

| 22 | generated slightly | not generated | |
| 23 | A lot of CNT (10 nm) were generated | not generated | Fullerene-incorporated CNT were present |
| 24 | A lot of CNT (10 nm) were generated | not generated | |
| 25 | A lot of CNT (10 nm) were generated on the surface | | A lot of cup-stacked type and screw type CNF were generated in the sample |
| 26 | A lot of curled CNT (10 nm) were generated | | Cup-stacked type and screw type CNF were generated |

INDUSTRIAL APPLICABILITY

The carbon materials can be suitably used for applications relating to industrial fields making use of characteristics of graphite materials such as 1) applications making use of friction property, electrical property and mechanical property of graphite such as bearing, sealing, graphite sheet, packing, blade, contact strip for pantograph, mold, crucible and die, 2) electrical applications such as electrode for steel making use, electrode for refining of aluminum and brushing material, 3) electronics-related applications such as heater, jig and vessel for furnaces for growing silicon, silicon carbide and compound semiconductor, 4) applications requiring graphite crystallinity, porosity and proper pore size distribution such as diffuser panel and electrode for fuel cell, electrode material for lithium ion battery and electrode material for capacitor, and 5) nuclear energy-related applications such as core materials for nuclear reactor and first wall material for fusion reactor.

In particular, for a diffuser panel for fuel cell, an electrode for capacitor, a negative electrode material for lithium ion battery and the like in the fields of accumulator batteries, it is demanded to prepare graphite materials having excellent graphite crystallinity, high electric conductivity and a large porosity, in which control of pore size distribution is easy and edge portions of carbon hexagonal planes, where an intercalation reaction arises, face toward the surface of the material. In the present invention, the materials satisfying these requirements ideally can be produced.

The materials can be suitably used for applications in various industrial fields such as electronic devices, medical care and living goods by making use of characteristics of carbon hexagonal plane derivatives such as carbon nanofiber, carbon nanotube, graphene and carbon nanohorn.

EXPLANATIONS OF SYMBOLS

1 Crucible cover portion
1a Periphery of crucible cover portion
2 Crucible body
2a Inner wall of top portion of crucible body
3 Pre-baked starting material
4 Spacer
5 Sleeve

The invention claimed is:
1. A method for producing a vapor-phase-grown nanocarbon material, which comprises:
   preparing a filler pre-baked to an extent of containing remaining hydrogen, which carries a catalyst thereon,
   charging the filler in a closed vessel made of heat resistant material, and
   subjecting the filler together with the vessel to hot isostatic pressing treatment using a compressed gas atmosphere, wherein:
   a pre-baking temperature is from 400 to 1000° C.,
   an amount of the catalyst carried on the pre-baked filler is not less than 1000 ppm to the amount of the pre-baked filler,
   the filler is a powdery and/or particulate material,
   the gas is an inert gas,
   at the HIP treatment, the maximum ultimate temperature is from 850 to 1800° C., the maximum ultimate pressure is not less than 10 MPa, and
   the maximum ultimate temperature is higher than pre-baking temperature.

2. The production method of claim 1, wherein the nano-carbon material is a carbon nanotube, or a graphene-laminated carbon nanofiber, a cup-stacked type carbon nanofiber, a screw type carbon nanofiber or a carbon nanohorn-stacked carbon nanofiber.

3. The production method of claim 1, wherein the catalyst is one or more selected from the group consisting of elements (1) tungsten, rhenium, osmium, tantalum, molybdenum, niobium, iridium, ruthenium, hafnium, technetium, rhodium, vanadium, chromium, zirconium, platinum, thorium, lutetium, titanium, palladium, protactinium, thulium, scandium, iron, yttrium, erbium, cobalt, holmium, nickel, dysprosium, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, zinc, lead, cadmium, thallium, bismuth, polonium, tin, lithium, indium, sodium, potassium, rubidium, gallium, cesium, silicon and tellurium, (2) sulfide, boride, oxide, chloride, hydroxide, nitride and organometallic compounds of any one of elements (1) above, and (3) a mixture of any of elements (1) and compounds (2) above and sulfur and/or an organosulfur compound and a mixture of any of elements (1) and compounds (2) above and boron and/or an organoboron compound.

4. The production method of claim 1, wherein the filler is one or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea resin, melamine resin, benzoguanamine resin, epoxy resin, diallyl phthalate resin, unsaturated polyester resin, a bisphenol A type epoxy resin, Novolac type epoxy resin, polyfunctional epoxy resin, alicyclic epoxy resin, alkyd resin, urethane resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluorine-containing resin, polyamide imide, benzene, naphthalene, anthracene, petroleum pitch, coal pitch, petroleum coke, coal coke, carbon black, activated carbon, waste plastic, waste wood, waste plants and garbage.

5. The production method of claim 1, wherein the filler pre-baked to an extent of containing remaining hydrogen is poured into an ionic solution or a complex solution of transition metal to allow the filler to carry transition metal on the surface thereof.

6. The production method of claim 5, wherein the ionic solution of transition metal is one prepared by dissolving a transition metal chloride and/or an transition metal alkoxide in water, an alcohol or a mixture of water and alcohol.

7. The production method of claim 5, wherein the complex solution of transition metal is one prepared by dissolving a transition metal acetylacetonate in water, an alcohol or a mixture of water and alcohol.

8. The production method of claim 1, wherein the filler pre-baked to an extent of containing remaining hydrogen is one or more selected from the group consisting of petroleum coke, coal coke and carbon black having hydrogen corresponding to the remaining hydrogen beforehand.

9. The production method of claim 1, wherein the closed vessel made of heat resistant material is a screw-capped graphite crucible.

10. The production method of claim 1, wherein the amount of remaining hydrogen in the filler is from 500 ppm to 60000 ppm.

\* \* \* \* \*